US012640933B1

(12) United States Patent
Lee

(10) Patent No.: US 12,640,933 B1
(45) Date of Patent: May 26, 2026

(54) OPERATIONAL PERMIT-RECEIPT GATE (ORPRG): NON-BYPASSABLE PERMIT-BEFORE-COMMIT CONTROL OF EXTERNAL EFFECTS AT EFFECT BOUNDARIES

(71) Applicant: Yong Bok Lee, Sheridan, WY (US)

(72) Inventor: Yong Bok Lee, Sheridan, WY (US)

(73) Assignee: Gate of Remembrance LLC, Sheridan, WY (US)

( * ) Notice: Subject to any disclaimer, the term of this patent is extended or adjusted under 35 U.S.C. 154(b) by 0 days.

(21) Appl. No.: 19/535,013

(22) Filed: Feb. 10, 2026

Related U.S. Application Data

(60) Provisional application No. 63/974,708, filed on Feb. 3, 2026.

(51) Int. Cl.
*H04L 9/32* (2006.01)
*G06F 21/57* (2013.01)
*G06F 21/62* (2013.01)

(52) U.S. Cl.
CPC ............ *H04L 9/3247* (2013.01); *G06F 21/57* (2013.01); *G06F 21/6218* (2013.01); *H04L 9/3263* (2013.01)

(58) Field of Classification Search
None
See application file for complete search history.

(56) References Cited

U.S. PATENT DOCUMENTS 6,687,732 B1 2/2004 Bector et al.
7,814,315 B2 10/2010 Parkinson 8,078,870 B2 12/2011 Nanda et al.
8,218,763 B2 * 7/2012 Rooney ................. H04L 9/3236
380/278
8,595,788 B2 11/2013 Lim
8,677,453 B2 3/2014 Chang et al.
8,782,759 B2 7/2014 Hinton et al.
(Continued)

OTHER PUBLICATIONS

Nidamanooru et al. "SOMA-DR: Decision Receipts for Explainable Recovery and Key Rotation in Post-Quantum IAM" (Year: 2026).*
(Continued)

*Primary Examiner* — Younes Naji

(57) ABSTRACT

Systems and methods enforce non-bypassable, fail-closed permit-before-commit control of external-effect requests at an effect boundary between an execution substrate and one or more external interfaces. An interceptor captures each request, deterministically canonicalizes it, computes an action digest, and obtains a machine-verifiable permit receipt bound to a policy digest and epoch identifier with a time-bounded validity. Prior to commitment, the interceptor verifies receipt authenticity, authorization by digest match and/or cryptographic commitment verification, epoch-compatibility, and revocation status using signed revocation data and/or transparency-log proofs subject to policy-defined recency, including in intermittently connected environments, and may enforce scope and permit-provenance constraints. If required verification evidence is missing, stale, conflicting, or indeterminate, the external effect is denied. Optional embodiments use trusted execution boundaries, capability tokens for dual enforcement, and machine-verifiable decision, audit, and denial receipts.

30 Claims, 8 Drawing Sheets

(56) References Cited

U.S. PATENT DOCUMENTS

| | | | |
|---|---|---|---|
| 9,298,923 | B2 | 3/2016 | Salowey et al. |
| 9,444,645 | B2 * | 9/2016 | Blot-Lefevre .......... H04L 63/08 |
| 10,091,212 | B2 | 10/2018 | Weintraub et al. |
| 10,332,099 | B2 * | 6/2019 | Jammikunta ......... H04L 9/0863 |
| 10,425,386 | B2 | 9/2019 | Wardell et al. |
| 11,681,513 | B2 | 6/2023 | Cherches et al. |
| 2003/0070091 | A1 | 4/2003 | Loveland |
| 2006/0242406 | A1 | 10/2006 | Barde et al. |
| 2013/0340064 | A1 | 12/2013 | Kostiainen et al. |
| 2014/0245378 | A1 | 8/2014 | Faltyn et al. |
| 2015/0100778 | A1 | 4/2015 | Andrews et al. |
| 2015/0101014 | A1 | 4/2015 | Giambiagi et al. |
| 2016/0182487 | A1 | 6/2016 | Zhu et al. |
| 2017/0163629 | A1 | 6/2017 | Law et al. |
| 2021/0385083 | A1 | 12/2021 | Lenglet et al. |

OTHER PUBLICATIONS

Alves et al. "Eigen AI: Deterministic Inference, Verifiable results" (Year: 2026).*
Takahashi et al. Observable Only Proof Carrying Autonomy (OOPCA)—Audit Compression and Hybrid Proof/Replay Gating for No-Meta data Agents. (Year: 2026).*
Algithami et al. "Autonomous Agents on Blockchains: Standards, Execution Models, and Trust Boundaries" (Year: 2026).*
Madaras, T.; Estis, P., "PRE-RCT: Pre-Execution Authorization Receipt Format," IETF Internet-Draft, Dec. 3, 2025.
Madaras, T.; Estis, P., "GuardNet Authorization Protocol (GNA)," IETF Internet-Draft, draft-madaras-guardsuite-gna-00, Dec. 2, 2025.
Laurie, B.; Langley, A.; Kasper, E., "Certificate Transparency," RFC 6962, IETF, Jun. 2013.
Santesson, S.; et al., "X.509 PKI Online Certificate Status Protocol (OCSP)," RFC 6960, IETF, Jun. 2013.
Cooper, D.; et al., "Internet X.509 PKI Certificate and CRL Profile," RFC 5280, IETF, May 2008.
Rose, S.; Borchert, O.; Mitchell, S.; Connelly, S., "Zero Trust Architecture," NIST SP 800-207, Aug. 2020.
Oasis, "XACML v3.0 Core Specification," OASIS Standard, Jan. 23, 2013.
The Update Framework (TUF), "The Update Framework Specification," web publication, accessed Feb. 6, 2026.
Torres-Arias, S.; et al., "in-toto: Providing farm-to-table guarantees for bits and bytes," USENIX Security '19, 2019.
Birkholz, H.; Thaler, D.; Richardson, M.; Smith, N.; Pan, W., "Remote ATtestation procedureS (RATS) Architecture," RFC 9334, IETF, Jan. 2023.

* cited by examiner

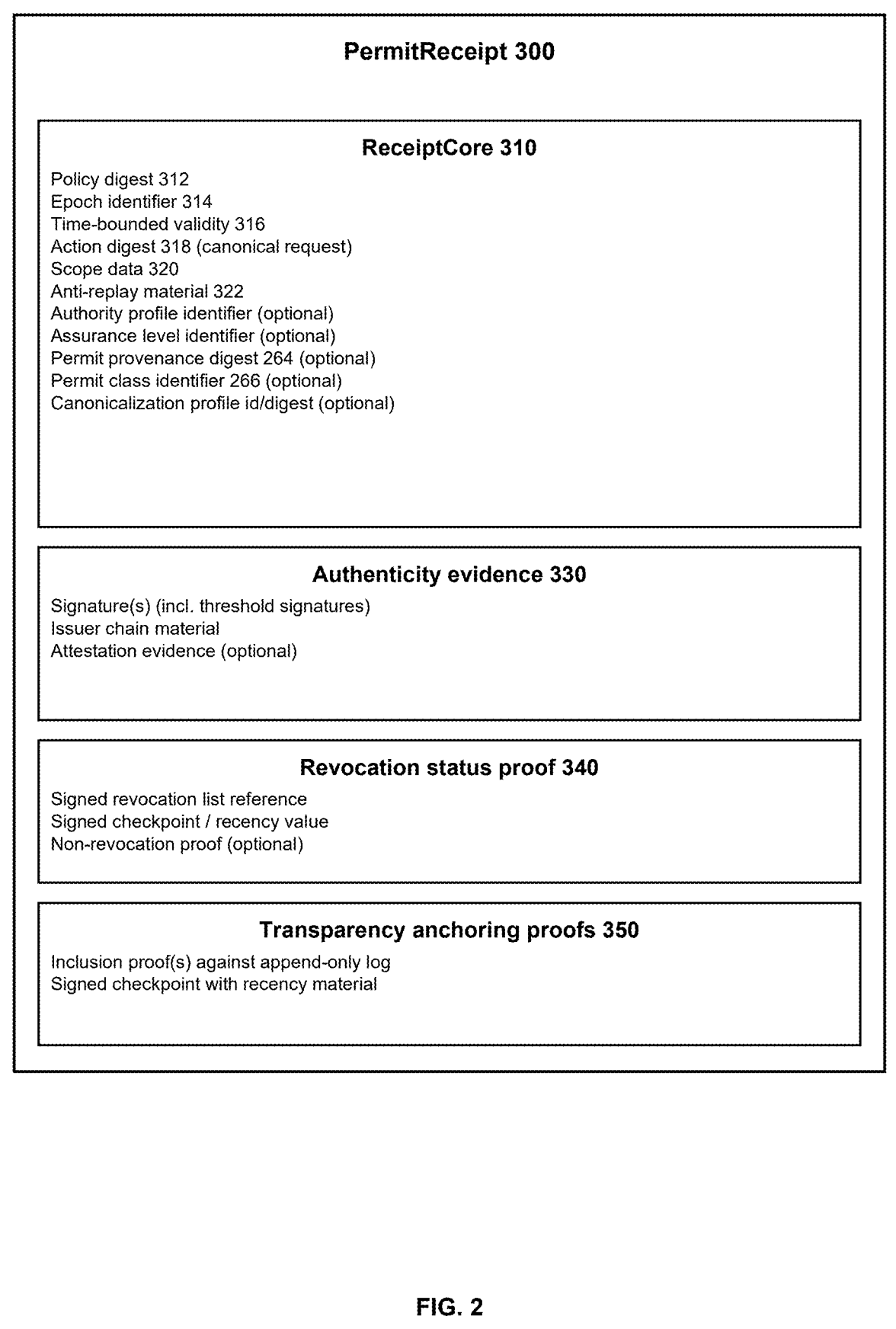

PermitReceipt 300

ReceiptCore 310

Policy digest 312
Epoch identifier 314
Time-bounded validity 316
Action digest 318 (canonical request)
Scope data 320
Anti-replay material 322
Authority profile identifier (optional)
Assurance level identifier (optional)
Permit provenance digest 264 (optional)
Permit class identifier 266 (optional)
Canonicalization profile id/digest (optional)

Authenticity evidence 330

Signature(s) (incl. threshold signatures)
Issuer chain material
Attestation evidence (optional)

Revocation status proof 340

Signed revocation list reference
Signed checkpoint / recency value
Non-revocation proof (optional)

Transparency anchoring proofs 350

Inclusion proof(s) against append-only log
Signed checkpoint with recency material

FIG. 2

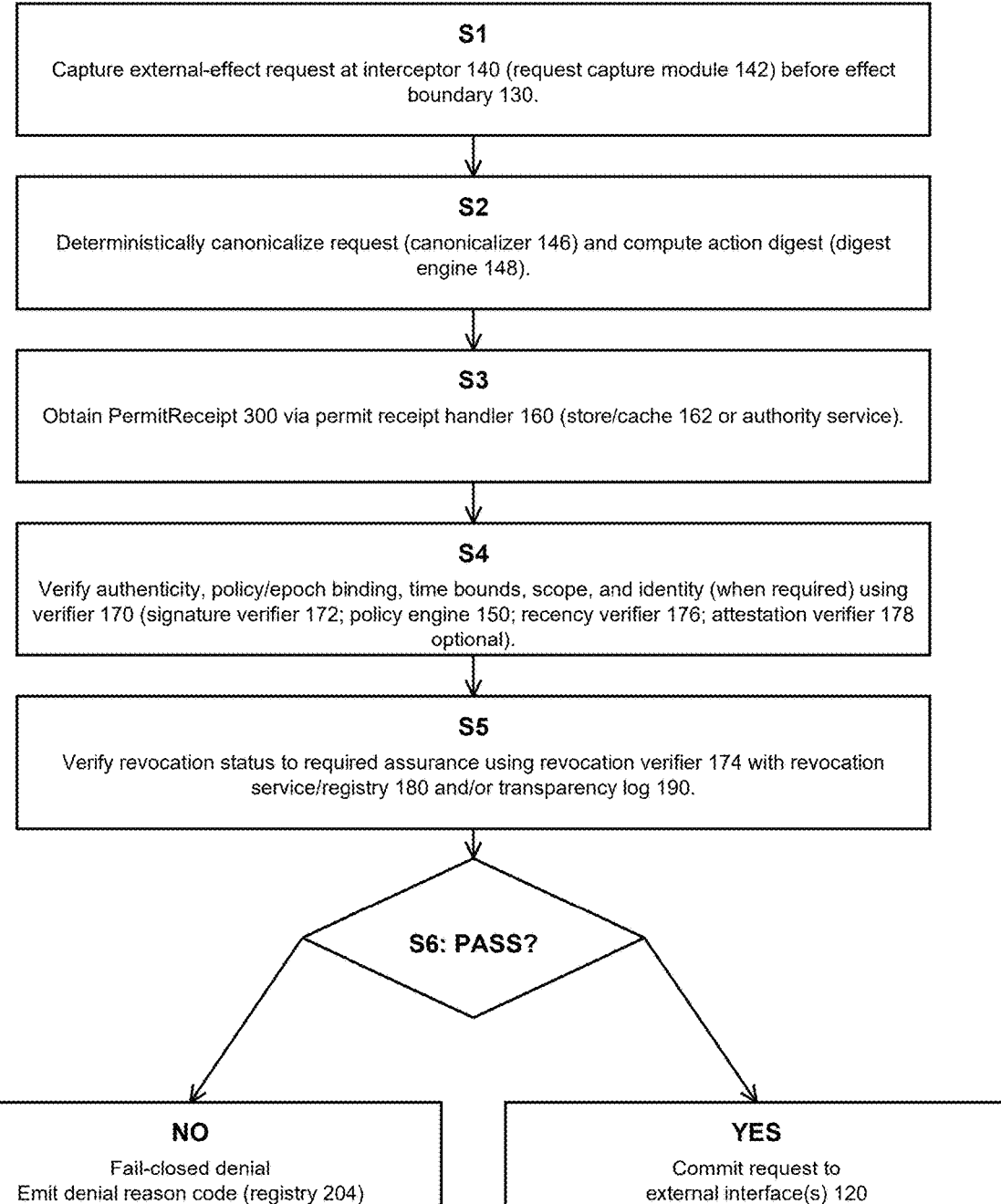

S1

Capture external-effect request at interceptor 140 (request capture module 142) before effect boundary 130.

S2

Deterministically canonicalize request (canonicalizer 146) and compute action digest (digest engine 148).

S3

Obtain PermitReceipt 300 via permit receipt handler 160 (store/cache 162 or authority service).

S4

Verify authenticity, policy/epoch binding, time bounds, scope, and identity (when required) using verifier 170 (signature verifier 172; policy engine 150; recency verifier 176; attestation verifier 178 optional).

S5

Verify revocation status to required assurance using revocation verifier 174 with revocation service/registry 180 and/or transparency log 190.

S6: PASS?

NO
Fail-closed denial
Emit denial reason code (registry 204)
Record audit event (audit logger 200)

YES
Commit request to
external interface(s) 120

FIG. 3

Optional safe-floor fallback (policy-controlled) may be applied under epoch mismatch.

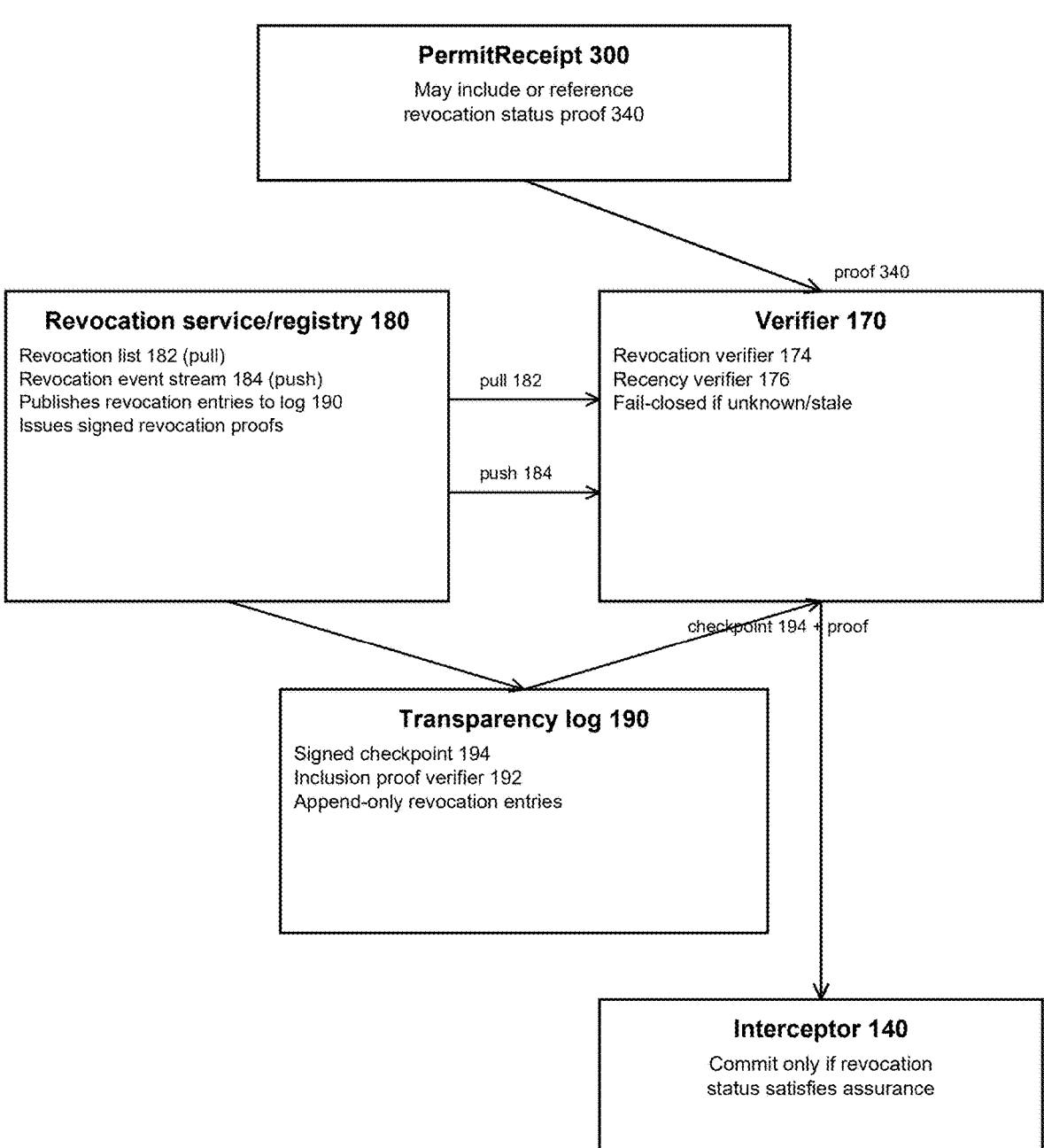

PermitReceipt 300

May include or reference
revocation status proof 340 proof 340

Revocation service/registry 180

Revocation list 182 (pull)
Revocation event stream 184 (push)
Publishes revocation entries to log 190
Issues signed revocation proofs pull 182 push 184

Verifier 170

Revocation verifier 174
Recency verifier 176
Fail-closed if unknown/stale checkpoint 194 + proof

Transparency log 190

Signed checkpoint 194
Inclusion proof verifier 192
Append-only revocation entries

Interceptor 140

Commit only if revocation
status satisfies assurance

FIG. 5

*Default behavior remains fail-closed when required assurance cannot be achieved.*

OPERATIONAL PERMIT-RECEIPT GATE (ORPRG): NON-BYPASSABLE PERMIT-BEFORE-COMMIT CONTROL OF EXTERNAL EFFECTS AT EFFECT BOUNDARIES

CROSS-REFERENCE TO RELATED APPLICATIONS

This nonprovisional application claims the benefit under 35 U.S.C. § 119 (e) of U.S. Provisional Application No. 63/974,708, filed Feb. 3, 2026, titled "Operational Regulatory Permit-Receipt Gate (ORPRG)." The contents of the above-identified provisional application are incorporated by reference herein to the extent that they provide written description and enablement support for the subject matter disclosed and claimed herein and to the extent not inconsistent with the present disclosure. In the event of conflict, the present disclosure controls.

As used herein, "permit" and "authority" are not limited to statutory or government regulation and include, without limitation, regulatory, operator, contractual, safety, standards-based, and delegated permissioning as described herein.

"ORPRG" may be referred to as an operational regulatory permit-receipt gate without limiting claim scope.

STATEMENT REGARDING FEDERALLY SPONSORED RESEARCH OR DEVELOPMENT

None.

INCORPORATION BY REFERENCE

Any patent, patent application, and patent application publication referenced herein is incorporated by reference to the extent permitted and to the extent not inconsistent with the present disclosure. Any other reference is incorporated by reference solely for purposes of background and/or additional non-limiting implementation detail, and not for essential material. Provided, however, that the incorporation by reference of the U.S. Provisional Application identified in Section II is as stated in Section II. In the event of conflict, the present disclosure controls.

TECHNICAL FIELD

The present disclosure relates to computer security, compliance enforcement, and safety governance for distributed computing systems, including, but not limited to, non-terrestrial, remote, intermittently connected, and delay-tolerant environments, and more particularly to non-bypassable, permit-before-commit control of external effects at an effect boundary using machine-verifiable permit receipts bound to policy epochs, subject to revocation propagation, and enforced with fail-closed defaults.

In some embodiments, authorization is conditioned on verifiable permit provenance and jurisdiction-aware authority profiles, wherein an authority profile may define applicable issuers, required proofs, and recency thresholds for one or more effect types or permission classes, enabling regulator-grade and operator-grade permissioning at the effect boundary.

In some embodiments, an applicable authority profile and/or verification strength requirement is selected as a function of context including jurisdiction, operational domain, interface type, effect type, and/or risk class, and effect commitment is denied when profile selection cannot be performed with sufficient confidence or when required verification is incomplete, ambiguous, or cannot be satisfied, thereby preserving fail-closed enforcement semantics at the effect boundary.

As used herein, "regulatory," "authority," and "permit" are not limited to statutory or government regulation. In some embodiments, an authority includes one or more of a regulator authority, an operator authority, a safety authority, a contractual authority, an industry-standards authority, and/or a delegated issuer operating under any of the foregoing. Accordingly, "regulator-grade" or "regulatory-grade" permissioning includes, without limitation, compliance with external law, internal operator governance, contractual constraints, safety governance, and multi-party approval policies applicable to an external effect.

BACKGROUND

Modern computing systems increasingly deploy artificial intelligence (AI) models and agent runtimes in environments where actions and outputs can cause external effects, such as data release, data access or retrieval, message transmission, configuration changes, resource scheduling, and other operations that alter external state.

In some embodiments, AI assistants and agent runtimes operate continuously over extended periods, maintain persistent state (e.g., tasks, plans, memory, or workflow context), and generate external-effect requests in response to events, schedules, and/or background workflows, such that effect commitments may occur outside an interactive, user-initiated session.

In such deployments, an interactive session boundary is not, by itself, a sufficient authorization boundary. Accordingly, each external-effect request is evaluated as an independent commitment attempt at an effect boundary and is denied by default unless verification is satisfied under an applicable policy epoch and, when applicable, an authority profile and/or an assurance level profile, thereby preserving fail-closed semantics regardless of user presence or session state.

In some embodiments, external effects include inter-agent communications that traverse a logical interface between agent runtimes, such as messages exchanged via a message bus, shared workspace, relay service, or protocol negotiation endpoint, including creation, selection, or modification of a representation, codec, or protocol used for subsequent communications. In some embodiments, external effects additionally include data access, retrieval, and ingestion (e.g., queries to enterprise data stores, RAG retrieval, file reads, API fetches, or other data-access interfaces) that expose sensitive information to an execution substrate or expand what an agent can infer. In some embodiments, external effects additionally include capability delegation or transfer (including marketplace-mediated permission exchange), account or identity provisioning actions, and self-modification operations (including code patching, configuration changes, plugin installation, or model/runtime updates) that alter future effect semantics.

In many operational domains, external effects are subject to safety requirements, operator governance, contractual constraints, and/or regulatory permissions. Such constraints evolve over time and may be subject to urgent revocation, suspension, patching, or jurisdictional variation.

Existing approaches often rely on post-hoc logging, best-effort policy checks, or enforcement points that are bypassable by alternate code paths, misconfiguration, privilege escalation, or split-brain deployments. Such approaches can fail to prevent unauthorized effects and may be inadequate for auditability and incident response.

In some embodiments, agent runtimes and associated connectors are deployed via managed, turnkey, or one-click deployment offerings in which a deployment operator provisions or configures runtime components, external-interface exposure, storage, update mechanisms, and/or extension ecosystems. Such deployments can introduce configuration drift, privilege expansion, shared control planes, and rapid distribution of third-party extensions or updates that alter future effect semantics.

Accordingly, there exists a need for enforcement that remains non-bypassable and auditable despite managed deployment abstractions and configuration drift, including controlling, as external effects, one or more of: extension installation, enabling, or update operations; credential or key-release operations; identity or account provisioning operations; and effect-bearing requests to external interfaces, and further enabling urgent revocation, suspension, or policy-epoch changes to default to deny when required recency, coherence, or verification confidence cannot be satisfied.

Furthermore, distributed and remote environments, including intermittently connected or delay-tolerant deployments, complicate enforcement because verification inputs (e.g., revocation status, policy updates, authoritative approvals) may be stale, unreachable, or ambiguous at decision time.

In some embodiments, an external effect may traverse multi-hop paths, relay nodes, or intermittently connected links (including non-terrestrial links), such that applicable constraints may depend on a jurisdiction context determined at decision time (e.g., location, selected relay or ground station, link path, operational domain, or risk class). Absent jurisdiction-context binding, systems may commit effects that are unauthorized or non-compliant under a selected authority profile or a jurisdiction-specific permission class.

In some embodiments, scheduled contact windows and time-bounded link opportunities constrain when verification inputs (e.g., epoch updates, revocation status, authority profile updates) can be refreshed. Accordingly, assurance profiles may incorporate contact-plan-aware recency requirements and deny commitment when required freshness cannot be satisfied within a policy-defined window.

Accordingly, there exists a need for systems that (i) enforce control at the effect boundary in a non-bypassable manner, (ii) condition effect commitment on verifiable permit receipts that encode policy scope, validity, and provenance, (iii) bind authorization to a policy epoch and propagate revocation reliably, and (iv) default to fail-closed when verification is incomplete or uncertain.

In addition, the authority to perform certain external effects may depend on jurisdiction-specific permits, licenses, approvals, or delegations whose provenance and validity must be established at decision time. Absent permit provenance enforcement, systems may commit effects that are unauthorized in a particular jurisdiction or under a particular regulatory class, especially in cross-border, remote, or intermittently connected deployments.

The disclosed technology supports safer operation and governance of computing systems by reducing the likelihood of unauthorized, non-compliant, or unsafe external effects through receipt-conditioned, permit-before-commit, fail-closed enforcement at effect boundaries, without limiting claim scope.

SUMMARY

The disclosed technology provides a permit-before-commit execution rail positioned at an effect boundary and configured such that an external-effect request is denied (fail-closed) unless a corresponding permit receipt is verified as authentic and unrevoked, and as satisfying an epoch-compatibility rule under an applicable policy epoch and validity constraints.

In some embodiments, the system includes a non-bypassable interceptor logically interposed between an execution substrate (e.g., AI model runtime, agent runtime, compute job scheduler) and one or more external interfaces (e.g., network transmit, data egress, data-access and retrieval interfaces such as database query endpoints, retrieval gateways, file/object read APIs, and RAG fetch interfaces, actuator interfaces, privileged APIs, inter-agent communication transports such as message buses or shared workspaces, protocol negotiation endpoints, identity/account provisioning interfaces, extension/plugin marketplaces, and update or modification channels). The interceptor is configured such that each external-effect request directed to the external interface(s) traverses the interceptor prior to commitment at the external interface(s).

In some embodiments, external interface(s) additionally include an output release or presentation interface that delivers AI-generated content (e.g., text, audio, images, video, recommendations, or decisions) to a user or downstream system, and such release is treated as an external effect subject to receipt-conditioned, permit-before-commit, fail-closed enforcement. In some embodiments, such AI-generated content comprises at least a portion of an output stream (e.g., a sequence of output fragments) produced by an artificial intelligence model and released to a user or downstream system as an external sink.

In some embodiments, the at least one external interface includes, without limitation, one or more of: (i) network transmit and/or egress interfaces, (ii) data-access and retrieval interfaces, (iii) privileged device I/O interfaces (including filesystem or object-store writes, peripheral control, or DMA/bus access), (iv) accelerator dispatch interfaces (including GPU/TPU/FPGA kernel launch APIs, driver queues/doorbells, firmware dispatch paths, or hypervisor/VMM intercept points), and (v) credential or key-release interfaces (including operations mediated by a key management service (KMS) and/or a hardware security module (HSM)). These examples are illustrative and do not limit claim scope.

In some embodiments, external interface(s) further include persistent agent state stores, memory stores, task or plan queues, shared workspaces, and/or retrieval or vector stores that persist across time and that, when read, disclose information to an execution substrate, and when written or updated, alter future effect semantics. Reads and writes to such stateful services are treated as external effects subject to receipt-conditioned, permit-before-commit, fail-closed enforcement under applicable policy epochs and verification profiles.

In some embodiments, external-effect requests are generated by scheduled triggers, event subscriptions, webhook callbacks, message-queue events, and/or background workflows, and the interceptor enforces permit-before-commit authorization for each such request independent of interactive user presence. If required verification inputs (e.g., epoch state, revocation state, profile selection confidence, and/or required assurance evidence) cannot be established to required recency or confidence at trigger time, the system denies commitment (fail-closed) or limits operation only to an explicitly authorized constrained mode.

In some embodiments, a strict-deny configuration disables, restricts, or maps any deferred or hold disposition to DENY for policy-designated high-risk effect types when required verification inputs cannot be obtained or refreshed within a policy-defined window, thereby preserving fail-closed behavior without permitting extended hold-based operation absent explicit policy authorization.

In some embodiments, the interceptor deterministically canonicalizes an external-effect request and computes an action digest. The system obtains a permit receipt that includes at least a policy digest, an epoch identifier, a time-bounded validity value, and authenticity evidence (e.g., a digital signature or a threshold signature), and may additionally include an action digest value and/or a cryptographic commitment to the canonical request representation (e.g., a hash or other commitment over the canonical request). In some embodiments, the permit receipt further includes or commits to principal and/or workload identity bindings and/or a purpose or use-case identifier as scope constraints. The system verifies that the permit receipt authorizes the external-effect request at least by verifying, under a commitment verification procedure, cryptographic consistency between (i) the computed action digest and/or the canonical request representation and (ii) an action digest value and/or a cryptographic commitment included in or referenced by the permit receipt, including, when both the action digest value and the cryptographic commitment are present, verifying consistency with each. The system further verifies that the permit receipt satisfies an epoch-compatibility rule for the epoch identifier, is within the time-bounded validity value, and is not revoked; as used herein, "cryptographically consistent" includes, for example, equality of a recomputed digest to a committed digest value and/or successful verification under a commitment scheme against the commitment.

In some embodiments, a PermitReceipt is issued by an authority service that is logically and administratively distinct from the execution substrate and from the requesting workload identity, such that a receipt purportedly issued by the requesting workload (or by an unseparated co-resident component) is insufficient absent policy-specified separation-of-duties proof. In non-limiting examples, separation-of-duties proof includes an issuer identity bound to an authority profile, a hardware-backed signing requirement for the issuer, and/or a multi-party approval rule (including threshold signatures) that cannot be satisfied solely by the requesting workload.

In some embodiments, the cryptographic commitment to the canonical request representation comprises a digest (e.g., a hash) computed over bytes of a deterministic canonical serialization of the canonical request representation, and the commitment verification procedure comprises recomputing the digest from the canonical request representation and verifying equality against a committed digest value.

In some embodiments, the cryptographic commitment comprises a Merkle commitment, including a Merkle root committing to one or more canonical request fields and/or a canonical request object, and the commitment verification procedure comprises verifying an inclusion proof (and, when required, a consistency proof) against the committed Merkle root and a signed checkpoint.

In some embodiments, the signed checkpoint is a signed head of an append-only log that supports inclusion and consistency proofs and is subject to a policy-defined freshness bound (e.g., a maximum-merge-delay bound) and a continuity record update rule. In some embodiments, failure to obtain a sufficiently fresh signed checkpoint, failure to verify an inclusion and/or consistency proof, or failure to satisfy a policy-defined continuity rule is treated as a denial condition (fail-closed) for policy-designated high-risk effect types.

In some embodiments, the cryptographic commitment comprises a structured commitment to a subset of canonical request fields (e.g., effect type, interface identifier, target identifier, rate limit, and/or effect budget fields), and the commitment verification procedure comprises verifying cryptographic consistency between (i) the computed action digest and/or canonical request representation and (ii) the committed field set, including, without limitation, by recomputing one or more field-level digests under a referenced canonicalization profile.

In some embodiments, a permit receipt includes or is accompanied by a privacy-preserving authorization proof that demonstrates satisfaction of one or more authorization predicates without revealing an underlying permit artifact in full. In non-limiting examples, such a proof comprises a selective-disclosure proof and/or a zero-knowledge proof that proves one or more of: validity of a permit class identifier, satisfaction of a scope predicate over one or more canonical request fields, membership or allowability of an authorization identifier under a policy-defined rule, and/or satisfaction of a recency or epoch-compatibility predicate. The verifier validates the proof as part of receipt verification when required by the selected authority profile and/or assurance level profile and denies commitment (fail-closed) when required proof material is missing, invalid, stale beyond threshold, or unverifiable.

Verifiable credential form factors (illustrative, non-limiting). In some embodiments, a PermitReceipt and/or an equivalent authorization artifact is expressed as, or encapsulated within, a verifiable credential (VC) or wallet-presentable authorization credential. In some embodiments, authorization is conveyed via a presentation that is cryptographically verifiable and bound to one or more of: issuer identity, holder identity, a requested action_digest (or commitment thereto), policy_digest and epoch_id, scope constraints, and time-bounded validity.

Holder binding and selective disclosure (illustrative, non-limiting). In some embodiments, a wallet-presented authorization credential supports holder binding (proof-of-possession) and privacy-preserving disclosure, including selective disclosure and/or zero-knowledge proofs, such that the verifier can validate satisfaction of authorization predicates (e.g., permit class, scope predicate, jurisdiction predicate, epoch-compatibility predicate, and/or recency predicate) without requiring disclosure of the full underlying permit artifact.

Delegation and chain-of-authority (illustrative, non-limiting). In some embodiments, capability delegation or transfer is authorized using a delegation credential or delegation receipt that commits to a delegation scope and a delegation chain, including one or more of: delegator identity binding, delegatee identity binding, permitted effect types, permitted interfaces/targets, purpose/use-case constraints, budgets, and time bounds. In some embodiments, the verifier validates that the delegation chain satisfies a policy-defined chain rule (e.g., maximum depth, allowed issuers, non-escalation, and revocation coherence), and denies commitment (fail-closed) when chain validation cannot be satisfied with sufficient confidence.

Credential status, revocation, and recency (illustrative, non-limiting). In some embodiments, revocation status for a VC-form authorization artifact is verified using signed status artifacts and/or append-only log proofs subject to policy-defined recency bounds. In some embodiments, unknown, stale, conflicting, or unverifiable status is treated as a denial condition (fail-closed) for policy-designated effect types or risk classes.

Interoperability without scope limitation (illustrative, non-limiting). In some embodiments, the verifier accepts multiple authorization artifact forms, including PermitReceipt objects, wallet-presented credentials, and/or proofs bound to commitments, provided that the verifier can establish authenticity, scope, epoch-compatibility, validity, and revocation status to the assurance level required by policy. These examples are illustrative and do not limit claim scope.

Cryptographic agility (illustrative, non-limiting). In some embodiments, a PermitReceipt and/or a related authorization artifact includes or references a cryptographic suite identifier or profile (CryptoSuiteProfile) that specifies one or more cryptographic algorithms, parameter sets, and/or key types used for authenticity evidence, commitments, and/or proofs. In some embodiments, the verifier enforces a policy-defined cryptographic agility rule under a policy epoch and denies commitment (fail-closed) when a presented receipt relies on a cryptographic suite that is disallowed, deprecated, unverifiable, or otherwise not permitted under the applicable authority profile and/or assurance level profile.

Hybrid and post-quantum authenticity (illustrative, non-limiting). In some embodiments, authenticity evidence comprises a hybrid signature or hybrid authenticity construction that includes at least one classical signature component and at least one post-quantum signature component, and the verifier enforces a policy-defined rule requiring verification of one or both components based on effect type, risk class, jurisdiction context, and/or an algorithm-liveness rule. In some embodiments, the verifier denies commitment (fail-closed) when required hybrid components are missing, invalid, stale beyond a policy-defined threshold, or unverifiable.

Algorithm deprecation and key transition (illustrative, non-limiting). In some embodiments, a cryptographic deprecation event is represented by a signed registry release, signed policy release manifest, and/or signed revocation artifact that designates one or more algorithms, parameter sets, keys, or credential types as deprecated for one or more effect types or risk classes. In some embodiments, upon detecting a deprecation event applicable to a requested external effect, the system denies commitment (fail-closed) unless a receipt is re-issued under an allowed cryptographic suite and satisfies required recency and verification strength.

In some embodiments, verification additionally enforces a canonicalization profile binding, such that the permit receipt commits to or references a canonicalization profile identifier or digest used to compute the action digest, thereby reducing mismatch and design-around risk.

In some embodiments, authorization is additionally bound to an allowed communication representation class, codec, protocol, and/or channel identifier, such that the verifier denies commitment when the canonical request representation or message encoding deviates from constraints bound by the permit receipt and/or the selected canonicalization profile.

Output claim-check gating (illustrative, non-limiting). In some embodiments, when an external effect comprises release or presentation of AI-generated content, authorization is additionally conditioned on satisfaction of policy-defined grounding and/or disclosure predicates evaluated under an applicable assurance level profile. In non-limiting examples, the system canonicalizes an output payload and computes at least one of: an output digest, a claim-set digest, and/or one or more claim digests representing materially asserted claims.

In some embodiments, the system obtains or validates a claim-check receipt (ClaimCheckReceipt) that is machine-verifiable and that commits to at least: (i) a claim-set digest and/or output digest, (ii) an evidence bundle digest committing to one or more cited sources, retrieved passages, documents, records, or measurements used to support the claims, (iii) one or more grounding predicates or coverage requirements (e.g., citation coverage thresholds, allowed source sets, conflict detection rules, uncertainty labeling rules), (iv) a policy digest and/or epoch identifier, (v) time-bounded validity and/or recency material, and (vi) authenticity evidence (e.g., signature or threshold signature) by an applicable authority and/or verifier component.

In some embodiments, the interceptor denies commitment of output release when required claim-check evidence is missing, stale beyond threshold, ambiguous, conflicting, out of scope under the selected policy epoch, or unverifiable to the required assurance level, thereby enforcing fail-closed semantics for high-stakes output effects. In some embodiments, the system permits release only in a policy-controlled constrained mode that restricts scope (e.g., requires explicit disclosure, limits to non-actionable summaries, or requires step-up approval) and records auditable evidence. In some embodiments, the claim-check gate is designed to be robust to deceptive, coerced, or manipulated model behavior by requiring machine-verifiable evidence bindings independent of the model's self-assertions.

Output marking and disclosure predicates (illustrative, non-limiting). In some embodiments, when an external effect comprises release or presentation of AI-generated content, authorization is additionally conditioned on satisfaction of policy-defined marking, labeling, and/or disclosure predicates under an applicable assurance level profile. In non-limiting examples, the system enforces a DisclosureNoticeSet comprising one or more required disclosures, labels, metadata fields, or watermarks associated with the output effect type, destination class, jurisdiction context, and/or risk class.

Provenance credential binding (illustrative, non-limiting). In some embodiments, the system obtains or validates a machine-verifiable provenance artifact associated with the output payload, and the ClaimCheckReceipt (or an associated receipt) commits to at least: (i) an output_digest and/or claim-set digest, (ii) a DisclosureNoticeSet digest or identifier, and (iii) a provenance credential digest (e.g., a digest of a signed provenance claim set) indicating one or more of generation context, issuing authority, and/or applicable policy epoch. The particular provenance format is non-limiting; references to any standard are illustrative.

Watermark and channel binding (illustrative, non-limiting). In some embodiments, authorization for output release further requires a watermark binding and/or channel binding such that the system denies commitment if the output release would occur without the required watermark, label, or metadata, or if the output encoding, representation class, codec, or channel deviates from constraints bound by the receipt and/or a selected canonicalization profile.

Recipient-side verification and replay (illustrative, non-limiting). In some embodiments, the system emits, alongside the released output, a verifiable release envelope that enables a recipient or downstream system to validate required markings and provenance evidence and to replay verification of the ClaimCheckReceipt and associated evidence bindings under a run-the-verifier procedure. In some embodiments, if required marking/provenance verification cannot be satisfied to required recency or assurance, the system denies release (fail-closed) or permits release only in a policy-controlled constrained mode that restricts scope and records auditable evidence.

Streaming and partial release control (illustrative, non-limiting). In some embodiments, when output is released as a stream of fragments, the system enforces a release fence in which each fragment (or a bounded segment) is treated as an external effect, and the system denies further release when required claim-check, marking, or provenance predicates become stale, ambiguous, conflicting, or unverifiable under the applicable policy epoch and assurance level.

Non-limiting notice. The output marking/labeling/provenance embodiments are exemplary refinements that provide verification inputs and evidence bindings for the same receipt-conditioned, permit-before-commit authorization rail and do not limit claim scope.

In some embodiments, revocation is enforced via revocation proofs, signed revocation lists, transparency-log anchored revocation events, or combinations thereof. If revocation status cannot be established to a defined assurance level, the system denies the request in a fail-closed manner.

In some embodiments, a policy epoch binding prevents replay of old permissions after policy changes. If an epoch mismatch is detected, the system denies commitment and optionally requests re-issuance of the permit receipt under the current epoch.

In some embodiments, an epoch identifier includes, without limitation, an epoch sequence value, a policy digest, a composite epoch digest committing to multiple policy digests, and/or a signed checkpoint value associated with an append-only policy log. As used herein, "valid under the epoch identifier" includes satisfaction of an epoch-compatibility rule, which may include strict equality, a bounded compatibility window, a minimum-epoch rule, and/or a cross-source consistency rule. In some embodiments, when epoch state cannot be established with sufficient confidence (e.g., split-brain epoch sources or stale epoch checkpoints), the system denies commitment in a fail-closed manner unless an explicitly authorized constrained mode applies.

In some embodiments, the system supports delay-tolerant operation, including offline or partitioned environments, by issuing constrained local receipts under strictly bounded scopes and subsequently anchoring receipts to an append-only log upon reconnection, while preserving fail-closed defaults when required verification is unavailable.

In some embodiments, delay-tolerant operation accounts for scheduled contact windows or link opportunities, and assurance level profiles may specify freshness requirements relative to a contact plan or link window schedule for the requested effect type or risk class.

In some embodiments, the system emits structured denial reason codes and audit records to enable operational governance, insurance-grade auditability, and regulator-grade traceability.

In some embodiments, upon denial the system emits a structured precondition failure record comprising (i) a denial reason code and (ii) an evidence_ref identifying one or more proof artifacts relevant to the denial, including one or more of signed checkpoint identifiers, inclusion/non-inclusion proofs, consistency proof identifiers, receipt and/or decision receipt digests, revocation list or event identifiers, and/or profile/registry release identifiers, enabling independent reproduction of the denial basis.

In some embodiments, the system emits a machine-verifiable decision receipt (DecisionReceipt) representing an allow/deny outcome for an external-effect request. In non-limiting examples, the DecisionReceipt is cryptographically bound to at least an action digest, a policy digest and epoch identifier, a verification profile identifier (e.g., authority profile and/or assurance level), and an outcome (ALLOW or DENY) with an optional denial reason code and optional recency observations. In some embodiments, the Decision-Receipt is digitally signed (including by threshold signature). In some embodiments, one or more downstream enforcement components require a valid DecisionReceipt, or a capability token derived from or bound to the Decision-Receipt, as a condition of effect commitment; absent satisfaction of such requirement, the external effect is denied (fail-closed).

Independent witness and co-signing (illustrative, non-limiting). In some embodiments, a DecisionReceipt and/or an EvidencePack is additionally signed or co-signed by an independent witness service that is logically and administratively distinct from at least one of the execution substrate, the requesting workload identity, and the permit-issuing authority. In some embodiments, the witness service verifies a policy-defined subset of proof material (e.g., receipt digest, policy_digest and epoch_id, checkpoint identifiers, and/or inclusion/non-inclusion proofs) and produces witness authenticity evidence (e.g., a digital signature, multi-signature, or threshold signature) bound to the decision outcome. In some embodiments, commitment is denied (fail-closed) for policy-designated high-risk effect types unless required witness authenticity evidence is present, valid, sufficiently recent, and unrevoked.

These and other embodiments are described in the detailed description, figures, and appendices, all of which are illustrative and non-limiting.

Unified inventive concept (illustrative, non-limiting). The embodiments and claims described herein are directed to a common inventive concept: a non-bypassable permit-before-commit authorization rail that controls commitment of external-effect requests at an effect boundary by requiring verification of a machine-verifiable permit receipt (or an equivalent authorization artifact) bound to a policy epoch and revocation status, with fail-closed denial when required verification cannot be satisfied. Optional features described herein-including, without limitation, canonicalization profiles, authority and/or assurance profiles, time and anti-replay mechanisms, continuity-verified append-only logs with policy-defined freshness bounds and time-of-use revalidation, idempotent and atomic commitment fences, structured precondition failure records with evidence references, jurisdiction and route bindings, delay-tolerant operation, budgets (including cumulative budgets), model-artifact operations and training-pipeline operations receipt-conditioned at the effect boundary, dual enforcement, and conformance and/or registry artifacts—are non-limiting refinements that provide verification inputs, scope constraints, or evidence for the same authorization rail.

In some embodiments, the permit receipt includes permit provenance evidence identifying or committing to a regulator-issued or authority-issued authorization artifact, and the verifier enforces permit provenance as a condition of commitment.

In some embodiments, verification is performed under a policy-defined assurance level profile that specifies required authorities, required proofs, and recency thresholds per effect type or risk class. In some embodiments, the assurance level profile additionally specifies required machine-verifiable assurance evidence reflecting ongoing model and system posture, including one or more of evaluated accuracy/reliability attestations over a defined window, vulnerability assessment results, bias or risk assessment summaries, and/or safety test outcomes, each optionally bound to a policy epoch and treated as revocable inputs; if required assurance evidence is missing, stale, ambiguous, or unverifiable to the selected assurance level, the system denies commitment (fail-closed).

Assurance evidence receipts (illustrative, non-limiting). In some embodiments, machine-verifiable assurance evidence used by an assurance level profile is expressed as one or more signed assurance evidence receipts (AssuranceEvidenceReceipt) that are evaluated as revocable verification inputs. In non-limiting examples, an AssuranceEvidenceReceipt commits to at least: (i) a subject identifier (e.g., model identifier/hash, runtime identifier, toolchain/build digest, deployment identity, or enforcement component measurement), (ii) an evaluation type identifier (e.g., safety test, reliability evaluation, red-team result, vulnerability assessment, supply-chain integrity assessment, bias/risk assessment), (iii) an evaluation window identifier and/or time bounds, (iv) an outcome or score (or a digest committing to structured results), (v) a policy digest and/or epoch identifier under which the evaluation is intended to be used, (vi) a time-bounded validity value and/or recency value, and (vii) authenticity evidence (e.g., digital signature or threshold signature) by an applicable evaluator authority.

In some embodiments, for one or more effect types or risk classes, the verifier requires that at least one applicable AssuranceEvidenceReceipt be present, authentic, unrevoked, and sufficiently recent under the selected assurance level profile; if required assurance evidence is missing, stale beyond threshold, ambiguous, conflicting, or unverifiable to the required assurance level, the system denies commitment (fail-closed).

In some embodiments, assurance evidence receipts are bound to or referenced by a PermitReceipt and/or a DecisionReceipt by including an assurance_evidence digest, an evidence bundle digest, and/or one or more receipt digests. In some embodiments, assurance evidence receipts are subject to revocation and recency handling analogous to other revocable inputs; if assurance evidence revocation status cannot be established to required recency, the system denies commitment (fail-closed) when such evidence is required by policy.

In some embodiments, assurance evidence receipts are produced by multiple authorities (e.g., operator authority, safety authority, independent auditor) using multi-signature or threshold signature schemes, and a policy-defined quorum rule determines whether assurance evidence is sufficient for a requested effect type or risk class; if quorum cannot be established with sufficient confidence, the system denies commitment (fail-closed).

In some embodiments, the permit receipt and/or verifier decision is evaluated under an authority profile identifier and an assurance level identifier selected based on jurisdiction, domain, interface type, effect type, and/or risk class, and the system denies commitment when profile selection cannot be performed with sufficient confidence.

In some embodiments, "sufficient confidence" for selecting an authority profile and/or assurance level profile is determined by a policy-defined deterministic selection procedure defined by a policy epoch and/or a signed registry release, including, without limitation, (i) a deterministic resolver rule over jurisdiction context bindings, interface identifiers, effect types, and risk classes, (ii) a quorum-ofsources requirement in which multiple profile sources must agree, and/or (iii) validation of cryptographically verifiable signed context evidence used for selection. If the selection procedure cannot complete, yields conflicting outputs, or fails a policy-defined confidence threshold, the system denies commitment in a fail-closed manner.

In some embodiments, the permit receipt and/or canonical request additionally commits to a jurisdiction context binding (e.g., a jurisdiction identifier set, ground station identifier, link path identifier, or geospatial/time context digest) used to select authority profiles and apply jurisdiction-specific constraints for mobile, multi-hop, or cross-border deployments.

In some embodiments, non-bypassability is strengthened by dual enforcement, in which the external interface also requires a capability or stamp derived from successful permit receipt verification, such that bypassing the interceptor does not result in effect commitment.

In some embodiments, interoperability is supported by registries and conformance artifacts, including signed releases of reason code registries, schema registries, authority profiles, and verifier API contracts, enabling licensing and standardization without limiting claim scope.

In some embodiments, implementations publish signed conformance artifacts, including a verifier API contract, signed registry releases (e.g., authority profiles, canonicalization profiles, and denial reason codes), and a signed test vector corpus, enabling independent reproduction of allow/deny outcomes under a "run-the-verifier" procedure for procurement, audit, and standardization workflows, without limiting claim scope.

BRIEF DESCRIPTION OF THE DRAWINGS

FIG. 2 illustrates an example PermitReceipt structure including a ReceiptCore with policy, epoch, time bounds, scope, and authenticity evidence.

FIG. 3 illustrates a permit-before-commit flow: request capture, canonicalization, permit receipt acquisition, verification, commitment or fail-closed denial.

FIG. 5 illustrates revocation propagation including push, pull, and transparency-log anchored revocation proofs.

DETAILED DESCRIPTION

A. Overview and Reference Numerals

Figure 1:
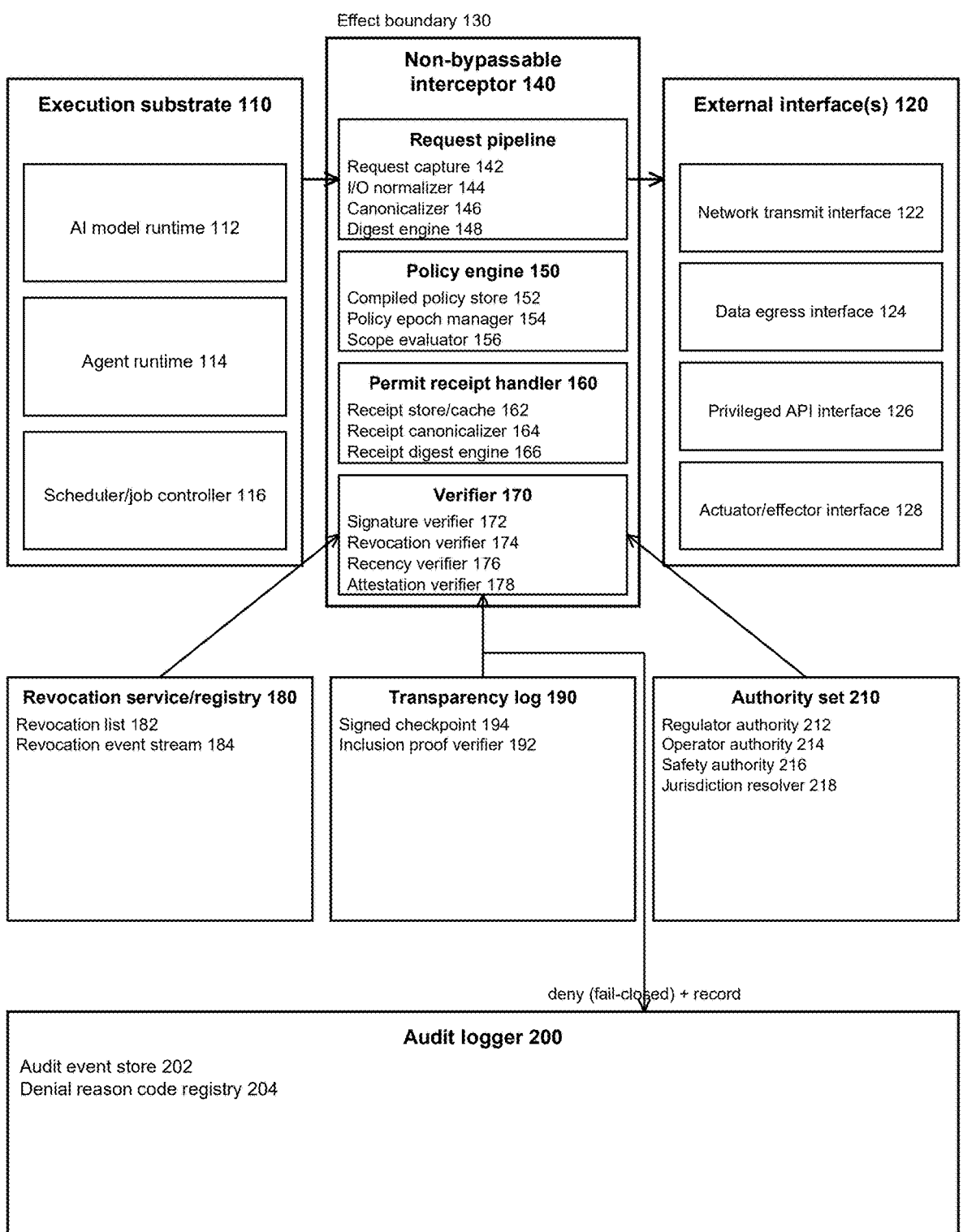
FIG. 1 illustrates a system architecture in which a non-bypassable interceptor is positioned on an effect boundary between an execution substrate and one or more external interfaces.

The following description is presented to enable one of ordinary skill in the art to make and use the disclosed embodiments. Various modifications, substitutions, and alternatives will be apparent, and the principles described herein may be applied to other embodiments without departing from the scope of the claims.

Core invariants (illustrative, non-limiting). In at least some embodiments, the system enforces: (i) effect commitment occurs only after verification that a permit receipt authorizes an action digest under applicable policy digest(s) and epoch constraint(s); (ii) revocation status and recency satisfy a selected assurance profile; (iii) if any required verification is incomplete, ambiguous, or stale beyond threshold, commitment is denied (fail-closed); and (iv) enforcement is non-bypassable at the effect boundary, optionally strengthened by dual enforcement using a capability stamp or token required by the external interface.

In some embodiments, "revocation status is unknown or stale" includes, without limitation, absence of a required signed revocation list, absence of a required revocation event record, inability to verify a required signed checkpoint for a revocation log, checkpoint age exceeding a policy-defined threshold, missing or invalid inclusion/non-inclusion proofs, and/or cross-source inconsistencies for revocation evidence. In some embodiments, the system treats any such unknown, stale, ambiguous, or unverifiable revocation state as a denial condition under fail-closed semantics unless a narrowly scoped constrained mode is explicitly authorized by policy.

Ambiguity-as-denial rule (illustrative, non-limiting). In some embodiments, any ambiguity relevant to authorization—including ambiguity in resolved tenant/scope context, jurisdiction context, time/freshness, profile selection, revocation state, issuer identity, canonicalization profile, or required evidence bindings—is treated as a verification failure that results in DENY (fail-closed) unless a narrowly scoped constrained mode is explicitly authorized by policy.

Single-rail decision structure (illustrative, non-limiting). For clarity, the disclosed teachings describe a single receipt-conditioned authorization decision that gates effect commitment at an effect boundary. Variations described throughout this disclosure may be implemented in any combination and are treated as non-limiting verification inputs, scope constraints, or evidence associated with that authorization decision (e.g., recency, revocation proofs, jurisdiction context, route provenance, budgets, and conformance artifacts), without departing from the unified permit-before-commit rail.

Unless otherwise indicated, functional descriptions may be implemented in hardware, software, firmware, or combinations thereof, including distributed implementations across multiple devices and trust boundaries.

REFERENCE NUMERALS (ILLUSTRATIVE, NON-LIMITING)

100 system; 110 execution substrate; 112 AI model runtime; 114 agent runtime; 116 scheduler/job controller; 120 external interface(s); 122 network transmit interface; 123 inter-satellite link interface; 124 data egress interface; 125 ground station/downlink interface; 126 privileged API interface; 127 crosslink routing interface; 128 actuator/effector interface; 129 beam steering/communications control interface; 130 effect boundary; 140 non-bypassable interceptor; 142 request capture module; 144 I/O normalizer; 146 canonicalizer; 148 digest engine; 150 policy engine; 152 compiled policy store; 154 policy epoch manager; 156 scope evaluator; 160 permit receipt handler; 162 permit receipt store/cache; 164 receipt canonicalizer; 166 receipt digest engine;

170 verifier; 172 signature verifier; 174 revocation verifier; 176 recency verifier; 178 attestation verifier; 180 revocation service/registry; 182 revocation list; 184 revocation event stream; 190 transparency log; 192 inclusion proof verifier; 194 signed checkpoint; 200 audit logger; 202 audit event store; 204 denial reason code registry; 210 authority set; 212 regulator authority; 214 operator authority; 216 safety authority; 218 jurisdiction resolver; 220 trusted compute boundary; 222 TEE; 224 hardware security module (HSM); 226 deterministic audited sandbox; 230 offline receipt module; 232 monotonic counter; 234 reconnection anchoring module; 236 contact plan manager; 238 ephemeris/orbit state module; 239 link window evaluator; 240 energy/resource budget module; 242 budget proof; 244 thermal/power constraint evaluator. 250 assurance level ladder; 252 assurance profile evaluator; 254 verification profile store; 260 authority profile registry; 262 permit artifact; 264 permit provenance digest; 266 permit class identifier; 270 capability stamp; 272 capability token; 274 external-interface verifier; 280 verifier API; 282 conformance test harness; 284 test vector corpus; 286 signed release manifest; 288 registry steward.

B. System Architecture (FIG. 1)

FIG. 1 depicts system 100 in which execution substrate 110 produces external-effect requests that would otherwise reach external interface(s) 120 across effect boundary 130.

Execution substrate 110 may include, by way of example, an AI model runtime 112 producing output fragments (e.g., segments of an output stream), an agent runtime 114 generating tool invocations, or a scheduler 116 dispatching compute, communication, or control tasks.

External interface(s) 120 may include one or more of network transmit interface 122, data egress interface 124, privileged API interface 126, and actuator/effector interface 128. The specific interface type is non-limiting; the disclosed principles apply to any interface through which an external effect may be committed.

In some embodiments, external interface(s) 120 additionally include non-terrestrial or relay interfaces, such as an inter-satellite link interface, a ground station or downlink interface, a crosslink routing interface, or a communications control interface, each of which may be subject to jurisdiction- or risk-class-specific authority profile requirements.

In some embodiments, external interface(s) 120 additionally include data-access and retrieval interfaces, such as database query endpoints, retrieval gateways, file/object read APIs, or RAG fetch interfaces, each of which can commit an external effect by disclosing information to an execution substrate or by expanding inferential capability.

In some embodiments, external interface(s) 120 additionally include logical or software-mediated interfaces distinct from execution substrate 110, such as an inter-agent message bus interface, shared workspace interface, protocol negotiation interface, identity/account provisioning interface, extension/plugin marketplace interface, or update/modification interface, each of which can commit an external effect (e.g., information transfer, permission change, or state change) outside the execution substrate.

Non-bypassable interceptor 140 is logically interposed at effect boundary 130 such that each external-effect request directed to external interface(s) 120 traverses interceptor 140 prior to commitment at the external interface(s).

In some embodiments, interceptor 140 includes request capture module 142, I/O normalizer 144, canonicalizer 146, and digest engine 148 configured to deterministically canonicalize requests and compute an action digest representing the request in a stable, verification-ready form.

The system includes policy engine 150 with compiled policy store 152, policy epoch manager 154, and scope evaluator 156. Policy engine 150 determines applicable policies and epochs and evaluates whether a request falls within permitted scope under the current epoch.

The system includes permit receipt handler 160 with permit receipt store/cache 162, receipt canonicalizer 164, and receipt digest engine 166. Permit receipt handler 160 obtains, normalizes, and prepares permit receipts for verification.

Verifier 170 includes signature verifier 172, revocation verifier 174, recency verifier 176, and optional attestation verifier 178. Verifier 170 determines whether a permit receipt is authentic, current, unrevoked, and authorizes the request under applicable policy and epoch constraints.

Upon successful verification, interceptor 140 commits the request to external interface(s) 120. Otherwise, interceptor 140 denies commitment in a fail-closed manner and may emit structured denial reason codes via registry 204 and audit records via audit logger 200.

C. PermitReceipt Data Model (FIG. 2)

FIG. 2 depicts an illustrative PermitReceipt 300 including a ReceiptCore 310 and associated proofs and authenticity evidence.

ReceiptCore 310 may include a policy digest 312 identifying applicable policy terms, an epoch identifier 314 binding the receipt to a policy epoch, a time-bounded validity value 316, and an action digest 318 corresponding to the canonicalized external-effect request. In some embodiments, ReceiptCore 310 additionally or alternatively includes a cryptographic commitment (e.g., a hash or commitment scheme output) to the canonical request representation, and the verifier validates that the computed action digest is consistent with the commitment.

ReceiptCore 310 may further include an authority profile identifier and/or an assurance level identifier indicating a verification profile under which the receipt is intended to be evaluated, including required proofs and recency thresholds. ReceiptCore 310 may further include principal and workload identity bindings, such as a requester identity digest, workload/agent identity, session identifier, or toolchain identity digest, enabling verification that an authorized request originates from an expected identity context; if identity binding cannot be verified to the required assurance level for a requested effect type or risk class, commitment is denied (fail-closed).

ReceiptCore 310 may further include permit provenance material, such as a permit provenance digest that commits to a permit artifact, permit identifier, license token, or approval record, and may include a permit class identifier indicating a permission category applicable to the requested effect.

ReceiptCore 310 may further include a canonicalization profile identifier or digest used to compute the action digest, enabling verifiers to enforce canonicalization consistency without limiting claim scope.

ReceiptCore 310 may further include scope data 320 defining permitted interfaces, action types, targets, rate limits, effect budgets, jurisdictions, purposes or use-cases, or other constraints. Scope data 320 may be encoded as claims, capabilities, permits, or structured policy bindings.

ReceiptCore 310 may further include a jurisdiction context binding such as a jurisdiction identifier set, ground station identifier, link path identifier, or geospatial/time context digest, enabling enforcement of jurisdiction-specific constraints and reducing ambiguity for mobile or multi-hop deployments.

Scope data 320 may further include permitted communication channel identifiers, permitted representation/codec/protocol classes, delegation or transfer constraints for capabilities or permissions, and constraints governing update or self-modification operations, including permitted update channels, permitted update types, and/or required provenance or attestation for modifications.

ReceiptCore 310 may include anti-replay material 322 such as a nonce, monotonic counter, sequence number, or other freshness binding.

PermitReceipt 300 includes authenticity evidence 330, such as one or more signatures (including threshold signatures), an issuer chain, and/or attestation evidence. In some embodiments, issuer chain material and revocation proofs are included or referenced.

PermitReceipt 300 may include revocation status proof 340, such as a signed revocation list reference, a signed checkpoint for a revocation transparency log, or a cryptographic proof that a receipt or issuer credential is not revoked.

PermitReceipt 300 may include optional transparency anchoring proofs 350, including inclusion proofs against an append-only log and a signed checkpoint containing recency material.

Field names, ordering, encoding formats (e.g., JSON, CBOR, ASN.1), and cryptographic schemes are illustrative and non-limiting, provided that the receipt remains verifiable and binds authorization to the request, policy, epoch, and validity constraints.

D. Permit-Before-Commit Authorization Flow (FIG. 3)

FIG. 3 depicts an illustrative authorization flow performed by system 100.

At step S1, interceptor 140 captures an external-effect request before it is committed across effect boundary 130 to external interface(s) 120.

At step S2, canonicalizer 146 deterministically canonicalizes the request, and digest engine 148 computes an action digest for stable comparison.

At step S3, permit receipt handler 160 obtains an associated PermitReceipt, which may be supplied with the request, fetched from a local cache, obtained from an authority service, or generated under constrained local rules.

In some embodiments, the system supports a preflight verification procedure in which a canonical request representation is evaluated under an authority profile and assurance level without committing the external effect. In non-limiting examples, preflight returns (i) an ALLOW or DENY projection, (ii) missing, stale, or conflicting verification inputs (e.g., revocation checkpoint age, required assurance evidence, cross-log coherence status), and/or (iii) an issuance request for a permit receipt under a current policy epoch. Preflight does not relax fail-closed enforcement;

commitment remains denied unless and until required verification is satisfied under the applicable profile.

In some embodiments, the interceptor and/or verifier maintains a bounded verification cache for reducing repeated verification cost, where cache keys include at least an action digest and an epoch identifier and optionally include a verification profile identifier and a receipt digest. Cache entries are time-bounded and are invalidated upon any of: epoch change, revocation events, registry release changes, cross-log coherence uncertainty, or a policy-defined maximum age for cached evidence. In some embodiments, when required recency, revocation status, or cross-log coherence cannot be established with sufficient confidence, cached results are treated as unusable and the system re-verifies or denies commitment (fail-closed) as required by policy.

In some embodiments, the system also selects or resolves an applicable authority profile and assurance level based on context (e.g., jurisdiction, interface type, effect type, risk class). If profile selection cannot be performed with sufficient confidence, the system denies commitment (fail-closed) unless an explicitly authorized, narrowly scoped exception applies.

In some embodiments, the verifier evaluates whether required verification inputs can be refreshed to satisfy recency thresholds given a contact plan or link window schedule, and denies commitment when required updates cannot be obtained within a policy-defined freshness window for the requested effect.

At step S4, verifier 170 verifies authenticity, validity, and authorization, including signature verification, policy/epoch binding, time bounds, scope, identity bindings (when required by policy), purpose/use-case constraints (when required by policy), and anti-replay material. In some embodiments, verifier 170 evaluates time-bound validity using a trusted time source and/or a bounded clock-drift rule specified by a policy epoch and/or an assurance level profile. Such evaluation may include verifying at least one of (i) a signed time checkpoint, (ii) time attestation evidence, or (iii) a monotonic counter or other freshness evidence. If the time source is untrusted, unavailable, or indicates drift beyond a policy-defined threshold for the requested effect type or risk class, interceptor 140 denies commitment (fail-closed) unless a narrowly scoped, explicitly authorized, policy-controlled exception applies.

In some embodiments, verifier 170 accelerates receipt verification using batch or aggregate verification techniques while preserving fail-closed semantics per request. In non-limiting examples, the signature verifier performs batch verification and/or validates aggregated signatures for multiple receipts, and the transparency verifier validates Merkle multiproofs or batched inclusion/non-inclusion proofs against a signed checkpoint. If any batched verification fails, is ambiguous, or cannot be attributed to a specific request with sufficient confidence, the verifier treats affected requests as failed verification and denies commitment (fail-closed) unless an explicitly authorized constrained mode applies.

At step S5, revocation verifier 174 verifies that the receipt and relevant issuer credentials are not revoked to the required assurance level. If revocation status is unknown, stale, or unverifiable, the system defaults to fail-closed denial unless an explicit, narrowly tailored policy exception applies.

At step S6, upon success, interceptor 140 commits the request to external interface(s) 120. Upon failure, interceptor 140 denies commitment and records a denial reason code and audit event via audit logger 200.

The system thus enforces a strict permit-before-commit rule, preventing external effects without verified authorization.

In some embodiments, effect commitment is idempotent and atomic across retries and multi-hop paths by requiring a commit fence (e.g., an idempotency key, transaction fence, compare-and-swap commit marker, or write-ahead-log barrier) bound to at least an action digest and/or a receipt digest; if the commit fence cannot be established, is ambiguous, or indicates inconsistency, the system denies commitment (fail-closed) and records an audit event.

Workflow-level authorization (illustrative, non-limiting). In some embodiments, an external-effect request is associated with a multi-step workflow, plan, or job graph, and the system computes a workflow digest (WorkflowDigest) over a canonical representation of at least a portion of the workflow, including one or more intended step operations, dependencies, and/or bounds. In some embodiments, a PermitReceipt and/or DecisionReceipt is bound to the WorkflowDigest and to a step identifier and/or step digest, and the interceptor denies commitment (fail-closed) when the resolved workflow context is ambiguous, when the step is not cryptographically consistent with the authorized workflow, or when the workflow digest cannot be verified to required assurance or recency.

Bundle receipts for sets of actions (illustrative, non-limiting). In some embodiments, a PermitReceipt authorizes a bounded set of action digests by committing to a Merkle root or other commitment that commits to multiple permitted action digest values and/or canonical request representations. In such embodiments, authorization for a specific request includes verifying an inclusion proof for the request's action digest relative to the committed root, and denying commitment (fail-closed) when the inclusion proof is missing, invalid, stale beyond a policy-defined threshold, or inconsistent with the policy epoch and verification profile.

Non-escalation within workflows (illustrative, non-limiting). In some embodiments, workflow-level authorization enforces a non-escalation rule in which later steps of a workflow cannot increase scope, destination class, disclosure budget, or privilege relative to a policy-defined bound associated with an earlier authorized step or with a workflow-level bound. In some embodiments, the verifier denies commitment (fail-closed) when the non-escalation rule cannot be evaluated with sufficient confidence or when a step attempts to exceed an authorized bound.

E. Policy-Epoch Binding (FIG. 4)

Figure 4:
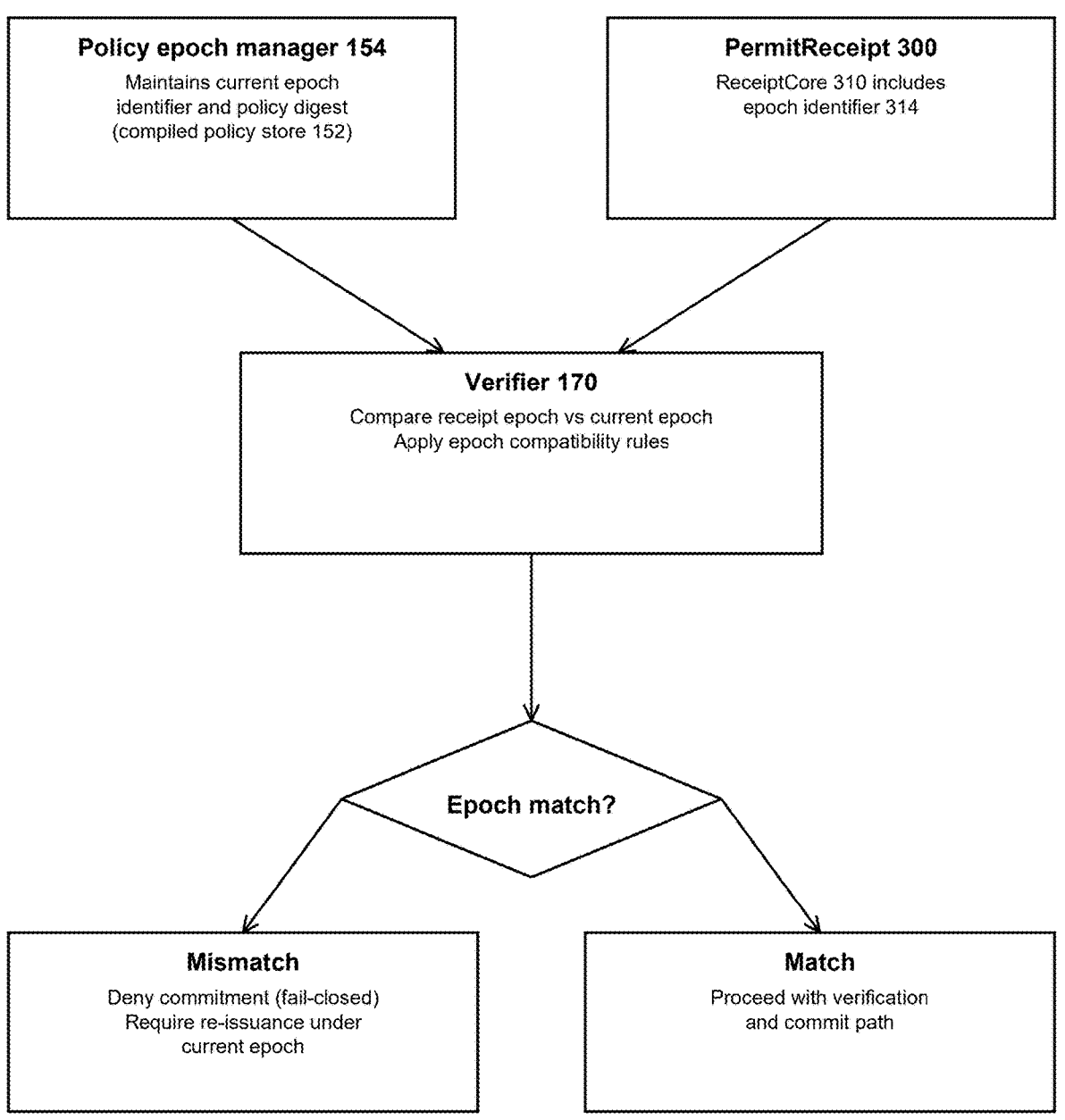
FIG. 4 illustrates policy epoch binding and behavior under epoch mismatch.

FIG. 4 depicts policy epoch manager 154 and epoch-bound authorization.

Policy epoch manager 154 maintains an epoch identifier representing the currently effective compiled policy, policy digest, and/or an epoch sequence number.

A PermitReceipt includes an epoch identifier 314. Verifier 170 compares the receipt epoch identifier against the current epoch and applicable epoch-compatibility rules.

In some embodiments, epoch-compatibility rules permit a bounded epoch window (e.g., for staged rollout) while preserving safety constraints and preventing rollback. In other embodiments, strict equality is enforced.

If an epoch mismatch is detected, interceptor 140 denies commitment and may require re-issuance of a PermitReceipt under the current epoch. This blocks replay of outdated permissions after policy updates or regulatory changes.

In some embodiments, epoch mismatch triggers a safe fallback mode, such as restricting to a minimal subset of effects explicitly allowed under a "safe floor" policy. Such fallback modes, when present, are themselves policy-controlled and non-limiting.

Policy change-control rail (illustrative, non-limiting). In some embodiments, changes to compiled policy and/or policy epochs are governed by a policy change-control rail in which a policy update is treated as a controlled event. In non-limiting examples, a policy update is distributed as a signed policy release manifest (a type of signed release manifest) that commits to at least a compiled policy bundle digest, an epoch identifier, and one or more activation constraints. In some embodiments, policy epoch manager 154 denies activation of a new epoch unless the signed policy release manifest is verified as authentic and unrevoked and unless applicable activation constraints are satisfied; otherwise, activation is denied (fail-closed) and the system continues operating under a prior effective epoch and/or a policy-controlled safe floor mode.

Regression/negative vectors as activation constraints (illustrative, non-limiting). In some embodiments, activation constraints include policy regression verification evidence demonstrating that an updated policy preserves required fail-closed semantics for at least a set of negative conformance vectors. In non-limiting examples, a conformance test harness executes a published test vector subset and produces a signed result artifact committing to at least a harness identity/version and a vector corpus digest (and/or release manifest digest). In some embodiments, activation is denied (fail-closed) unless the signed result artifact verifies as authentic and indicates required outcomes for a policy-specified subset; in non-limiting examples, activation is denied when a policy-designated critical negative vector does not yield an expected DENY outcome.

Approval and separation-of-duties for policy changes (illustrative, non-limiting). In some embodiments, policy changes require step-up approval or separation-of-duties prior to activation, including multi-party approval evidenced by one or more signatures (including threshold signatures) over the policy release manifest digest and/or a policy change proposal digest. In some embodiments, the policy change proposal digest commits to at least a prior policy digest and a candidate policy digest and optionally a policy diff digest. If required approvals are missing, invalid, stale, revoked, or unverifiable to a policy-defined assurance level, activation is denied (fail-closed).

Propagation quorum and mixed policy state handling (illustrative, non-limiting). In some embodiments, activation and/or continued operation under a new epoch is conditioned on propagation evidence indicating that a quorum of required enforcement points has acknowledged the updated epoch within a policy-defined window. In non-limiting examples, enforcement points emit signed acknowledgments committing to an epoch identifier and a checkpoint or release digest. If quorum propagation requirements are not satisfied, or if epoch state is split-brain or cannot be established with sufficient confidence across sources, the system denies commitment for policy-designated high-risk effect types (fail-closed) and may restrict operation to a policy-controlled safe floor scope until coherence is re-established.

Policy activation receipt (illustrative, non-limiting). In some embodiments, upon satisfying change-control requirements, the system emits a signed policy activation receipt that commits to at least a policy release manifest digest, an activated epoch identifier, and one or more evidence digests (e.g., approval evidence digests and regression verification result digests). In some embodiments, one or more components treat the policy activation receipt as a required verification input for performing selected external effects under the new epoch; absent a valid policy activation receipt when required by policy, such effects are denied (fail-closed).

Registry activation receipt (illustrative, non-limiting). In some embodiments, activation of a new signed registry release (including authority profiles, assurance profiles, canonicalization profiles, reason code registries, and/or test vector corpora) is treated as a controlled event analogous to policy epoch activation. In non-limiting examples, the system denies use of a new registry release unless a signed registry release manifest is verified as authentic and unrevoked and unless policy-defined activation constraints (including negative-vector regression evidence and/or multi-party approvals) are satisfied, and upon success emits a signed registry activation receipt committing to at least the release manifest digest and activation time/window. If activation cannot be verified to required assurance or recency, the system defaults to deny for policy-designated high-risk effects (fail-closed).

F. Revocation Propagation (FIG. 5)

FIG. 5 depicts revocation service/registry 180 and revocation event propagation.

Revocation may apply to permits, receipts, issuer credentials, policy epochs, authority profiles, assurance evidence, or authority keys. Revocation can be time-bound, scope-bound, or immediate.

Revocation may be propagated via push subscriptions to revocation event stream 184, via periodic pull of revocation list 182, via transparency log 190, or combinations thereof. In some embodiments, revocation events are triggered by security operations workflows (e.g., incident response, anomaly detection, or compromise response), enabling rapid invalidation of receipts, issuers, authority profiles, scopes, or assurance evidence upon suspected compromise or unsafe agentic behavior.

In some embodiments, revocation proof 340 includes a signed checkpoint, a recency value, and an inclusion or non-inclusion proof anchored to an append-only structure.

In some embodiments, recency verifier 176 validates that revocation data is sufficiently recent for the requested effect type and risk class. If recency requirements are not met, interceptor 140 denies commitment (fail-closed).

In some embodiments, revocation proofs are tied to policy epoch updates, enabling rapid invalidation of previously issued receipts upon policy changes.

As used herein, a "cross-log coherence requirement" comprises a policy-defined rule for determining whether signed checkpoints and committed state digests obtained from two or more append-only logs are mutually consistent and sufficiently fresh for a requested effect under an applicable assurance level, including for purposes of verifying revocation state, policy-epoch state, and/or registry-release and authority-profile state used by the verifier. In non-limiting examples, coherence may be established by quorum agreement on a required state digest across logs, satisfaction of monotonicity or anti-rollback constraints over checkpoint sequence or recency values, and/or absence of conflicts between required revocation, epoch, and/or registry state digests; otherwise, the verifier denies commitment in a fail-closed manner.

G. Delay/Partition-Tolerant Operation and Offline Constraints (FIG. 6)

Figure 6:
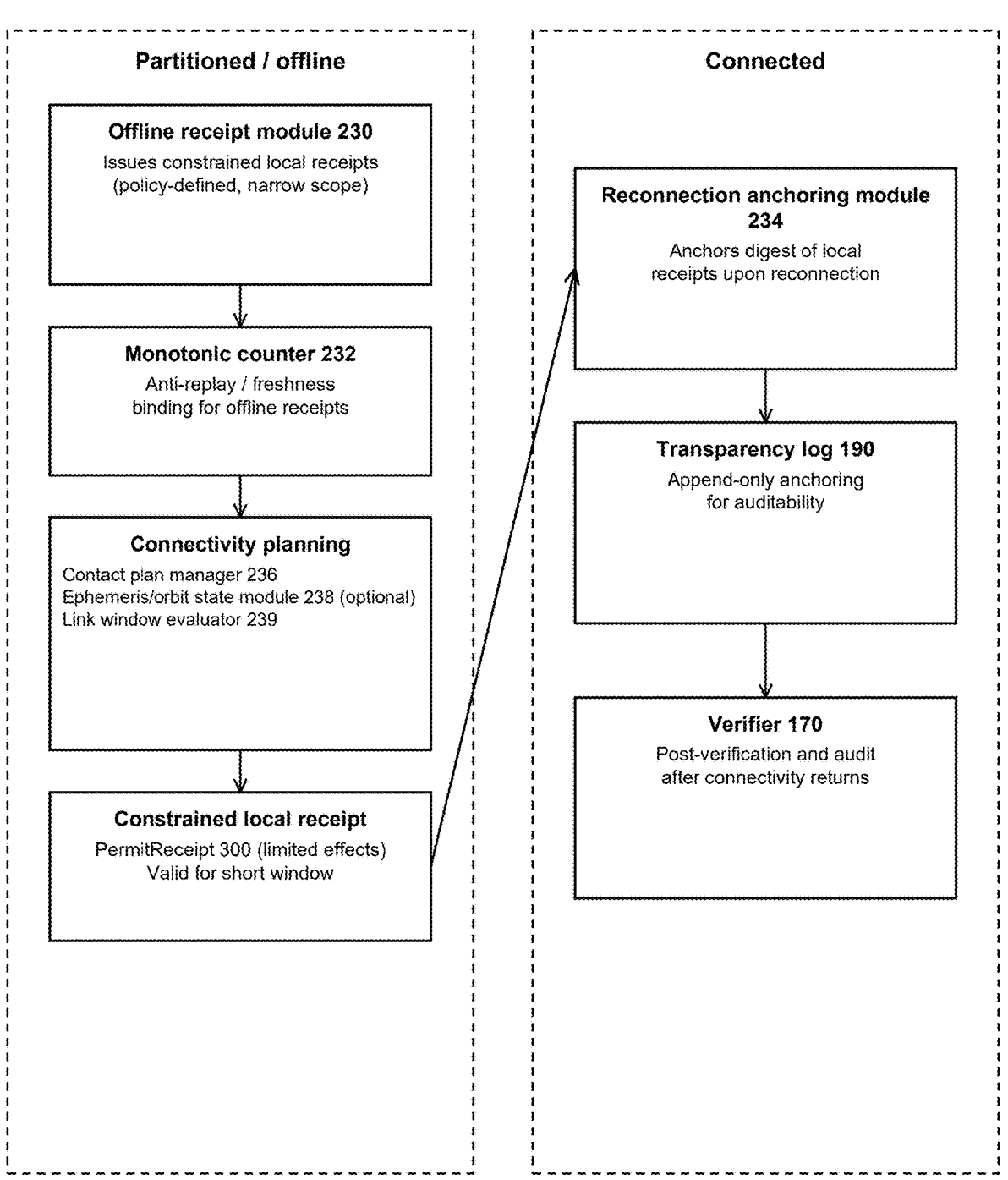
FIG. 6 illustrates delay/partition-tolerant operation including constrained offline receipts and reconnection anchoring.

FIG. 6 depicts delay/partition-tolerant operation in intermittently connected environments.

In some environments, authoritative verification data (e.g., revocation status, latest epoch, authority availability) may be temporarily unavailable. The system addresses this by enforcing conservative behavior.

In some embodiments, offline receipt module 230 may issue constrained local receipts using monotonic counter 232 and limited scopes defined by policy. Such receipts may be valid only for minimal effects, for short time windows, or for clearly bounded safety-critical operations.

In some embodiments, reconnection anchoring module 234 anchors a digest of local receipts to transparency log 190 upon reconnection, enabling auditability and post-verification without permitting unrestricted effects during partition.

In some embodiments, the default behavior remains fail-closed when required assurance cannot be achieved. Any offline allowances are policy-defined, narrow, and auditable, avoiding "fail-open" semantics.

H. Multi-Authority and Threshold Signatures (FIG. 7)

Figure 7:
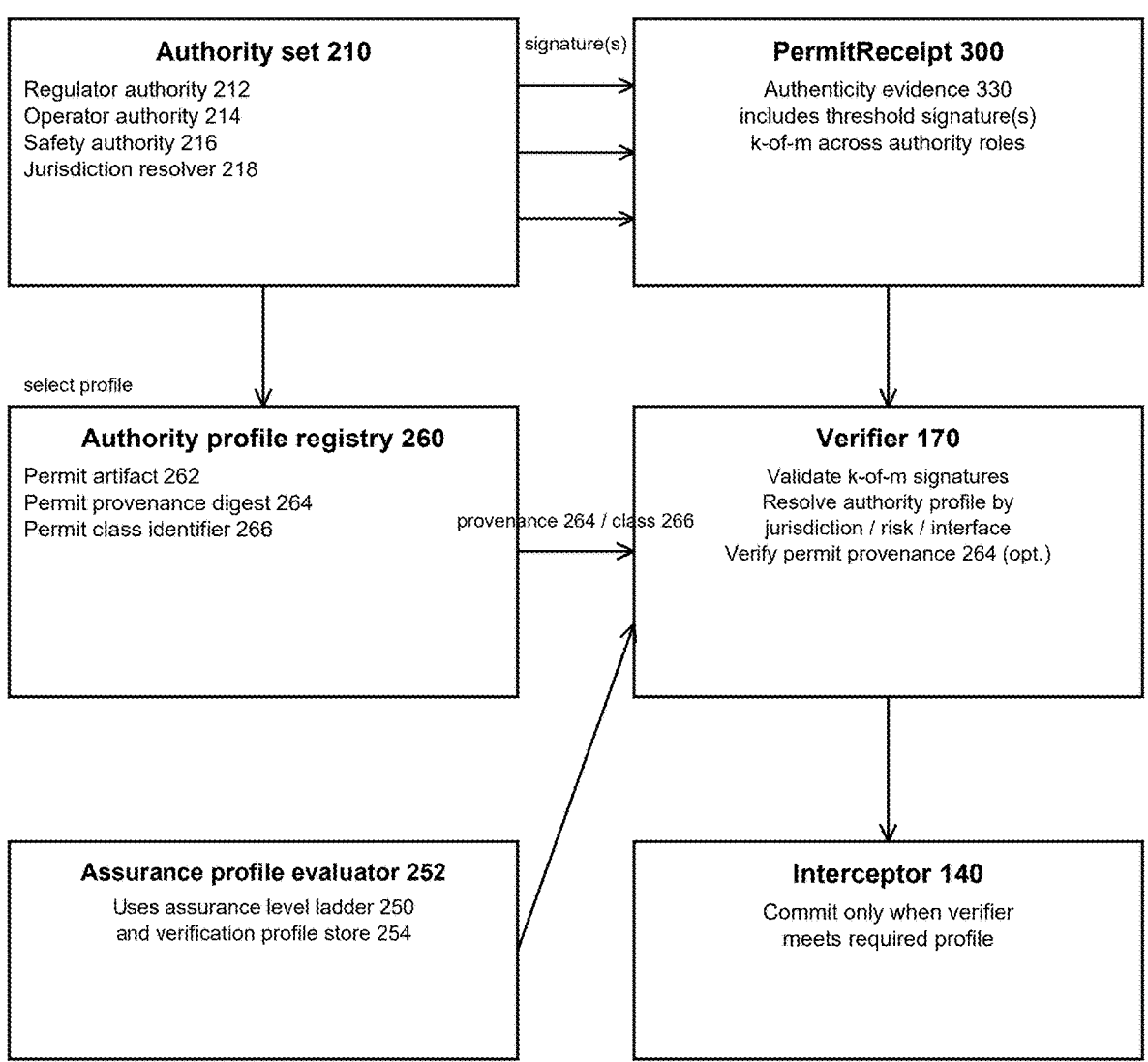
FIG. 7 illustrates multi-authority and threshold signature permit receipts, including jurisdictional and operational authority profiles.

FIG. 7 depicts authority set 210 including regulator authority 212, operator authority 214, and safety authority 216, resolved by jurisdiction resolver 218.

In some embodiments, a PermitReceipt record may require authorization from multiple authorities, such as a regulator authority for certain effect types, an operator authority for operational controls, and a safety authority for hazardous actions.

In some embodiments, PermitReceipt records include threshold signatures that require k-of-m signers across authority roles or issuers. This reduces single-issuer compromise risk and enables robust governance.

In some embodiments, the system selects an applicable authority profile based on jurisdiction, operational domain, risk class, or interface type. Authority selection rules are policy-controlled and may be updated as part of policy epoch changes.

I. Denial Reason Codes and Audit Records (FIG. 8)

Figure 8:
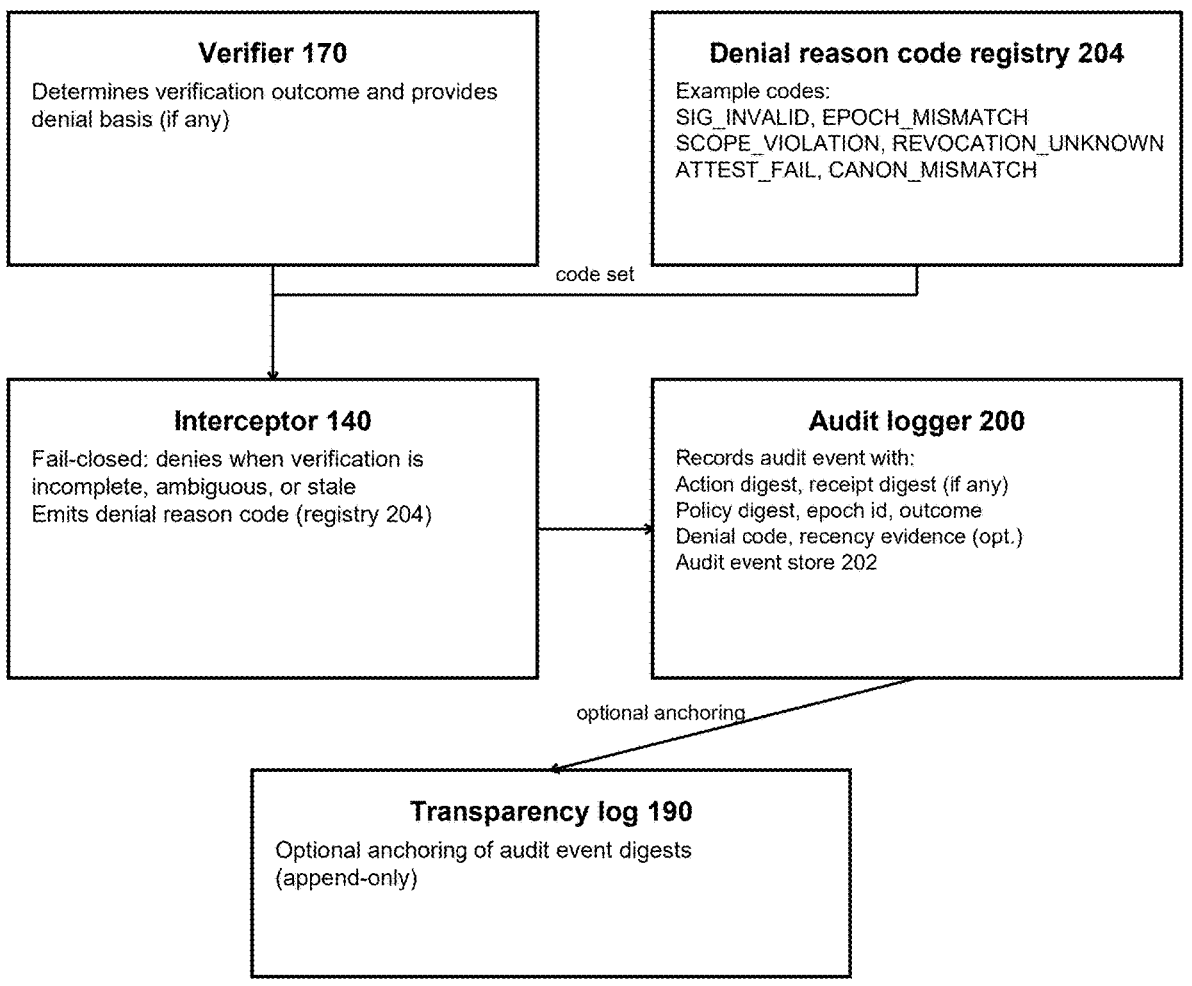
FIG. 8 illustrates denial reason code emission, audit event generation, and optional registries for interoperability.

FIG. 8 depicts denial reason code emission and audit event generation.

In some embodiments, upon denial, interceptor 140 emits a structured denial reason code selected from registry 204, including codes such as signature invalid, issuer untrusted, epoch mismatch, time invalid, identity binding mismatch (when required), purpose/use-case out of scope (when required), scope violation, revocation unknown, revocation confirmed, canonicalization mismatch, or attestation failure.

In some embodiments, audit logger 200 records an audit event including at least action digest, receipt digest (when available), policy digest, epoch identifier, verification outcome, denial reason code (if any), and optional recency evidence.

In some embodiments, audit events are anchored to an append-only audit structure to support insurance-grade and regulator-grade traceability.

J. Permit Provenance and Authority Profile Registry

In some embodiments, authorization is conditioned not only on policy terms, but also on verifiable permit provenance that commits to, references, or includes an authorization artifact issued by an authority distinct from the execution substrate, such as a regulator authority, operator authority, safety authority, or other designated issuer.

A permit receipt may include a permit provenance digest that cryptographically commits to a permit artifact, permit identifier, license token, authorization record, or other authorization artifact, and may further include a permit class identifier indicating a permission category or regulatory class applicable to the requested effect.

In some embodiments, the system maintains an authority profile registry that defines issuer identities, key material, signature requirements (including threshold signatures), jurisdictional applicability, and verification rules. The verifier selects an applicable authority profile based on at least one of jurisdiction, operational domain, interface type, effect type, or risk class.

Authority profile selection rules may be updated via policy epoch changes, and previously issued receipts may be invalidated upon authority profile updates or revocation events, thereby preventing stale authorization reuse.

Field names, formats, and specific jurisdiction mappings are illustrative and non-limiting; the core requirement is that the permit receipt be verifiably bound to applicable authority profiles and permit provenance constraints as a condition of effect commitment.

K. Assurance Level Profiles and Verification Recency

In some embodiments, verification is performed under a policy-defined assurance level profile that specifies required proofs, required authorities, and recency thresholds for the requested external effect. Assurance levels may be tiered (e.g., low, medium, high) and selected based on effect type or risk class.

A recency threshold may be expressed using timestamps, sequence numbers, signed checkpoints, leaf counts, monotonic counters, or other freshness evidence. The verifier denies commitment in a fail-closed manner when required recency evidence is unavailable, stale, or unverifiable.

In some embodiments, revocation staleness is treated as a denial condition. If revocation status for a receipt, issuer credential, authority profile, policy epoch, or required assurance evidence cannot be established to the required recency threshold, the interceptor denies commitment unless a narrowly scoped, explicitly authorized exception applies.

Assurance level profiles are illustrative and may be customized by deployments without limiting claim scope; the invention enforces that commitment is conditioned on meeting the selected profile under fail-closed defaults.

L. Dual Enforcement Using Capability Stamps

In some embodiments, non-bypassability is strengthened by dual enforcement in which the external interface also requires a capability stamp or capability token derived from successful permit receipt verification.

The interceptor may compute or obtain a capability token bound to at least one of the action digest, policy digest, epoch identifier, validity window, and anti-replay material, and the external interface verifier denies effect commitment if a valid capability token is absent or invalid.

Dual enforcement provides defense-in-depth such that bypassing the interceptor does not result in effect commitment, and the capability mechanism may be implemented in software, firmware, hardware, or combinations thereof without limiting claim scope.

In some embodiments, a capability token is audience-bound to a specific external interface verifier (and optionally a specific tenant, cluster, and/or region scope vector) and is single-use or nonce-bound, such that replay of a token to a different audience, a different scope vector, or outside a nonce/sequence constraint is denied (fail-closed). In some embodiments, the external-interface verifier validates that the token binds at least action digest, epoch identifier, audience identifier, and anti-replay material and denies commitment if any binding is missing, mismatched, stale, or unverifiable to the required assurance level.

In some embodiments, immediately prior to effect commitment, an external-interface verifier performs time-of-use revalidation by (i) validating a capability token and (ii) re-verifying, relative to a sufficiently fresh signed checkpoint (or signed head), that a receipt digest and/or decision receipt digest bound to the token is included in an append-only log state satisfying the applicable freshness bound; absent successful revalidation, the external effect is denied (fail-closed).

M. Verifier API Contracts and Conformance Artifacts

In some embodiments, interoperability and licensing are supported by defining a verifier API contract that specifies inputs, outputs, error semantics, and denial reason codes for receipt-conditioned authorization decisions.

A conformance test harness may evaluate whether an implementation preserves core semantics, including canonicalization stability, identity binding enforcement (when required), purpose/use-case constraints (when required), permit provenance checks, epoch binding, revocation recency handling, assurance evidence handling (when required), and fail-closed denial on verification failure.

Registries, schemas, authority profiles, and reason code taxonomies may be distributed as signed releases with version identifiers and integrity digests, enabling stable interoperability while allowing controlled evolution via policy epochs and change control rules.

The described conformance artifacts are illustrative and non-limiting; implementations may adopt different encodings and release mechanisms while preserving the disclosed semantics.

N. Compliance-Grade Operationalization and Regulatory Traceability

In some embodiments, the permit-before-commit architecture corresponds to a zero-trust authorization pattern in which verifier 170 operates as a policy decision point (PDP) that renders an authorization decision for a captured request, and interceptor 140 operates as a policy enforcement point (PEP) that enables, monitors, and terminates the request's passage across effect boundary 130 based on the verifier's decision and associated proof material (e.g., permit receipts, revocation proofs, and policy epoch bindings).

In some embodiments, the system provides record-keeping suitable for regulator-grade traceability by automatically recording, over a lifetime of a deployed system, events relevant to external-effect requests and authorization decisions, including at least action digest(s), receipt digest(s) (when available), policy digest(s), epoch identifier(s), verification outcomes, and denial reason code(s). In some embodiments, such records are maintained in a tamper-evident, append-only structure with policy-defined retention and query interfaces to support post-deployment monitoring, incident investigation, and audit reproducibility.

EvidencePack export (illustrative, non-limiting). In some embodiments, the system generates an exportable evidence package (EvidencePack) suitable for incident reporting, audit, procurement verification, insurance-grade review, and/or regulatory inquiry. In some embodiments, the EvidencePack is generated for at least one of (i) an ALLOW commitment, (ii) a DENY outcome, and (iii) an attempted commitment that results in an indeterminate or ambiguous verification state that is treated as DENY under fail-closed semantics.

EvidencePack contents (illustrative, non-limiting). In some embodiments, an EvidencePack commits to or includes at least: (i) one or more action_digest values (and/or canonical request representations), (ii) one or more permit receipt digests and/or DecisionReceipt digests, (iii) policy_digest and epoch_id values used for the decision, (iv) verification profile identifiers (authority profile and/or assurance level), (v) revocation and recency evidence identifiers (including, without limitation, signed checkpoint identifiers, inclusion/non-inclusion proof identifiers, revocation list or revocation event identifiers, and/or cross-log coherence observations), and (vi) structured denial or outcome reason codes with an evidence_ref pointer to the proof material underlying the outcome.

Tiered reporting and incremental completion (illustrative, non-limiting). In some embodiments, the EvidencePack supports a tiered reporting mode in which a minimal early-warning subset is produced first and a fuller EvidencePack is produced later as additional proof material becomes available, without relaxing fail-closed enforcement. In some embodiments, the early-warning subset commits to at least an action_digest, policy_digest and epoch_id, an outcome (ALLOW/DENY), and a reason code or reason class, plus references to missing or stale verification inputs.

Cryptographic sealing and anchoring (illustrative, non-limiting). In some embodiments, an EvidencePack is cryptographically sealed by a digital signature, multi-signature, or threshold signature and/or anchored to an append-only log by publishing a digest (EvidencePackDigest) and optionally a signed checkpoint reference, enabling independent verification that the EvidencePack has not been altered. In some embodiments, sealing and/or anchoring is performed under a policy-defined recency bound and is itself treated as a revocable input for policy-designated high-stakes environments.

Reproducible verification (illustrative, non-limiting). In some embodiments, an EvidencePack is structured as, or references, a conformance bundle sufficient for an independent party to reproduce the allow/deny outcome under a run-the-verifier procedure, including retrieving referenced signed registry releases, policy release manifests, and test vector or harness releases when applicable. In some embodiments, if the EvidencePack cannot be assembled to include required proof material for a designated reporting tier, the system emits an EvidencePack generation record indicating the missing material, without changing the enforcement outcome.

Non-limiting notice. The EvidencePack embodiments described herein are exemplary. Implementations may use different encodings, artifact structures, storage locations, and anchoring mechanisms while preserving the disclosed semantics: receipt-conditioned, permit-before-commit, fail-closed enforcement at effect boundaries, with machine-verifiable evidence sufficient for traceability and independent reproduction.

In some embodiments, revocation propagation is coupled to vulnerability and incident-response workflows such that one or more of: actively exploited vulnerability disclosure, severe incident detection, key compromise, safety incident, or regulatory notice triggers revocation of one or more of receipts, issuers, authority profiles, or assurance evidence associated with affected effect types, domains, products, or deployments. In some embodiments, the system denies commitment for affected requests until updated, non-revoked proof material is obtained to the assurance level required by policy.

In some embodiments, machine-verifiable assurance evidence used by assurance level profiles includes security and integrity posture artifacts associated with an execution substrate and its supply chain, including one or more of: signed release manifests, software bill of materials (SBOM) digests, build provenance digests, configuration or policy bundle digests, vulnerability remediation attestations, and model/system evaluation receipts (e.g., reliability, safety, bias, or risk summaries) computed over policy-defined windows. In some embodiments, such assurance evidence is bound to a policy epoch, is treated as a revocable input, and is evaluated for recency and authenticity as a condition of commitment under the selected assurance level.

In some embodiments, an external effect includes the release or presentation of AI-generated content, including text, audio, images, video, advertisements, recommendations, or decisions delivered to a user or downstream system. In some embodiments, scope constraints and/or authority profiles may require that such released content be accompanied by policy-specified disclosures, labels, watermarks, metadata, provenance claims, or other notices, and interceptor 140 denies commitment when required disclosure conditions cannot be satisfied to the assurance level required for the applicable effect type or risk class.

In some embodiments, an external effect further comprises an operation that changes, exports, imports, publishes, deploys, or otherwise makes available a model artifact associated with one or more AI models, including, without limitation, model weights, parameter deltas, adapters, prompts or system instructions, retrieval indexes, embeddings, safety filters, or other configuration artifacts that influence model behavior, and such operations are receipt-conditioned at the effect boundary as described herein.

In some embodiments, an external effect further comprises initiation, configuration, or execution of a model training, fine-tuning, distillation, reinforcement-learning, evaluation, or release pipeline, including, without limitation, selecting training data, hyperparameters, compute resources, and publication destinations for resulting model artifacts, and a permit receipt binds authorization to one or more digests and/or commitments of training data provenance, license constraints, consent artifacts, and/or evaluation results.

In some embodiments, scope constraints and/or authority profiles enforce data governance constraints for such pipeline and/or model-artifact operations, including, without limitation, one or more of purpose limitation, data residency constraints, retention limits, deletion or erasure workflows, and/or lawful basis identifiers or assertions encoded as machine-verifiable scope data and/or assurance evidence, and commitment is denied when required governance evidence cannot be verified to a required assurance level.

In some embodiments, dual enforcement is implemented in a distributed path in which interceptor 140 produces, upon successful verification, a capability token 272 bound to at least action digest, policy digest, epoch identifier, and validity window, and an external-interface verifier 274 at or within an egress gateway, dispatch service, message broker, storage service, or other recipient-side enforcement component rejects the request absent a valid capability token. This arrangement provides defense-in-depth by making effect commitment contingent on both local verification and recipient-side token verification, thereby reducing bypass risk even when alternate local code paths exist.

EXPANSION MODULES (8 MERGED, NON-LIMITING)

Each module below is drafted to broaden applicability while preserving the same core: receipt-conditioned, non-bypassable, permit-before-commit, fail-closed.

Module 1—Non-Terrestrial/Remote Deployments

In some embodiments, the effect boundary and enforcement components may be deployed in non-terrestrial environments, including orbital platforms, satellites, high-altitude platforms, remote edge compute, or other intermittently connected nodes. Such references are illustrative; the disclosed principles apply to any deployment where external effects must be controlled and auditable.

In some embodiments, such deployments include space-based compute facilities, solar-powered relay nodes, or other platforms in which computation, storage, and communications are performed at or near an orbital layer, and external effects include uplink/downlink transmission, crosslink relay, routing decisions, data access/retrieval, or data egress to terrestrial or non-terrestrial endpoints.

In some embodiments, jurisdiction context for an external effect is determined based on one or more of: platform location, selected ground station, selected relay chain, link path, service region, customer context, or data sensitivity class, and the permit receipt commits to a jurisdiction context digest used for authority profile selection and constraint enforcement.

In some embodiments, assurance profiles incorporate contact-plan-aware recency requirements for revocation and epoch updates in delay-tolerant environments, and the interceptor denies or constrains effects when required freshness cannot be met during an available contact window.

In some embodiments, dual enforcement is implemented at a communications interface, modem, driver, or link-layer gateway such that a capability token derived from successful verification is required to transmit, access, retrieve, or release data, reducing bypass risk even when alternate execution paths exist.

Module 2—Energy/Resource Budget Receipts

In some embodiments, PermitReceipt records include an energy/resource budget binding, such as a budget proof 242 representing a permitted energy, thermal, compute, bandwidth, or duty-cycle envelope, and energy/resource budget module 240 enforces denial when the request exceeds an authorized envelope.

In some embodiments, budgets are treated as scope constraints and are epoch-bound, revocable, and auditable like other authorization fields.

In some embodiments, budgets include cumulative budgets enforced over a policy-defined window, including non-limiting examples such as cumulative bandwidth egress, cumulative query/disclosure volume, cumulative actuation duty-cycle, or cumulative spend/transaction limits. In some embodiments, the interceptor maintains or verifies a budget ledger state (or a digest thereof) as a revocable verification input bound to a policy epoch, and denies commitment when a requested effect would exceed remaining budget, when ledger state is stale/ambiguous, or when required recency/consistency of budget state cannot be established (fail-closed).

Covert-channel and residual disclosure budgeting (illustrative, non-limiting). In some embodiments, policy-defined budgets and scope constraints include limits on residual disclosure risk, including limits on query patterns, output channel capacity, timing granularity, or other measurable characteristics that may constitute a covert channel or inference channel. In some embodiments, the interceptor denies commitment (fail-closed) when a request would exceed an authorized residual-risk budget or when required measurement of such characteristics is unavailable or ambiguous under the applicable policy epoch and assurance level profile.

Module 3—Regulatory License Proof Integration (Permit Provenance)

In some embodiments, PermitReceipt records include or reference proofs of regulatory permission, such as a permit identifier, license token, authorization artifact digest, or signed approval record. The system verifies provenance and validity before effect commitment.

Such proofs may be issued by regulator authority 212, operator authority 214, safety authority 216, or combinations thereof, depending on jurisdiction and risk class.

Module 4—Delay/Partition-Tolerant Assurance Levels

In some embodiments, the system defines assurance levels for verification requirements based on effect type and risk class. For higher-risk effects, stronger or more recent proofs are required; for lower-risk effects, policy may allow limited operation under constrained proofs, always preserving auditable fail-closed behavior when proofs are insufficient.

Module 5—Cross-Domain Policy Epoch Synchronization

In some embodiments, multiple policy epochs exist across domains (e.g., operational, safety, legal, contractual). The system may bind PermitReceipt records to multiple epochs and deny commitment if cross-epoch consistency rules are violated.

In some embodiments, epoch binding includes a composite epoch digest that cryptographically commits to all required policy digests and versions.

Module 6—Expanded Effect Boundaries (Tokens, Tools, Network, Data, Actuation)

In some embodiments, external-effect requests include token release to an external sink, tool invocation, network transmission, data access/retrieval, data release, configuration change, scheduling decisions, or actuator commands. The system controls commitment across these boundaries using the same receipt-conditioned logic.

In some embodiments, external-effect requests further include inter-agent message transmission, protocol or representation negotiation, credential or account provisioning, capability delegation or transfer (including marketplace-mediated exchange), and update or self-modification operations that change executable code, configuration, plugins, models, policies, or other artifacts that affect future behavior of an execution substrate or authorized external effects.

Module 7—Non-Bypassability Enforcement Patterns

In some embodiments, non-bypassability is achieved by placement of interceptor 140 in a privileged path, such as kernel, hypervisor, network stack, device driver, message bus, service mesh sidecar, API gateway, policy-enforced proxy, retrieval gateway, or hardware boundary, such that alternate paths do not exist or are cryptographically prevented.

In some embodiments, the interceptor is measured and verified at boot or runtime to detect tampering or bypass attempts, optionally using attestation verifier 178.

Module 8—Standardization and Registries to Support Interoperability

In some embodiments, the system defines interoperability registries for denial reason codes, receipt schemas, canonicalization rules, identity binding rules (when required), purpose/use-case identifiers (when required), and authority profiles, enabling consistent integration across vendors and domains.

Such registries facilitate adoption as a compliance rail and support interoperability establishing stable interfaces while preserving policy-controlled evolution via epochs and signed releases.

OPTIONAL TRUSTED COMPUTE BOUNDARIES AND ATTESTATION

In some embodiments, all or part of interceptor 140, verifier 170, and receipt handler 160 operate within trusted compute boundary 220, such as TEE 222, hardware security module (HSM) 224, or deterministic audited sandbox 226.

In some embodiments, PermitReceipt records incorporate boundary measurements (e.g., code hash, configuration digest) enabling verification that enforcement executes in an approved environment.

Attestation features are optional and non-limiting; the core invention is compatible with software-only implementations.

NON-LIMITING NOTICE

The embodiments described herein are illustrative and not limiting. The described components may be combined, rearranged, or split. Field names, formats, cryptographic schemes, and deployment topologies may vary while preserving the core semantics: non-bypassable, permit-before-commit enforcement with verifiable permit receipts bound to policy epochs and revocation, defaulting to fail-closed denial when verification is insufficient.

Appendix overview (illustrative, non-limiting). The appendices that follow provide exemplary, non-limiting implementation detail, schemas, registries, conformance artifacts, and procurement checklists that facilitate interoperability, auditability, and licensing without limiting claim scope. The appendices may be used in whole or in part, and their components may be combined, rearranged, or omitted while preserving the core semantics described herein.

Unless expressly stated otherwise herein, the field names, ordering, encodings (e.g., JSON/CBOR/ASN.1), cryptographic primitives, signature schemes, hash algorithms, and governance workflows described in the appendices are provided as exemplary, non-limiting examples. Any normative terms (e.g., MUST, SHALL, REQUIRED) appearing in the appendices are used solely to describe exemplary conformance and/or interoperability examples and are not intended to, and should not be construed to, require any particular implementation or to limit the scope of the claims.

APPENDICES

Appendix A—Glossary of Terms (Non-Limiting)

[AppA-0001] Action Digest: A digest computed over a canonical representation of an external-effect request, enabling stable matching against a permit receipt.

[AppA-0002] Allowability Catalog: A catalog enumerating extension artifacts (or other governed artifacts) that are eligible for installation, enabling, loading, invocation, or update under applicable governance rules; the catalog may be distributed as a signed snapshot.

[AppA-0003] Anti-Replay Material: A nonce, monotonic counter, sequence number, or other mechanism used to prevent reuse of authorization artifacts.

[AppA-0003A] Authenticity Evidence: Evidence enabling verification of authenticity of a permit receipt or related artifact, including, without limitation, one or more digital signatures, multi-signatures, threshold signatures, certificate-chain material, key identifiers, signature metadata, and/or attestation evidence.

[AppA-0004] Assurance Evidence: Machine-verifiable evidence reflecting model and/or system posture relevant to an assurance level (e.g., evaluated accuracy/reliability attestations, vulnerability assessment digests, bias/risk assessment summaries, or safety test outcome digests), optionally bound to a policy epoch and treated as revocable verification inputs.

[AppA-0005] Assurance Level: A policy-defined verification strength requirement (e.g., required recency, required authorities, required proofs) for a given effect type/risk class.

[AppA-0006] Assurance Level Profile: A policy-defined verification profile specifying required proofs, required authorities, recency thresholds, and optional assurance evidence requirements for a requested effect.

[AppA-0007] Authorization Scope: A subset or view of "Scope" used for an authorization decision (e.g., interface/target/action/rate/budget/jurisdiction/identity/purpose constraints), optionally encoded in or committed by a permit receipt.

[AppA-0008] Authority Profile: A policy-defined set of issuers, keys, signature requirements (including threshold signatures), and jurisdictional rules used to validate permit receipts.

[AppA-0009] Authority Profile Registry: A registry of authority profiles defining issuers, keys, signature requirements, required proofs, and recency thresholds for verification.

[AppA-0010] Build Recipe: A build specification (commands, parameters, dependencies, environment constraints) sufficient to reproduce an artifact from a referenced source revision. [AppA-0011] Build Transcript: Machine-verifiable build output, logs, metadata, and/or attestations evidencing how an artifact was built, optionally bound to a rebuilt digest and/or an artifact digest.

[AppA-0012] Builder Reputation Signal: A signal used to evaluate builder trust, including non-limiting examples such as historical signing behavior, reproducibility outcomes, incident history, vulnerability response latency, or third-party builder attestations.

[AppA-0013] Builder Trust Status: A status evaluated for a builder or build system, optionally comprising a builder reputation signal and a requirement that artifact-signing operations occur within a hardware security boundary.

[AppA-0014] Capability Delegation/Transfer: A conveyance, delegation, assignment, lease, or other transfer of a capability, permission, token, or authorization scope from one principal or agent to another, including marketplace-mediated exchange.

[AppA-0015] Capability Token/Capability Stamp: A token derived from successful verification and required by an external interface to commit an effect, strengthening non-bypassability.

[AppA-0016] Canonical Request Representation: A deterministic, normalized representation of an external-effect request produced by canonicalization, suitable for stable digest computation and verification.

[AppA-0017] Canonicalization: A deterministic transformation that produces a stable representation of a request or receipt so that equivalent inputs yield identical digests.

[AppA-0018] Canonicalization Profile: An identifier, version, or digest of deterministic canonicalization rules used to compute action digests and/or receipt digests.

[AppA-0019] Catalog Authority Plane: A control plane (or logically centralized governance component) that manages catalog state, publisher tiers, policy packs, commercial schedules, signing keys, revocation, and/or release governance for artifacts.

[AppA-0020] Commit/Commitment: The act of allowing an external-effect request to cross the effect boundary and take effect at an external interface.

[AppA-0021] Commit Capsule: An authorization capsule cryptographically bound to an operation digest and encoding enforceable bounds (e.g., time/freshness, destination, tool, rate, blast-radius, scope, or audience bounds) for an agentic operation.

[AppA-0022] Commitment Verification Procedure: A procedure for verifying that a computed digest corresponds to, matches, or verifies against a cryptographic commitment, including non-limiting examples such as equality to a committed digest value and/or verification under a commitment scheme.

[AppA-0023] Conformance Badge: A machine-verifiable, signed artifact that commits to an implementation identity and to conformance evidence (e.g., harness version, test vector corpus digest, signed release manifest digest, supported profiles), suitable for procurement and audit workflows.

[AppA-0024] Conformance Bundle: A package of machine-verifiable artifacts sufficient for an independent verifier to reproduce an allow/deny decision and/or a conformance result, including referenced snapshots/manifests and associated commitments.

[AppA-0025] Conformance Test Harness: A test harness configured to execute conformance vectors and verify expected outcomes, producing machine-verifiable results suitable for procurement records.

[AppA-0025A] Consistency Proof: A proof that two signed checkpoints (or two append-only log states) are consistent, including non-limiting examples such as a Merkle consistency proof demonstrating that a later checkpoint is an append-only extension of an earlier checkpoint (i.e., no deletion or rewrite), thereby supporting anti-rollback, monotonicity, and cross-source coherence evaluation. The specific proof format and cryptographic scheme are illustrative and may vary without limiting claim scope.

[AppA-0026] Constrained Mode (Policy-Controlled): A policy-controlled mode permitting narrowly scoped operation when some verification inputs are unavailable, while preserving fail-closed denial outside the constrained scope and recording auditable evidence.

[AppA-0027] Contact Plan: A schedule or set of predicted or authorized connectivity windows or link opportunities used to obtain verification inputs or to determine whether freshness requirements can be satisfied in delay-tolerant environments.

[AppA-0027A] Link-Window Identifier: An identifier representing a scheduled or authorized communication/contact window or link opportunity, including, without limitation, a start time, end time, duration, link or channel identifier, ground station identifier, relay path identifier, and/or a window-specific digest or token, used to evaluate freshness/recency requirements in intermittently connected or delay-tolerant environments.

[AppA-0028] Critical Enforcement Set: A set of required enforcement points for a particular scope segment (e.g., per tenant/cluster/region tuple) that must satisfy policy-defined propagation/acknowledgment requirements; failure to satisfy requirements results in deny-by-default for affected operations.

[AppA-0029] Cross-Log Coherence Requirement: A policy-defined requirement for evaluating whether signed checkpoints from multiple append-only logs operated by distinct entities are mutually consistent for purposes of verification (e.g., revocation, epoch, and/or registry-release verification). In non-limiting examples, coherence may be established by quorum agreement over a committed state digest across logs, satisfaction of monotonicity or anti-rollback constraints over checkpoint sequence and/or recency values, and/or absence of conflicts between committed revocation, epoch, or registry-release state digests required by policy. The specific predicates, thresholds, encodings, and log topologies are illustrative and may vary without limiting claim scope.

[AppA-0030] Data Access/Retrieval: An external effect in which information is accessed, retrieved, or ingested via an interface (e.g., database query endpoints, retrieval gateways, file/object read APIs, RAG fetch interfaces, or API fetches), thereby disclosing information to an execution substrate or expanding inferential capability.

[AppA-0031] Denial Reason Code: A structured code indicating why a request was denied (e.g., epoch mismatch, signature invalid, revoked).

[AppA-0032] Dependency Substitution Defense: A defense that denies an operation when a resolved dependency differs from a dependency graph committed by an SBOM, manifest, or other committed dependency declaration.

[AppA-0033] Directive Candidate: An action-bearing representation derived from inbound content (e.g., inferred instruction, plan step, tool invocation, or workflow step) that is not authorized for execution absent an explicit elevation/promotion decision.

[AppA-0034] Effect Boundary: A boundary between an execution substrate and an external interface across which external effects are committed.

[AppA-0035] Emergency Revocation: A high-priority revocation that invalidates one or more of keys, identities, digests, policy packs, entitlements, or catalog state, evaluated as a revocable input with policy-defined recency and fail-closed semantics.

[AppA-0036] Entitlement Scope Vector: An ordered tuple used to scope entitlements, comprising one or more of organization identifier, environment identifier, tenant identifier, cluster identifier, and region identifier; mismatches or ambiguity may be treated as deny-by-default.

[AppA-0037] Entitlement Token/Entitlement Ledger State: An entitlement representation used to authorize installation/enabling/update operations, optionally cryptographically bound to scope and subject to revocation and recency constraints.

[AppA-0038] Evidence Object: A machine-checkable record committing to inputs, decisions, and bases for a controlled event (e.g., promotion/elevation outcomes, supply-chain gating outcomes), optionally including structured reason codes.

[AppA-0038A] EvidencePack: An exportable, machine-verifiable evidence package suitable for incident reporting, audit, procurement verification, insurance-grade review, and/or regulatory inquiry. In some embodiments, an EvidencePack commits to or includes at least: (i) one or more action_digest values and/or canonical request representations, (ii) one or more PermitReceipt digest(s) and/or DecisionReceipt digest(s), (iii) policy_digest and epoch_id values used for the decision, (iv) verification profile identifier(s) (authority profile and/or assurance level), (v) revocation and recency evidence identifiers (including, without limitation, signed checkpoint identifiers and inclusion/non-inclusion proof identifiers), and (vi) structured outcome and/or denial reason code(s) with evidence_ref pointers to supporting proof artifacts. In some embodiments, an EvidencePack is cryptographically sealed (e.g., signed, multi-signed, or threshold-signed) and/or anchored to an append-only log via an EvidencePackDigest, enabling independent verification of integrity and reproduction of the allow/deny outcome under a run-the-verifier procedure. The specific encodings, artifact boundaries, and anchoring mechanisms are illustrative and non-limiting.

[AppA-0039] Execution Substrate: A runtime or control plane that produces external-effect requests, including non-limiting examples such as an AI model runtime, an agent runtime, and/or a scheduler/job controller.

[AppA-0040] External Interface: An interface through which an external effect may be committed, including non-limiting examples such as network transmit, data egress, data-access/retrieval interfaces, privileged APIs, inter-agent message buses, marketplaces, and update/modification channels.

[AppA-0041] External-Effect Request: A request that would cause an external effect, such as transmission, data access/retrieval, data release, configuration change, resource scheduling, or actuation.

[AppA-0042] Fail-Closed: A default behavior in which insufficient or failed verification results in denial of commitment.

[AppA-0043] Governance Frame: A selected snapshot of rules applicable to a domain, destination class, tool category, data class, jurisdiction, tenant context, and/or risk tier, used to adjudicate promotion/elevation decisions.

[AppA-0044] Ground Station: A terrestrial or other relay endpoint that provides an external interface for uplink/downlink or relay of communications and may implicate jurisdictional constraints.

[AppA-0045] Hardware-Backed Signing Requirement: A requirement that an artifact-signing operation be attested as occurring within a hardware security boundary, optionally bound to an artifact digest and evaluated under policy.

[AppA-0046] Hardware Security Boundary: A boundary that protects key operations, including non-limiting examples such as an HSM, TEE, secure enclave, TPM, or hardware-backed keystore.

[AppA-0047] Identity Binding: A cryptographic binding within a receipt core that commits to one or more identity contexts (e.g., requester identity digest, workload/agent identity, session identifier, toolchain identity digest) such that authorization may be evaluated as originating from an expected identity context; missing, unverifiable, or mismatched identity binding may be treated as a denial condition under a selected assurance level profile.

[AppA-0048] Inclusion Proof: A proof that a given digest is included in an append-only log state represented by a signed checkpoint. In some embodiments, proof material evaluated relative to a signed checkpoint may include an inclusion proof and/or a non-inclusion (absence) proof, see also [AppA-0055A] Non-Inclusion Proof.

[AppA-0049] Independent Rebuilder: A rebuilder associated with a distinct administrative domain that performs a reproducible-build challenge and produces a rebuilt digest and/or a build transcript or attestation.

[AppA-0050] Inter-Agent Communication Interface: An interface that mediates communications between agent runtimes or between an agent runtime and another principal, including message buses, shared workspaces, relay services, or protocol negotiation endpoints, through which an external effect of information transfer may be committed.

[AppA-0051] Inter-Satellite Link: A communication interface between non-terrestrial nodes used to relay data or commands and that may affect jurisdiction context or route constraints.

[AppA-0052] Interceptor: A component positioned at an effect boundary that captures and controls external-effect requests.

[AppA-0052A] Issuer Credential: A credential associated with an issuer whose authenticity evidence is evaluated, including, without limitation, a certificate, certificate chain, public key, key identifier, signing credential, or attestation key material used to verify a digital signature or attestation evidence, and which may be subject to revocation and recency requirements.

[AppA-0053] Jurisdiction Context Digest: A digest committing to a jurisdictional context used for authority profile selection or constraint enforcement, such as a jurisdiction identifier set, geospatial region, ground station identifier, link path identifier, or time-of-overpass evidence.

[AppA-0053A] Geospatial-Time Digest: A cryptographic digest or other commitment that commits to a geospatial context and a time context, including, without limitation, one or more coordinates, geofenced region identifiers, location assertions, time-of-overpass values, time intervals, and/or signed time checkpoints, used to support jurisdiction context binding, route constraints, and/or link-window constraints.

[AppA-0054] Jurisdiction Resolver: A component or policy rule that selects applicable authority profiles based on jurisdiction or domain.

[AppA-0055] Non-Bypassable: Architecturally arranged such that external-effect requests cannot reach the external interface without traversing the interceptor.

[AppA-0055A] Non-Inclusion Proof: A proof that a given digest, identifier, or entry is not included in an append-only log state represented by a signed checkpoint, including non-limiting examples such as (i) a non-inclusion proof in a sparse Merkle structure, (ii) an absence proof relative to a committed set, and/or (iii) a verifier-evaluable proof that a revocation set does not contain a specified receipt digest or issuer credential at a checkpoint. The specific proof format and cryptographic scheme are illustrative and may vary without limiting claim scope.

[AppA-0056] Operation Digest: A digest computed over a canonicalized authorized operation specification (e.g., tool identifier and canonical arguments), such that materially different operations yield different digests.

[AppA-0057] Origin Tags: Machine-parseable provenance fields associated with content, directives, or operations, including non-limiting examples such as connector id, sender id, message id, document locator, transport headers, session id, or source attestation.

[AppA-0058] Permit Artifact: A regulator-issued, operator-issued, or authority-issued authorization record (or reference thereto) evidencing permission for an effect or class of effects.

[AppA-0059] Permit Class Identifier: An identifier indicating a permission category or regulatory class applicable to a requested effect.

[AppA-0060] Permit Provenance Digest: A cryptographic commitment to a permit artifact, approval record, license token, or authorization identifier associated with a permit receipt. [AppA-0061] Permit Receipt: A verifiable record authorizing a request under specified policy, epoch, validity, and scope constraints, including authenticity evidence.

[AppA-0062] Policy Digest: A digest identifying a policy or compiled policy terms applicable to authorization decisions.

[AppA-0063] Policy Epoch: A versioned policy state that can be updated and to which authorization artifacts are bound to prevent stale reuse.

[AppA-0064] Procurement Checklist: A mapping from procurement requirements to machine-verifiable evidence and verification steps (e.g., badge signature verification, digest matching, run-the-verifier execution), provided as non-limiting examples.

[AppA-0064A] ProvenanceCredential: A machine-verifiable provenance artifact that provides cryptographic evidence about origin, transformation, and/or custody of a subject payload (e.g., an AI-generated output, a derived claim set, an evidence bundle, or a released content object). In some embodiments, a ProvenanceCredential includes or commits to at least: (i) a subject identifier and/or subject digest (e.g., output_digest), (ii) an issuer identity and authenticity evidence (e.g., digital signature or threshold signature), (iii) one or more provenance assertions (e.g., generation context, transformation steps, or custody chain) expressed in a machine-checkable form, and (iv) optional policy_digest and/or epoch_id bindings indicating the policy context under which the provenance is intended to be relied upon. In some embodiments, a ProvenanceCredential is revocable and is evaluated for status and recency as a verification input under an assurance level profile; unknown, stale, conflicting, or unverifiable status may be treated as a denial condition (fail-closed) for policy-designated effect types or risk classes. The specific provenance format or standard, if any, is illustrative and non-limiting.

[AppA-0065] Purpose Binding/Use-Case Identifier: A scope constraint or identifier that restricts authorized effects to an approved purpose or use-case class; in some embodiments, purpose binding is enforced as a denial condition when missing, unverifiable, or outside authorized scope under a selected assurance level profile.

[AppA-0066] Quorum Propagation Requirement: A policy-defined threshold requirement for acknowledgments from enforcement points (optionally per critical enforcement set segment) within an SLA propagation window.

[AppA-0067] Recency Value: A timestamp, sequence number, or leaf count bound to a checkpoint or proof indicating freshness.

[AppA-0068] Rebuild Quorum Policy: A policy requiring that at least N out of M independent rebuilders produce rebuilt digests matching an artifact digest committed in a signed catalog snapshot.

[AppA-0069] Registry Steward: One or more entities authorized by policy or governance rules to publish, sign, update, deprecate, or revoke registry releases (e.g., authority profiles, canonicalization registries, reason code registries, or test vector corpora).

[AppA-0070] Representation Class/Codec/Protocol Class: An identifier or class defining permitted message representations, encodings, codecs, or protocols for communications, optionally enforced as a scope constraint for authorization.

[AppA-0071] Reproducible-Build Challenge: A challenge that rebuilds an artifact from committed source revision and build recipe and compares the rebuilt digest to a committed artifact digest, with deny-by-default on mismatch.

[AppA-0072] Revocation: Invalidation or suspension of a receipt, permit, issuer credential, key, authority profile, assurance evidence, or epoch, optionally bounded by time/scope.

[AppA-0073] Revocation Acknowledgment: A signed acknowledgment from an enforcement point indicating receipt of revocation information, usable to evaluate policy-defined propagation and quorum requirements.

[AppA-0074] Route Provenance: Evidence or a digest committing to a path, relay chain, or routing context for an external-effect request, enabling enforcement of route- or relay-specific constraints.

[AppA-0075] Run-the-Verifier Procedure: A reproducible procedure for independently verifying behavior or conformance (e.g., running a conformance harness against a signed test vector corpus and validating signatures and digests), suitable for procurement records.

[AppA-0076] SLA Propagation Window: A policy-defined maximum time within which revocation information must be propagated and acknowledged by required enforcement points.

[AppA-0077] SLA Revalidation Deadline: A deadline requiring revalidation of previously installed/enabled artifacts following revocation events; failure to revalidate may trigger quarantine, disablement, or deny-by-default.

[AppA-0078] Scope: A set of constraints defining what effects are authorized (interfaces, targets, budgets, rate limits, action types, jurisdictions, identities, purposes/use-cases).

[AppA-0079] Self-Modification Operation: An operation that modifies executable code, configuration, plugins/extensions, models, policies, or other artifacts that affect future behavior of an execution substrate or authorized external effects.

[AppA-0080] Signed Catalog Snapshot: A signed snapshot of an allowability catalog committing to artifact digests and metadata, evaluated for authenticity, recency, and revocation.

[AppA-0081] Signed Checkpoint: A signed commitment to an append-only log state, typically including a recency value.

[AppA-0082] Signed Release Manifest/Registry Release Manifest: A signed manifest committing to the contents and digests of a released registry, policy pack, or test vector corpus; releases may be governed by one or more registry stewards.

[AppA-0083] Software Bill of Materials (SBOM): A machine-readable inventory of components and dependencies of an artifact, optionally including transitive dependency identifiers and risk indicators, used for verification and policy enforcement.

[AppA-0084] Test Vector Corpus: A published set of conformance test vectors and expected outcomes, optionally distributed with a signed release manifest to enable reproducible verification.

[AppA-0085] Threshold Signature: A signature scheme requiring k-of-m participants to produce a valid signature.

[AppA-0086] Taint/Taint Propagation: Labels and propagation rules used to track influence of untrusted content through intermediate artifacts, enabling deny-by-default when taint reaches effect-relevant fields under policy.

[AppA-0087] Tier Commercial Schedule: A schedule governing commercial terms and entitlements for publishers or artifacts (e.g., per-organization/per-environment/per-tenant/per-cluster/per-region entitlements), optionally producing entitlement tokens or ledger state.

[AppA-0088] Tier Policy Pack: A policy pack associated with a publisher tier that specifies capability bounds and verification requirements for artifacts, optionally distributed as a signed release and treated as revocable input.

[AppA-0089] Transparency Log: An append-only log that provides verifiable commitments and proofs for inclusion and state.

[AppA-0090] Trust Tags: Labels describing authority, taint, and/or non-authoritativeness of content, optionally including taint labels and trust-gradient scores that may be propagated.

[AppA-0091] Transitive Dependency Lock: A lock that denies installation/enabling/loading/update when any transitive dependency referenced by an SBOM or manifest fails integrity verification or lacks required commitments.

[AppA-0092] Update/Modification Channel: An interface or mechanism used to deliver or apply updates or modifications, including plugin marketplaces, package registries, configuration management endpoints, or code update services, treated as an external interface for authorization purposes.

[AppA-0093] Verifier API Contract: A contract specifying verifier inputs, outputs, and error/denial semantics, optionally used with conformance harnesses and signed test vectors for procurement-grade validation.

[AppA-0094] DecisionReceipt: A machine-verifiable record representing an allow/deny outcome for an external-effect request, optionally digitally signed, and cryptographically bound to one or more of an action digest, a policy digest, an epoch identifier, a verification profile identifier (e.g., authority/assurance level), an outcome (ALLOW or DENY), an optional denial reason code, and optional recency observations. In some embodiments, a downstream enforcement component requires a valid DecisionReceipt, or a capability token derived from or bound to the DecisionReceipt, as a condition of effect commitment.

[AppA-0095] Preflight Verification: A non-committing verification procedure that evaluates whether an external-effect request would be authorized under a selected authority profile and/or assurance level without committing the external effect. In non-limiting examples, preflight returns an ALLOW or DENY projection and identifies missing, stale, conflicting, or unverifiable verification inputs (e.g., revocation status, recency evidence, cross-log coherence status), and/or requests re-issuance of a permit receipt under a current policy epoch. Preflight does not relax fail-closed enforcement semantics.

[AppA-0096] Verification Cache: A bounded cache that stores verification results and/or associated evidence for reducing repeated verification cost, keyed by at least an action digest and an epoch identifier and optionally by a verification profile identifier and/or a receipt digest. Cache entries are time-bounded and are invalidated upon one or more of: epoch changes, revocation events, registry release changes, cross-log coherence uncertainty, or a policy-defined maximum age for cached evidence. In some embodiments, cached results are treated as unusable when required recency, revocation status, or cross-log coherence cannot be established with sufficient confidence.

[AppA-0097] Zero-Knowledge Authorization Proof: A privacy-preserving proof demonstrating satisfaction of one or more authorization predicates without revealing an underlying permit artifact in full. In non-limiting examples, such a proof comprises a selective-disclosure proof and/or a zero-knowledge proof that proves one or more of: validity of a permit class identifier, satisfaction of a scope predicate over one or more canonical request fields, membership or allowability of an authorization identifier under a policy-defined rule, and/or satisfaction of a recency or epoch-compatibility predicate, verified as part of receipt verification when required by a selected authority profile and/or assurance level profile.

[AppA-0098] Batch Verification: Verification performed over multiple permit receipts and/or associated proof material using batch or aggregate techniques while preserving per-request fail-closed semantics. In non-limiting examples, batch verification includes batch signature verification and/or aggregated signature validation for multiple receipts and validation of Merkle multiproofs or batched inclusion/non-inclusion proofs against signed checkpoints; failures, ambiguity, or inability to attribute results to a specific request may be treated as failed verification for affected requests.

[AppA-0099] Policy Release Manifest: A signed manifest committing to a compiled policy bundle digest and an epoch identifier (and optionally activation constraints) used for controlled policy/epoch activation.

[AppA-0100] Policy Activation Receipt: A signed artifact committing to activation of an epoch and one or more required change-control evidence digests (e.g., approvals and/or regression verification results).

[AppA-0101] Policy Change Proposal Digest: A digest committing to a prior policy digest and a candidate policy digest and optionally a policy diff digest describing a change.

[AppA-0102] Policy Regression Verification Evidence: Signed results committing to a conformance harness identity/version and a test vector corpus digest (and/or release manifest digest) and indicating outcomes used as activation constraints.

[AppA-0103] Policy Diff Digest: A digest committing to a structured difference between a prior policy state and a candidate policy state.

[AppA-0104] Propagation Quorum Requirement (Policy Update): A policy-defined quorum requirement over signed acknowledgments that required enforcement points have adopted an epoch within a policy-defined window.

[AppA-0105] AssuranceEvidenceReceipt: A machine-verifiable, signed receipt committing to an evaluation outcome or a result digest for a subject (e.g., model/runtime/deployment), optionally bound to a policy epoch and treated as a revocable verification input.

[AppA-0106] Assurance Evidence Bundle Digest: A digest committing to one or more assurance evidence receipts and/or structured results used to satisfy an assurance level profile.

[AppA-0107] Output Release Interface: An interface that delivers AI-generated content to a user or downstream system and is treated as an external interface for authorization purposes.

[AppA-0108] Output Digest: A digest computed over a canonical representation of an output payload intended for release.

[AppA-0109] Claim Digest: A digest computed over a canonical representation of an asserted claim extracted from an output payload.

[AppA-0110] Claim-Set Digest: A digest committing to a set of claim digests and/or to a canonical claim-set representation.

[AppA-0111] Evidence Bundle Digest (Claim-Check): A digest committing to one or more sources, retrieved passages, documents, records, or measurements used to support claims.

[AppA-0112] ClaimCheckReceipt: A machine-verifiable, signed receipt committing to claim-set and/or output digests and an evidence bundle digest and indicating satisfaction of grounding/disclosure predicates under a policy epoch.

[AppA-0113] Grounding Predicate: A policy-defined predicate describing when an output is sufficiently supported (e.g., citation coverage, allowed sources, conflict checks, uncertainty labels).

[AppA-0114] DisclosureNoticeSet: A policy-specified set of disclosures, labels, metadata fields, watermarks, provenance references, and/or other notices required for an output release external effect under a given effect type, destination class, jurisdiction context, and/or risk class. In some embodiments, a DisclosureNoticeSet is represented by an identifier and/or a digest (DisclosureNoticeSetDigest) and is treated as a scope constraint and/or authorization predicate evaluated under a policy epoch and an assurance level profile. In some embodiments, output release is denied (fail-closed) when the required DisclosureNoticeSet cannot be satisfied, cannot be validated to required assurance, or is stale or ambiguous relative to the applicable policy epoch. DisclosureNoticeSet may be referred to as "Disclosure Notice Set" without limiting scope.

[AppA-0115] Lawful Basis Identifier: A policy-defined identifier, code, or assertion representing a lawful basis and/or authorization basis for a governed data processing or model-related operation, including, without limitation, a consent basis, contract basis, legal obligation basis, vital interests basis, public task basis, or legitimate interests basis, and which may be encoded as machine-verifiable scope data and/or assurance evidence.

[AppA-0116] Model Artifact: An artifact associated with one or more artificial intelligence models that influences or configures model behavior, including, without limitation, model weights, parameter deltas, adapters, prompts or system instructions, retrieval indexes, embeddings, safety filters, configuration artifacts, and/or associated metadata, and which may be subject to receipt-conditioned, permit-before-commit enforcement at an effect boundary.

[AppA-0117] Training Pipeline: An initiation, configuration, execution, evaluation, or release workflow for training, fine-tuning, distillation, reinforcement learning, or otherwise producing or modifying a model artifact, including, without limitation, selecting training data, hyperparameters, compute resources, evaluation procedures, and/or publication destinations, and which may be subject to receipt-conditioned, permit-before-commit enforcement at an effect boundary.

[AppA-0118] CryptoSuiteProfile: A cryptographic suite identifier or profile that specifies one or more algorithms, parameter sets, and/or key types used for signatures, commitments, proofs, and/or verification, and that may be enforced under a policy epoch and authority/assurance profiles, with fail-closed denial when disallowed or unverifiable.

[AppA-0119] Cryptographic Agility Rule: A policy-defined rule that determines whether a receipt's cryptographic suite is permitted for a requested effect type or risk class, including rules for deprecation, required hybrid verification, and transition handling.

[AppA-0120] Hybrid Signature: Authenticity evidence that includes at least one classical signature component and at least one post-quantum signature component, evaluated under a policy-defined verification requirement.

[AppA-0121] WorkflowDigest: A digest computed over a canonical representation of a multi-step workflow, plan, or job graph, optionally committing to step operations, dependencies, and bounds.

[AppA-0122] Bundle Receipt: A PermitReceipt variant that commits to multiple permitted action digests and/or canonical requests (e.g., via a Merkle root), enabling inclusion-proof authorization for a requested action.

[AppA-0123] Witness Service: A logically and administratively distinct component that produces machine-verifiable witness authenticity evidence (e.g., signature or threshold signature) bound to a DecisionReceipt and/or EvidencePackDigest, enabling independent verification of integrity and timing.

Appendix B—PermitReceipt Schema (Illustrative; Non-Limiting)

[AppB-0001] Non-limiting notice: This schema is illustrative for interoperability and does not limit claim scope. Field names/ordering/encodings may vary.

```
{
  "receipt_core": {
    "policy_digest": "hex-or-b64",
    "epoch_id": "string-or-int",
    "valid_from": "timestamp-or-seq",
    "valid_to": "timestamp-or-seq",
    "action_digest": "hex-or-b64",
    "identity_binding": {
      "requester_identity_digest": "optional",
      "workload_identity": "optional",
      "session_id": "optional",
      "toolchain_identity_digest": "optional"
    },
    "scope": {
      "interface_id": "string",
      "action_type": "string",
      "target_id": "string",
      "purpose_id": "optional",
      "rate_limit": "optional",
      "max_effect_budget": "optional",
      "jurisdiction": "optional",
      "channel_id": "optional",
      "protocol_id": "optional",
      "representation_class_id": "optional",
      "delegation_constraints": "optional",
      "self_mod_type": "optional",
      "update_channel_id": "optional"
    },
    "anti_replay": {
      "nonce": "optional",
      "monotonic_counter": "optional",
      "sequence_number": "optional"
    },
    "optional_budgets": {
      "energy_budget_digest": "optional",
      "thermal_budget_digest": "optional"
    },
    "context_binding": {
      "jurisdiction_context_digest": "optional",
      "ground_station_id": "optional",
      "link_path_id": "optional",
      "geospatial_time_digest": "optional"
    }
  },
  "verification_profile": {
    "authority_profile_id": "optional",
    "assurance_level_id": "optional",
    "canonicalization_profile_ref": "optional",
    "permit_class_id": "optional"
  },
  "assurance_evidence": {
```

-continued

```
      "model_eval_receipt_digest": "optional",
      "vulnerability_assessment_digest": "optional",
      "bias_risk_assessment_digest": "optional",
      "safety_test_outcome_digest": "optional",
      "evidence_recency": "optional"
  },
  "permit_provenance": {
      "permit_artifact_ref": "optional",
      "permit_provenance_digest": "optional"
  },
  "capability_token": {
      "required_by_interface": "optional",
      "token": "optional",
      "token_binding_fields": "optional"
  },
  "authenticity": {
      "issuer_id": "string",
      "signature": "sig",
      "threshold_signature": "optional",
      "issuer_chain": "optional"
  },
  "revocation": {
      "status_proof": "optional",
      "revocation_list_ref": "optional",
      "revocation_log_proof": "optional"
  },
  "transparency_anchor": {
      "receipt_digest": "optional",
      "evidence_pack_digest": "optional",
      "inclusion_proof": "optional",
      "signed_checkpoint": "optional"
  }
}
```

[AppB-0002] ClaimCheckReceipt mini-schema (illustrative; non-limiting). When output release is treated as an external effect, a ClaimCheckReceipt may be represented as:

```
{
  "policy_digest": "hex-or-b64", "epoch_id": "string-or-int",
  "valid_to": "timestamp-or-seq", "output_digest": "hex-or-b64", "claim_set_digest": "optional",
  "evidence_bundle_digest": "hex-or-b64", "disclosure_notice_set_digest": "optional",
  "provenance_credential_digest": "optional", "grounding_predicate_ref": "optional",
  "authenticity": {"issuer_id": "string", "signature": "sig"}
}
```

Appendix C—Denial Reason Code Registry (IANA-Style)

[AppC-0001] Non-limiting notice: This registry is illustrative and does not limit scope. Codes may be strings, integers, or structured objects.

[AppC-0002] Registry Governance (Illustrative):

New codes require a signed release by registry steward(s). Codes are immutable once assigned; deprecated codes remain reserved.

A "MUST fail-closed" subset may be designated for critical violations.

[AppC-0003] Example Codes:

DRC-001: SIGNATURE_INVALID
DRC-002: ISSUER_UNTRUSTED
DRC-003: EPOCH_MISMATCH
DRC-004: VALIDITY_WINDOW_EXPIRED
DRC-005: SCOPE_VIOLATION
DRC-006: ANTI_REPLAY_FAILURE
DRC-007: REVOKED_CONFIRMED
DRC-008: REVOCATION_UNKNOWN_OR_STALE
DRC-009: CANONICALIZATION_MISMATCH
DRC-010: TRANSPARENCY_PROOF_INVALID
DRC-011: ATTESTATION_FAILURE

DRC-012: BUDGET_CONSTRAINT_NOT_SATIS-FIED

DRC-013: AUTHORITY_PROFILE_SELECTION_FAILED

DRC-014: ASSURANCE_PROFILE_NOT_SATISFIED

DRC-015: PERMIT_PROVENANCE_INVALID_OR_MISSING

DRC-016: CANONICALIZATION_PROFILE_MIS-MATCH

DRC-017: CAPABILITY_TOKEN_INVALID_OR_MISSING

DRC-018: BYPASS_OR_TAMPER_SIGNAL_DE-TECTED

DRC-019: JURISDICTION_CONTEXT_INDETERMI-NATE_OR_CONFLICT

DRC-020: GEOFENCE_OR_ROUTE_CONSTRAINT_VIOLATION

DRC-021: CONTACT_PLAN_OR_LINK_WINDOW_EXPIRED

DRC-022: TIME_SOURCE_UNTRUSTED_OR_DRIFT

DRC-023: ROUTE_PROVENANCE_MISMATCH

DRC-024: REPRESENTATION_CLASS_VIOLATION

DRC-025: PROTOCOL_NEGOTIATION_UNAU-THORIZED

DRC-026: CAPABILITY_DELEGATION_NOT_AU-THORIZED

DRC-027: SELF_MODIFICATION_NOT_AUTHO-RIZED

DRC-028: IDENTITY_BINDING_MISMATCH

DRC-029: WORKLOAD_IDENTITY_UNVERIFIED

DRC-030: PURPOSE_OUT_OF_SCOPE_OR_MISS-ING

DRC-044: CROSS_LOG_COHERENCE_NOT_SATIS-FIED

A policy-defined cross-log coherence requirement is not satisfied, including non-limiting examples such as quorum not achieved across required log check-points for a required state digest, monotonicity/anti-rollback violations in checkpoint sequence or recency values, and/or conflicts between required revocation/epoch/registry-release state digests across logs

DRC-045: CLAIM_CHECK_REQUIRED_BUT_MISS-ING

DRC-046: CLAIM_CHECK_EVIDENCE_STALE_OR_UNVERIFIABLE

DRC-047: CLAIM_CHECK_CONFLICT_DETECTED

DRC-048: CITATION_OR_EVIDENCE_OUT_OF_SCOPE

DRC-049: REQUIRED_DISCLOSURE_MISSING_OR_INVALID

DRC-050: ASSURANCE_EVIDENCE_REQUIRED_BUT_MISSING

DRC-051: ASSURANCE_EVIDENCE_STALE_OR_REVOKED_OR_UNVERIFIABLE

DRC-052: ASSURANCE_EVIDENCE_QUORUM_NOT_SATISFIED

[AppC-0004] Procurement-critical codes (illustrative; MUST fail-closed subset). In some embodiments, implementations supporting multi-tenant isolation, remote attestation recency, key-release gating, and anti-rollback may emit additional denial reason codes. These codes are illustrative and do not limit scope DRC-031: TENANT_MISMATCH (MUST fail-closed)—The resolved tenant context for the requested effect does not match a tenant binding in the Permi-tReceipt, a capability token, a key-release token, and/or an applicable authority/assurance profile; denial prevents cross-tenant effects and tenant confusion attacks DRC-032: EPOCH_ROLLBACK_ATTEMPT (MUST fail-closed)—A PermitReceipt, attestation input, checkpoint, or policy reference indicates a policy epoch lower than a policy-defined minimum epoch, indicates rollback beyond tolerance, and/or indicates split-brain epoch inconsistency; denial prevents rollback to permissive enforcement states DRC-033: KEY_RELEASE_DENIED (MUST fail-closed)—A key custodian (KMS/HSM or equivalent) denies release of key material and/or denies a key operation because required proof is missing, stale, ambiguous, out-of-scope, revoked, or unverifiable, including where an assurance profile requires attestation binding and such binding cannot be verified DRC-034: ATTESTATION_STALE (MUST fail-closed)—Attestation evidence fails a freshness or recency requirement required by an assurance profile, including non-limiting examples such as nonce mismatch, signed checkpoint age beyond threshold, monotonic counter regression, and/or time drift beyond bounds; denial prevents replay and stale-environment execution

[AppC-0005] Agentic promotion and extensibility supply-chain codes (illustrative; MUST fail-closed subset). In some embodiments, implementations supporting directive elevation, extension installation/update governance, and emergency revocation SLAs may emit additional denial reason codes. These codes are illustrative and do not limit claim scope DRC-035: PROMOTION_NOT_AUTHORIZED (MUST fail-closed)—A directive candidate or candidate instruction is not eligible for elevation under applicable origin/trust tags, governance-frame rules, or promotion policy DRC-036: PROMOTION_STEP_UP_NOT_SATISFIED (MUST fail-closed)—A required step-up prerequisite (user confirmation, cryptographic approval, or N-of-M approval) for promotion and/or a high-risk operation is missing, invalid, revoked, or out of window DRC-037: ENTITLEMENT_SCOPE_MISMA-TCH_OR_MISSING (MUST fail-closed)—An entitlement token or ledger state does not cover the required entitlement scope vector (org/env/tenant/cluster/region) for a requested installation, enablement, load, or update operation DRC-038: ENTITLEMENT_TOKEN_INVALID_OR_EXPIRED (MUST fail-closed)—An entitlement token is invalid, expired, revoked, or unverifiable to the assurance level required by policy DRC-039: REVOCATION_ACK_MISSING_OR_IN-VALID (MUST fail-closed)—Required signed acknowledgments of emergency revocation receipt from enforcement points are missing, invalid, stale, or inconsistent with policy-defined requirements DRC-040: REVOCATION_QUORUM_NOT_ACHIEVED (MUST fail-closed)—A quorum propagation requirement is not satisfied for a critical enforcement set within an SLA propagation window, resulting in default-deny posture DRC-041: REBUILD_QUORUM_NOT_ACHIEVED (MUST fail-closed)—An N-of-M independent rebuilder policy fails to reach quorum matching a catalog-committed artifact digest for a required reproducible-build challenge DRC-042: REBUILD DIGEST_MISMATCH (MUST fail-closed)—A rebuilt digest produced during a reproducible-build challenge does not match an artifact digest committed by a signed catalog snapshot.

DRC-043: CRITICAL_ENFORCEMENT_SET_UNSATISFIED (MUST fail-closed)—The system cannot enumerate, reach, or satisfy required enforcement points for a resolved scope vector (tenant/cluster/region) and therefore denies high-risk operations by default.

Appendix D—Revocation Record & Propagation (Illustrative)

[AppD-0001] Revocation may target: (i) receipt digests, (ii) permit identifiers, (iii) issuer keys, (iv) policy epochs, (v) authority profiles, (vi) assurance evidence, or (vii) scope segments.

[AppD-0002] Revocation propagation may be implemented by push, pull, transparency-log anchoring, and/or security-operations-triggered revocation events.

[AppD-0003] Fail-closed rule: If revocation status cannot be verified to a policy-defined recency threshold for the requested effect type, commitment is denied unless a narrow policy exception applies.

Appendix E—Offline/Delay-Tolerant Receipts (Illustrative)

[AppE-0001] Offline receipts, when permitted, MUST be narrowly scoped, short-lived, anti-replay protected, and auditable.

[AppE-0002] Upon reconnection, receipts may be anchored by publishing a digest to an append-only log and recording an audit event linking the offline decision to later anchoring.

Appendix F—Multi-Authority & Threshold Signature Profiles (Illustrative)

[AppF-0001] A PermitReceipt may require signatures from multiple authority roles.

[AppF-0002] Profiles may be selected based on jurisdiction, domain, interface type, or risk class.

[AppF-0003] Threshold signatures may be used to reduce single-issuer compromise and to enforce separation of duties.

Appendix G—Canonicalization & Digest Rules (Illustrative)

[AppG-0001] Canonicalization may be applied to: action parameters, request envelopes, receipt fields, identity bindings (when present), and audit records.

[AppG-0002] Canonicalization rules SHOULD be deterministic and stable, enabling equivalent semantic requests to produce identical action digests.

[AppG-0003] Receipt digests may be computed over a canonical receipt representation to support anchoring and inclusion proofs.

[AppG-0004] In some embodiments, a canonicalization rule set is selected from a canonicalization registry distributed as a signed release manifest, and verifiers deny commitment when a referenced canonicalization profile or registry release cannot be verified to the assurance level required by policy.

Appendix H—Compliance/Audit Mapping Template (Illustrative)

[AppH-0001] The following mapping template is provided to support regulator/insurance/enterprise audit integration and does not limit claim scope:

Effect Type→Risk Class→Purpose/Use-Case (optional) →Required Assurance Level→Required Authorities- →Required Proofs (incl. assurance evidence when required)→Recency Threshold→Denial Code on Failure

[AppH-0002] Implementations may adopt different scoring systems, labels, or workflows, provided the core fail-closed, receipt-conditioned semantics are preserved.

Appendix I—Authority Profile Registry (Schema+Governance) (TEXT DROP)

[AppI-0001] Non-limiting notice. This Appendix I provides an illustrative Authority Profile Registry for interoperability and does not limit claim scope. Profiles, fields, naming, ordering, encoding, and governance mechanisms may vary, provided that receipt-conditioned, permit-before-commit, fail-closed enforcement semantics are preserved.

[AppI-0002] Purpose. Authority profiles define jurisdiction- and domain-aware verification rules used by a verifier to validate permit receipts, including issuer identities, signature requirements (including threshold signatures), required proofs, recency thresholds, revocation endpoints, and optional transparency-log requirements.

[AppI-0003] Registry governance (illustrative).

[AppI-0003a] Signed releases. Authority profiles may be published as signed releases (e.g., versioned manifests) by one or more registry stewards.

[AppI-0003b] Immutability. Once published, a profile identifier may be immutable; superseding changes may be published under a new version identifier.

[AppI-0003c] Deprecation. Deprecated profiles may remain available for audit reproducibility while being disallowed for new commitments.

[AppI-0003d] Separation of duties. Releases may require multi-party approval (e.g., k-of-m) and may be jurisdiction- or risk-class specific.

[AppI-0003e] Security posture. Compromise or suspected compromise of issuer keys, profile stewards, or revocation channels may trigger emergency profile revocation, causing fail-closed denial for affected commitments unless a narrowly scoped safe mode applies.

[AppI-0004] Authority profile schema (illustrative). Implementations may represent an authority profile as a structured object such as JSON/CBOR/ASN.1. An illustrative JSON form is shown below:

```
{
  "authority_profile_id": "string",
  "profile_version": "string-or-int",
  "jurisdictions": ["string"],
  "operational_domains": ["string"],
  "effect_types": ["string"],
  "risk_classes": ["string"],
  "issuer_set": [
    {
      "issuer_id": "string",
      "issuer_role": "regulator|operator|safety|other",
      "public_keys": ["keyref-or-jwk"],
      "cert_chain_ref": "optional",
      "revocation_ref": "optional"
    }
  ],
  "signature_requirements": {
    "mode": "single|multi|threshold",
    "k": 1,
    "m": 1,
    "allowed_algorithms": ["string"]
  },
  "required_proofs": {
    "permit_provenance_required": true,
    "revocation_required": true,
    "revocation_recency_required": true,
    "transparency_anchor_required": false,
    "attestation_required": false,
    "offline_receipts_allowed": false
  },
  "recency_thresholds": {
```

-continued

```
    "revocation_max_age_seconds": 3600,
    "checkpoint_max_age_seconds": 3600
  },
  "transparency_logs": [
    {
      "log_id": "string",
      "operator": "string",
      "checkpoint_keyref": "optional",
      "consistency_proof_required": "optional"
    }
  ],
  "canonicalization_profile_ref": "string",
  "assurance_level_ref": "string",
  "capability_token_profile": {
    "required": false,
    "token_binding_fields": ["action_digest", "policy_digest", "epoch_
    id", "validity"]
  },
  "safe_mode_policy_ref": "optional",
  "notes": "optional"
}
```

[AppI-0005] Authority profile selection (illustrative).

[AppI-0005a] The verifier may select an authority profile based on one or more of: jurisdiction identifier, operational domain identifier, effect type, interface type, target identifier, risk class, policy epoch, and/or permit class identifier.

[AppI-0005b] If no authority profile can be selected with sufficient confidence, the verifier denies commitment (fail-closed) unless an explicitly authorized, narrowly scoped exception applies.

[AppI-0006] Signed release manifest (illustrative). Authority profiles may be distributed with a signed release manifest containing version identifiers and integrity digests.

```
  {
    "release_id":
    "string",
    "released_at": "timestamp",
    "registry_type": "authority_profiles",
    "registry_version": "string",
    "entries_digest": "hex-or-b64",
    "signatures": [
      {"signer_id": "string", "sig": "sig", "role": "stew-
        ard|auditor|other"}
    ],
    "threshold": {"k": 2, "m": 3},
    "revocation_ref": "optional"
  }
```

[AppI-0007] Non-limiting notice. The schema and governance above are exemplary; implementations may use different encodings, identifiers, trust models, or distribution mechanisms while preserving the disclosed enforcement semantics.

[AppI-0008] Multi-log transparency (illustrative). In some embodiments, the verifier evaluates inclusion proofs relative to signed checkpoints of multiple append-only logs operated by distinct entities and denies commitment when required proof material (e.g., one or more signed checkpoints and corresponding inclusion proofs) is missing, invalid, stale beyond a policy-defined threshold, or when a policy-defined cross-log coherence requirement is not satisfied.

[AppI-0008A] Cross-log coherence (illustrative). In some embodiments, when verification relies on two or more append-only logs operated by distinct entities, the verifier enforces a policy-defined cross-log coherence requirement for one or more of: revocation state, policy-epoch state, and/or registry-release state. In non-limiting examples, coherence evaluation may include quorum agreement on a required state digest across logs, anti-rollback or monotonicity checks over checkpoint sequence/recency values, and denial when required digests conflict or cannot be established with sufficient confidence; such rules are policy-controlled and preserve fail-closed semantics.

Appendix J—Assurance Level Ladder+Mapping Table (TEXT DROP)

[AppJ-0001] Non-limiting notice. This Appendix J provides an illustrative Assurance Level Ladder and mapping template for interoperability and does not limit claim scope. Implementations may adopt different ladders, thresholds, or labels while preserving fail-closed, receipt-conditioned enforcement semantics.

[AppJ-0002] Purpose. Assurance levels define verification strength requirements for a requested external effect, including required authorities, required proofs, optional assurance evidence requirements, and recency thresholds.

[AppJ-0003] Illustrative assurance ladder (AL0-AL5).

[AppJ-0003a] AL0 (Minimal): Signature validity+time window+action digest match. (No revocation guarantee; typically suitable only for explicitly low-risk effects if permitted by policy.)

[AppJ-0003b] AL1 (Baseline): AL0+anti-replay validation+policy epoch binding.

[AppJ-0003c] AL2 (Revocation-aware): AL1+revocation status verified from a signed revocation list or signed revocation event record.

[AppJ-0003d] AL3 (Recency-bound): AL2+recency thresholds enforced (e.g., checkpoint/list max age), with revocation unknown/stale=deny.

[AppJ-0003e] AL4 (Multi-authority): AL3+multi-authority approval (multi-signature or threshold signature) based on authority profiles and jurisdiction/domain rules.

[AppJ-0003f] AL5 (High assurance/defense-in-depth): AL4+optional transparency anchoring and/or attested enforcement boundary; may additionally require dual enforcement (capability token) at the external interface; may additionally require assurance evidence per effect type or risk class.

[AppJ-0004] Mapping table template (illustrative).

Effect Type→Risk Class→Assurance Level→Required Authorities→Required Proofs (incl. assurance evidence when required)→Recency Threshold→Denial Code on Failure

[AppJ-0005] Example mapping rows (illustrative, non-limiting).

[AppJ-0005a] NETWORK TRANSMIT→HIGH→AL4→{operator, safety}→{revocation, recency, anti-replay, epoch}→revocation_max_age=3600s→DRC-008/DRC-003.

[AppJ-0005b] DATA_EGRESS→HIGH→AL5→{operator,safety,regulator (optional)}→{revocation, recency, epoch, transparency (optional), capability_token (optional),assurance_evidence (optional)}→checkpoint_max_age-600s→DRC-010/DRC-008

[AppJ-0005c] DATA_ACCESS/RETRIEVAL→HIGH→AL4/AL5→{operator,safety, (regulator optional)}→{revocation,recency,epoch, permit_provenance,assurance_evidence (optional)}→revocation_max_age=3600s→DRC-008/DRC-015

[AppJ-0005d] PRIVILEGED_API_CHANGE→ME-DIUM→AL3→
{operator}→{revocation, recency, epoch}→revocation_max_age=3600s→DRC-008

[AppJ-0005e] ACTUATION/EFFECTOR→HIGH→AL5→{operator, safety}→{revocation,recency, epoch, attestation (optional), capability_token (optional), assurance_evidence(o ptional)}→checkpoint_max_age=300s→DRC-011/DRC-008.

[AppJ-0005f] MODEL_OUTPUT_RELEASE→ME-DIUM→AL2/AL3→{operator}→{revocation (optional for AL2),epoch, anti-replay}→list_max_age-7200s→DRC-007/DRC-003

[AppJ-0005g] INTER_AGENT_MESSAGE→HIGH→AL4→{operator, safety}→{revocation, recency, anti-replay, epoch, representation_class (optional)}→revocation_max_age-3600s→DRC-024/DRC-025/DRC-008

[AppJ-0005 h] CAPABILITY_TRANSFER→HIGH→AL5→{operator, safety,regulator (optional)}→{revocation,recency,epoch, anti-replay, transparency (optional), capability_token (optional)}→checkpoint_max_age-600s→DRC-026/DRC-008

[AppJ-0005i] SELF_MODIFICATION→HIGH→AL5→{operator, safety}→{revocation,recency,epoch,attestation (optional), transparency (optional), capability_token (optional)}->checkpoint_max_age=300s→DRC-027/DRC-008

[AppJ-0006] Fail-closed rule (illustrative). If required proofs, required assurance evidence (when required), or required recency cannot be satisfied for the selected assurance level, the interceptor denies commitment unless a narrowly scoped exception is explicitly authorized by policy.

[AppJ-0007] Non-limiting notice. The ladder, rows, effect types, and thresholds above are exemplary; alternative ladders and mappings may be used without limiting claim scope.

Appendix K—Verifier API Contract+Conformance Test Vectors (TEXT DROP)

[AppK-0001] Non-limiting notice. This Appendix K provides an illustrative Verifier API and Conformance/Test Vector format for interoperability and does not limit claim scope. Implementations may use different APIs, encodings, or test frameworks while preserving core semantics.

[AppK-0002] Purpose. A verifier API contract enables consistent integration of receipt-conditioned authorization across vendors and deployments, supporting licensing and standardization without limiting claim scope.

[AppK-0003] Illustrative verifier API. The verifier may expose an interface such as:

```
Verify(
    canonical_request,      // or raw request + canonicalization profile ref
    permit_receipt,
    authority_profile_id,
    assurance_level_id,
    context        // optional: time, jurisdiction, interface id, risk class,
purpose, identity bindings, etc.
) -> VerifyResult
```

[AppK-0004] Illustrative VerifyResult schema.

```
{
    "decision": "ALLOW|DENY",
    "denial_reason_code": "optional",
```

-continued

```
"evidence_digests": {
    "action_digest": "hex-or-b64",
    "receipt_digest": "optional",
    "policy_digest": "hex-or-b64",
    "epoch_id": "string-or-int",
    "revocation_evidence_digest": "optional",
    "checkpoint_digest": "optional",
    "assurance_evidence_digest": "optional"
},
"assurance_level_id": "string",
"authority_profile_id": "string",
"recency_observations": {
    "revocation_age_seconds": "optional",
    "checkpoint_age_seconds": "optional"
}
}
```

[AppK-0005] Fail-closed semantics (contract).

[AppK-0005a] The verifier returns DENY when verification is incomplete, ambiguous, stale beyond threshold, or otherwise fails to meet the selected assurance level.

[AppK-0005b] "Unknown revocation status" or "stale recency evidence" is treated as a denial condition when required by the selected assurance level.

[AppK-0006] Conformance test harness (illustrative).

[AppK-0006A] A test harness may validate deterministic canonicalization, digest stability, epoch binding, anti-replay enforcement, identity binding handling (when present/required), purpose constraint handling (when present/required), revocation handling (including staleness), and denial reason code selection.

[AppK-0006B] A conforming implementation must deny commitment under specified negative tests, preserving fail-closed semantics.

[AppK-0006C] Cross-log coherence conformance (illustrative). In some embodiments, the conformance corpus includes negative vectors that exercise failure of a policy-defined cross-log coherence requirement, including without limitation (i) quorum not achieved across required log checkpoints for a state digest, (ii) anti-rollback/monotonicity violations in checkpoint sequence or recency values, and/or (iii) conflicts between required revocation/epoch/registry state digests across logs, each expected to produce a fail-closed DENY outcome with an appropriate denial reason code.

[AppK-0007] Test vector corpus format (illustrative).

```
{
    "vector_id": "string",
    "canonicalization_profile_ref": "string",
    "authority_profile_id": "string",
    "assurance_level_id": "string",
    "request": {
        "raw": "optional",
        "canonical": "object-or-bytes"
    },
    "expected": {
        "decision": "ALLOW|DENY",
        "denial_reason_code": "optional"
    },
    "permit_receipt": "object-or-bytes",
    "environment": {
        "now": "timestamp",
        "jurisdiction": "optional",
        "risk_class": "optional",
        "purpose_id": "optional"
    }
}
```

[AppK-0008] Signed test vector release manifest (illustrative).

```
{
```

49

-continued

```
"release_id": "string",
"released_at": "timestamp",
"registry_type": "test_vectors",
"registry_version": "string",
"vectors_digest": "hex-or-b64",
"signatures": [
    { "signer_id": "string", "sig": "sig", "role": "steward|auditor|other" }
],
"threshold": { "k": 2, "m": 3 }
}
```

[AppK-0009] Non-limiting notice. The API, schemas, and manifests above are exemplary and may be adapted; conformance requires preservation of receipt-conditioned, permit-before-commit, fail-closed semantics under policy-defined assurance profiles.

[AppK-0010] Procurement-grade negative vector subset (illustrative). In some embodiments, implementers publish a signed subset of negative conformance vectors that exercise multi-tenant isolation, anti-rollback epoch handling, remote attestation freshness/recency enforcement, and key-release gating. The vectors below are illustrative and do not limit scope.

[AppK-0011] Notes (illustrative). (i) Vector IDs and profile IDs are non-limiting placeholders; (ii) expected denial reason codes reference Appendix C; (iii) implementations may encode receipts/tokens in different formats while preserving the fail-closed outcomes; (iv) the harness may treat these vectors as a minimal "procurement checklist" subset and output a reproducible summary; and (v) any example digests, subset digests, or per-vector digests shown herein are illustrative and non-binding, and implementers and independent verifiers MUST recompute such digests from the published vector corpus and its signed release manifest (or other published canonicalization rules) used by the verification procedure.

[AppK-0011A] Expected outputs snapshot (illustrative; non-limiting). The following is an illustrative, procurement-grade quick-check mapping for the negative vector subset. Implementations may vary in formatting while preserving expected decisions and denial reason codes.

Vector ID|Expected decision|Denial reason code
—|---|—
KNEG-001|DENY|DRC-031 (TENANT_MISMATCH)
KNEG-002|DENY|DRC-031 (TENANT_MISMATCH)
KNEG-003|DENY|DRC-032 (EPOCH_ROLLBACK_ ATTEMPT)
KNEG-004|DENY|DRC-032 (EPOCH_ROLLBACK_ ATTEMPT)
KNEG-005|DENY|DRC-034 (ATTESTATION_STALE)
KNEG-006|DENY|DRC-034 (ATTESTATION_STALE)
KNEG-007|DENY|DRC-033 (KEY_RELEASE_D-ENIED)
KNEG-008|DENY|DRC-033 (KEY_RELEASE_D-ENIED)
KNEG-009|DENY|DRC-036 (PROMOTION_STEP_ UP_NOT_SATISFIED)
KNEG-010|DENY|DRC-037 (ENTITLEMENT_ SCOPE_MISMATCH_OR_MISSING)
KNEG-011|DENY|DRC-040 (REVOCATION_QUO-RUM_NOT_ACHIEVED)
KNEG-012|DENY|DRC-041 (REBUILD_QUORUM_ NOT_ACHIEVED)
KNEG-013|DENY|DRC-042 (REBUILD_DIGEST_ MISMATCH)

KNEG-014|DENY|DRC-044 (CROSS_LOG_COHER-ENCE_NOT_SATISFIED)
KNEG-015|DENY|DRC-044 (CROSS_LOG_COHER-ENCE_NOT_SATISFIED)
KNEG-016|DENY|DRC-044 (CROSS_LOG_COHER-ENCE_NOT_SATISFIED)

Note: This snapshot is illustrative; vendors may output additional fields (e.g., epoch_id, action_digest) while preserving decision=DENY and denial reason code.

[AppK-0012] Vector KNEG-001 (tenant mismatch (receipt tenant!=resolved tenant))—expected decision DENY with denial_reason_code DRC-031.

```
{
    "vector_id": "KNEG-001",
    "canonicalization_profile_ref": "CP-STD-001",
    "authority_profile_id": "AP-ENT-001",
    "assurance_level_id": "AL5",
    "request": {
        "canonical": {
            "effect_type": "DATA_EGRESS",
            "interface_id": "egress-gw-01",
            "tenant_digest": "TENANT_B",
            "target": "https://api.partner.example/submit"
        }
    },
    "permit_receipt": {
        "policy_digest": "POLICY_DIGEST_EXAMPLE",
        "epoch_id": "47",
        "tenant_digest": "TENANT_A",
        "scope": {
            "effect_type": "DATA_EGRESS",
            "interface_id": "egress-gw-01",
            "tenant_digest": "TENANT_A"
        },
        "signature": "SIG_EXAMPLE"
    },
    "environment": {
        "now": "2026-02-04T00:00:00Z",
        "jurisdiction": "US",
        "risk_class": "HIGH",
        "resolved_tenant_digest": "TENANT_B"
    "expected": {
    "decision": "DENY",
        "denial_reason_code": "DRC-031"
    }
}
```

[AppK-0013] Vector KNEG-002 (capability token replay across tenants) expected decision DENY with denial_reason_code DRC-031.

```
{
    "vector_id": "KNEG-002",
    "canonicalization_profile_ref": "CP-STD-001",
    "authority_profile_id": "AP-ENT-001",
    "assurance_level_id": "AL5",
    "request": {
        "canonical": {
        "effect_type": "DATA_EGRESS",
        "interface_id": "egress-gw-01",
        "tenant_digest": "TENANT_B",
        "target": "https://api.partner.example/submit"
        }
    },
    "permit_receipt": {
        "policy_digest": "POLICY_DIGEST_EXAMPLE",
        "epoch_id": "47",
        "tenant_digest": "TENANT_B",
        "scope": {
            "effect_type": "DATA_EGRESS",
            "interface_id": "egress-gw-01",
            "tenant_digest": "TENANT_B"
        },
        "signature": "SIG_EXAMPLE"
    },
    "capability_token": {
        "token_id": "CTOK_EXAMPLE",
        "token_tenant_digest": "TENANT_A",
        "audience": "egress-gw-01",
```

-continued

```
    "epoch_id": "47",
    "action_digest": "ACTION_DIGEST_EXAMPLE"
},
"environment": {
    "now": "2026-02-04T00:00:00Z",
    "jurisdiction": "US",
    "risk_class": "HIGH",
    "resolved_tenant_digest": "TENANT_B"
"expected": {
    "decision": "DENY",
    "denial_reason_code": "DRC-031"
    }
}
}
[AppK-0014] Vector KNEG-003 (minimum-epoch violation (rollback
attempt)) - expected decision DENY with denial_reason_code DRC-032.
{
    "vector_id": "KNEG-003",
    "canonicalization_profile_ref": "CP-STD-001",
    "authority_profile_id": "AP-ENT-001",
    "assurance_level_id": "AL5",
    "request": {
        "canonical": {
            "effect_type": "DATA_EGRESS",
            "interface_id": "egress-gw-01",
            "tenant_digest": "TENANT_A",
            "target": "https://api.partner.example/submit"
        }
    },
    "permit_receipt": {
        "policy_digest": "POLICY_DIGEST_EXAMPLE",
        "epoch_id": "46",
        "tenant_digest": "TENANT_A",
        "scope": {
            "effect_type": "DATA_EGRESS",
            "interface_id": "egress-gw-01",
            "tenant_digest": "TENANT_A"
        },
        "signature": "SIG_EXAMPLE"
    },
    "environment": {
        "now": "2026-02-04T00:00:00Z",
        "jurisdiction": "US",
        "risk_class": "HIGH",
        "minimum_epoch_id": "47"
    },
    "expected": {
        "decision": "DENY",
        "denial_reason_code": "DRC-032"
    }
}
```

[AppK-0015] Vector KNEG-004 (epoch split-brain inconsistency)—expected decision DENY with denial_reason_code DRC-032.

```
{
    "vector_id": "KNEG-004",
    "canonicalization_profile_ref": "CP-STD-001",
    "authority_profile_id": "AP-ENT-001",
    "assurance_level_id": "AL5",
    "request": {
        "canonical": {
            "effect_type": "DATA_EGRESS",
            "interface_id": "egress-gw-01",
            "tenant_digest": "TENANT_A",
            "target": "https://api.partner.example/submit"
        }
    },
    "permit_receipt": {
        "policy_digest": "POLICY_DIGEST_EXAMPLE",
        "epoch_id": "47",
        "tenant_digest": "TENANT_A",
        "scope": {
            "effect_type": "DATA_EGRESS",
            "interface_id": "egress-gw-01",
            "tenant_digest": "TENANT_A"
        },
```

-continued

```
        "signature": "SIG_EXAMPLE"
    },
    "environment": {
        "now": "2026-02-04T00:00:00Z",
        "jurisdiction": "US",
        "risk_class": "HIGH",
        "epoch_sources": [
            "47",
            "46"
        ],
        "epoch_consensus_required": true
    },
    "expected": {
        "decision": "DENY",
        "denial_reason_code": "DRC-032"
    }
}
```

[AppK-0016] Vector KNEG-005 (attestation stale (freshness/nonce mismatch))—expected decision DENY with denial_reason_code DRC-034.

```
{
    "vector_id": "KNEG-005",
    "canonicalization_profile_ref": "CP-STD-001",
    "authority_profile_id": "AP-ENT-001".
    "assurance_level_id": "AL5",
    "request": {
        "canonical":
            "effect_type": "DATA_EGRESS",
            "interface_id": "egress-gw-01",
            "tenant_digest": "TENANT_A",
            "target": "https://api.partner.example/submit"
        }
    },
    "permit_receipt": {
        "policy_digest": "POLICY_DIGEST_EXAMPLE",
        "epoch_id": "47",
        "tenant_digest": "TENANT_A",
        "scope": {
            "effect_type": "DATA_EGRESS",
            "interface_id": "egress-gw-01",
            "tenant_digest": "TENANT_A"
        },
        "signature": "SIG_EXAMPLE",
        "attestation_evidence_digest": "ATTEST_DIGEST_EX-
AMPLE"
    },
    "environment":
        "now": "2026-02-04T00:00:00Z",
        "jurisdiction": "US",
        "risk_class": "HIGH",
        "attestation_required": true,
        "attestation_nonce_expected": "NONCE_B",
        "attestation_nonce_observed": "NONCE_A"
    },
    "expected": {
        "decision": "DENY",
        "denial_reason_code": "DRC-034"
    }
}
```

[AppK-0017] Vector KNEG-006 (attestation stale (checkpoint age exceeds threshold))—expected decision DENY with denial_reason_code DRC-034.

```
{
    "vector id": "KNEG-006".
    "canonicalization_profile_ref": "CP-STD-001",
    "authority_profile_id": "AP-ENT-001",
    "assurance_level_id": "AL5".
    "request": {
        "canonical": {
            "effect_type": "DATA_EGRESS",
```

-continued

```
        "interface_id": "egress-gw-01",
        "tenant_digest": "TENANT_A",
        "target": "https://api.partner.example/submit"
      }
    },
    "permit_receipt": {
      "policy_digest": "POLICY_DIGEST_EXAMPLE",
      "epoch_id": "47",
      "tenant_digest": "TENANT_A",
      "scope": {
        "effect_type": "DATA_EGRESS",
        "interface_id": "egress-gw-01",
        "tenant_digest": "TENANT_A"
      },
      "signature": "SIG_EXAMPLE",
      "attestation_evidence_digest": "ATTEST_DIGEST_EX-
AMPLE"
    },
    "environment": {
      "now": "2026-02-04T00:00:00Z",
      "jurisdiction": "US",
      "risk_class": "HIGH",
      "attestation_required": true,
      "checkpoint_age_seconds": 999999,
      "checkpoint_max_age_seconds": 3600
    },
    "expected": {
      "decision": "DENY",
      "denial_reason_code": "DRC-034"
    }
  }
```

[AppK-0018] Vector KNEG-007 (key release denied (re-quired attestation missing))—expected decision DENY with denial_reason_code DRC-033.

```
  {
    "vector_id": "KNEG-007",
    "canonicalization_profile_ref": "CP-STD-001",
    "authority_profile_id": "AP-ENT-001",
    "assurance_level_id": "AL5",
    "request": {
      "canonical": {
        "effect_type": "KEY_RELEASE",
        "interface_id": "kms-01",
        "tenant_digest": "TENANT_A",
        "key_id": "kms:key/123",
        "key_op": "DECRYPT"
      }
    },
    "permit_receipt": {
      "policy_digest": "POLICY_DIGEST_EXAMPLE",
      "epoch_id": "47",
      "tenant_digest": "TENANT_A",
      "scope": {
        "effect_type": "KEY_RELEASE",
        "interface_id": "kms-01",
        "tenant_digest": "TENANT_A",
        "key_ops": [
          "DECRYPT"
        ]
      },
      "signature": "SIG_EXAMPLE"
    },
    "environment": {
      "now": "2026-02-04T00:00:00Z",
      "jurisdiction": "US",
      "risk_class": "HIGH",
      "key_custodian": "KMS",
      "attestation_required": true,
      "attestation_present": false
    },
    "expected": {
      "decision": "DENY".
      "denial_reason_code": "DRC-033"
    }
  }
```

[AppK-0019] Vector KNEG-008 (key release denied (key operation out of scope))—expected decision DENY with denial_reason_code DRC-033.

```
  {
    "vector_id": "KNEG-008".
    "canonicalization_profile_ref": "CP-STD-001",
    "authority_profile_id": "AP-ENT-001",
    "assurance_level_id": "AL5",
    "request": {
      "canonical":
        "effect_type": "KEY_RELEASE",
        "interface_id": "kms-01",
        "tenant_digest": "TENANT_A",
        "key_id": "kms:key/123",
        "key_op": "SIGN"
      }
    },
    "permit_receipt": {
      "policy_digest": "POLICY_DIGEST_EXAMPLE".
      "epoch_id": "47",
      "tenant_digest": "TENANT_A",
      "scope": {
        "effect_type": "KEY_RELEASE",
        "interface_id": "kms-01",
        "tenant_digest": "TENANT_A",
        "key_ops": [
          "DECRYPT"
        ]
      },
      "signature": "SIG_EXAMPLE"
    },
    "environment": {
      "now": "2026-02-04T00:00:00Z",
      "jurisdiction": "US",
      "risk_class": "HIGH",
      "key_custodian": "KMS"
    },
    "expected":
      "decision": "DENY",
      "denial_reason_code": "DRC-033"
    }
  }
```

[AppK-0019A] Vector KNEG-009 (agent-initiated extension install attempt; step-up missing)—expected decision DENY with denial_reason_code DRC-036.

```
  {
    "vector_id": "KNEG-009".
    "canonicalization_profile_ref": "CP-EXT-001",
    "authority_profile_id": "AP-EXT-001",
    "assurance_level_id": "AL5",
    "request": {
      "canonical": {
        "effect_type": "EXTENSION_INSTALL",
        "interface_id": "ext-market-01",
        "tenant_digest": "TENANT_A",
        "scope_vector":
  {"org":"ORG_A","env":"PROD","tenant":"TENANT_A",
  "cluster":"CLUSTER_1","region":"us-east-1"},
        "artifact_id": "ext:publisherX/toolY@1.2.3",
        "operation": "INSTALL"
      }
    },
    "permit_receipt": {
    "policy_digest": "POLICY_DIGEST_EXAMPLE",
    "epoch_id": "47",
    "tenant_digest": "TENANT_A",
    "scope": {
      "effect_type": "EXTENSION_INSTALL",
      "interface_id": "ext-market-01",
      "tenant_digest": "TENANT_A",
      "artifact_id": "ext:publisherX/toolY@1.2.3"
      },
      "signature": "SIG_EXAMPLE"
    },
```

```
    "environment":
      "now": "2026-02-04T00:00:00Z",
      "risk_class": "HIGH",
      "step_up_required": true,
      "step_up_present": false
    },
    "expected":
      "decision": "DENY".
      "denial_reason_code": "DRC-036"
    }
  }
```

[AppK-0019B] Vector KNEG-010 (agent-initiated extension install attempt; entitlement scope mismatch)—expected decision DENY with denial_reason_code DRC-037.

```
  {
    "vector_id": "KNEG-010",
    "canonicalization_profile_ref": "CP-EXT-001",
    "authority_profile_id": "AP-EXT-001",
    "assurance_level_id": "AL5",
    "request": {
    "canonical": {
      "effect_type": "EXTENSION_INSTALL",
      "interface_id": "ext-market-01",
      "tenant_digest": "TENANT_A",
      "scope_vector":
{"org":"ORG_A","env": "PROD", "tenant": "TENANT_A",
"cluster": "CLUSTER_1", "region": "us-east-1"},
"artifact_id": "ext:publisherX/toolY@1.2.3",
      "operation": "INSTALL"
      }
    },
    "entitlement_token": {
      "ent_id": "ENT_EXAMPLE",
        "scope_vector":
{"org":"ORG_A","env":"PROD", "tenant": "TENANT_A",
"cluster": "CLUSTER_1", "region": "us-west-2"},
      "artifact_id": "ext:publisherX/toolY@1.2.3",
      "vali_to": "2026-03-01T00:00:00Z",
      "sig": "SIG_EXAMPLE"
    },
    "permit_receipt": {
      "policy_digest": "POLICY_DIGEST_EXAMPLE",
      "epoch_id": "47",
      "tenant_digest": "TENANT_A",
      "scope": {
        "effect_type": "EXTENSION_INSTALL",
        "interface_id": "ext-market-01",
        "tenant_digest": "TENANT_A",
        "artifact_id": "ext:publisherX/toolY@1.2.3"
      },
      "signature": "SIG_EXAMPLE"
    },
    "environment": {
      "now": "2026-02-04T00:00:00Z",
      "risk_class": "HIGH",
      "resolved_scope_vector":
{"org":"ORG_A","env": "PROD", "tenant": "TENANT_A",
"cluster":"CLUSTER_1","region": "us-east-1"}
    },
    "expected": {
      "decision": "DENY",
      "denial_reason_code": "DRC-037"
    }
  }
```

[AppK-0019C] Vector KNEG-011 (revocation acknowledgment/quorum not achieved within SLA window)—expected decision DENY with denial_reason_code DRC-040.

```
{
  "vector_id": "KNEG-011",
  "canonicalization_profile_ref": "CP-EXT-001",
```

```
  "authority_profile_id": "AP-EXT-001",
  "assurance_level_id": "AL5",
  "request": {
    "canonical": {
      "effect_type": "EXTENSION_ENABLE",
      "interface_id": "ext-market-01",
      "tenant_digest": "TENANT_A",
      "scope_vector":
{"org":"ORG_A","env":"PROD", "tenant": "TENANT_A",
"cluster": "CLUSTER_1", "region": "us-east-1"},
      "artifact_id": "ext:publisherX/toolY@1.2.3",
      "operation": "ENABLE"
    }
  },
  "permit_receipt": {
  "policy_digest": "POLICY_DIGEST_EXAMPLE",
  "epoch_id": "47",
  "tenant_digest": "TENANT_A",
  "scope": {
    "effect_type": "EXTENSION_ENABLE",
    "interface_id": "ext-market-01",
    "tenant_digest": "TENANT_A",
    "artifact_id": "ext:publisherX/toolY@1.2.3"
  },
  "signature": "SIG_EXAMPLE"
  },
  "environment": {
    "now": "2026-02-04T00:00:00Z",
    "risk_class": "HIGH",
    "revocation_id": "REV-EXAMPLE",
    "sla_propagation_window_seconds": 600,
    "quorum_required": {"k": 3, "m": 5},
    "critical_enforcement_set": ["EP-REGION-us-east-1",
"EP-CLUSTER-CLUSTER_1", "EP-
EGRESS-01","EP-INTAKE-01", "EP-REGISTRY-01"],
    "acknowledgments_received": ["EP-EGRESS-01","EP-INTAKE-01"]
  },
  "expected": {
    "decision": "DENY",
    "denial_reason_code": "DRC-040"
  }
}
```

[AppK-0019D] Vector KNEG-012 (reproducible-build N-of-M quorum not achieved)—expected decision DENY with denial_reason_code DRC-041.

```
  {
    "vector_id": "KNEG-012",
    "canonicalization_profile_ref": "CP-EXT-001",
    "authority_profile_id": "AP-EXT-001",
    "assurance_level_id": "AL5",
    "request": {
      "canonical": {
        "effect_type": "EXTENSION_INSTALL",
        "interface_id": "ext-market-01",
        "tenant_digest": "TENANT_A",
        "artifact_id": "ext:publisherX/toolY@1.2.3",
        "operation": "INSTALL"
      }
    },
    "signed_catalog_snapshot": {
      s"napshot_id": "SNAP-EXAMPLE",
      "artifact_id": "ext:publisherX/toolY@1.2.3",
      "artifact_digest": "DIGEST_COMMITTED_EXAMPLE".
      "sig": "SIG_EXAMPLE"
    },
    "rebuild_quorum_policy": {
      "n": 2,
      "m": 3,
      "independent_rebuilders": ["RB-A", "RB-B", "RB-C"]
    },
    "rebuilder_results": [
      {"rebuilder_id":"RB-
A", "rebuilt_digest": "DIGEST_COMMITTED_EXAMPLE",
      "sig": "SIG_EXAMPLE"},
      {"rebuilder_id": "RB-
```

-continued

```
      B","rebuilt_digest":"DIGEST_MISMATCH_EXAMPLE",
    "sig": "SIG_EXAMPLE"}
      ],
      "expected": {
         "decision": "DENY",
         "denial_reason_code": "DRC-041"
      }
   }
}
```

[AppK-0019E] Vector KNEG-013 (reproducible-build digest mismatch)—expected decision DENY with denial-_reason_code DRC-042.

```
   {
      "vector_id": "KNEG-013",
      "canonicalization_profile_ref": "CP-EXT-001",
      "authority_profile_id": "AP-EXT-001",
      "assurance_level_id": "AL5",
      "request": {
         "canonical": {
            "effect_type": "EXTENSION_UPDATE",
            "interface_id": "ext-market-01",
            "tenant_digest": "TENANT_A",
            "artifact_id": "ext:publisherX/toolY@1.2.4",
            "operation": "UPDATE"
         }
      },
      "signed_catalog_snapshot": {
         "snapshot_id": "SNAP-EXAMPLE",
         "artifact_id": "ext:publisherX/toolY@1.2.4",
         "artifact_digest": "DIGEST_COMMITTED_EXAMPLE",
         "sig": "SIG_EXAMPLE"
      },
      "rebuilder_results": [
         {"rebuilder_id":"RB-
   A", "rebuilt_digest": "DIGEST_MISMATCH_EXAMPLE",
    "sig": "SIG_EXAMPLE"}
      ],
      "expected": {
         "decision": "DENY",
         "denial_reason_code": "DRC-042"
      }
   }
}
```

[AppK-0020] Procurement sealing note (illustrative; non-limiting). In some embodiments, a conformance badge (Appendix P) commits to a vectors_digest for a published vector corpus that includes vectors KNEG-001 through KNEG-008 (or an equivalent subset). A procurement checklist may require that the supplier reproduce the expected DENY outcomes and denial reason codes under a "run-the-verifier" procedure and include the harness output digest in procurement records.

Appendix L—OS/Kernel, Service-Mesh, and Egress-Gateway Enforcement Patterns (Illustrative; Non-Limiting)

[Appl.-0001] Non-limiting notice. This Appendix L provides illustrative enforcement placements for implementing receipt-conditioned, permit-before-commit, fail-closed authorization at an effect boundary. The embodiments herein do not limit claim scope. Equivalent enforcement placements may be used in other operating systems, hypervisors, runtimes, and network stacks.

[Appl.-0002] OS/kernel enforcement placements (illustrative). In some embodiments, non-bypassability is achieved by placing interceptor 140 in a privileged path, including non-limiting examples such as (i) system call interposition (syscall mediation, sandbox filters, or equivalent), (ii) kernel security hooks and/or eBPF-style hook programs (or equivalent kernel extension mechanisms), (iii) packet filter and network stack hooks, (iv) hypervisor or VMM traps, (v) device driver or control-plane mediation, (vi) service-mesh sidecars, and (vii) egress gateways or policy-enforced proxies. The specific operating system or hook mechanism is non-limiting provided that external effects cannot be committed absent successful verification.

[Appl.-0003] Syscall-level permit-before-commit (illustrative). In some embodiments, prior to allowing a kernel-mediated operation to complete, the interceptor constructs or receives a canonical request representation for the operation, computes an action digest, and invokes a verifier under an authority profile and assurance level. If verification succeeds, the operation is allowed; otherwise the operation is denied with a fail-closed error and an audit event and denial reason code are recorded.

[Appl.-0004] Kernel hook frameworks (illustrative). In some embodiments, kernel-resident enforcement uses kernel hook frameworks, including non-limiting examples such as security-module hooks, eBPF programs attached to security hooks, packet filters, sandbox hooks, or equivalent extension mechanisms, to observe attempted operations and gate completion on verification. In some embodiments, the hook emits a stable event envelope that is canonicalized and hashed to produce an action digest, and the hook denies completion (fail-closed) when verification fails or cannot be completed to the required assurance level. In some embodiments, a bounded, policy-controlled decision cache is permitted only for explicitly low-risk operations and is invalidated by revocation events, epoch changes, and/or policy-defined cache lifetimes.

[Appl.-0005] Service-mesh sidecar enforcement (illustrative). In some embodiments, the effect boundary is implemented in a service mesh sidecar or per-workload proxy that intercepts outbound requests (e.g., HTTP, gRPC, message bus publishes) and denies transmission unless a corresponding permit receipt is verified. In some embodiments, the sidecar attaches a capability token derived from successful verification and binds it to at least the action digest and epoch identifier.

[Appl.-0006] Egress gateway enforcement (illustrative). In some embodiments, an egress gateway is configured as a choke point such that all outbound traffic from an execution substrate must traverse the gateway. A recipient-side verifier validates a capability token and/or receipt-related evidence before allowing egress. In some embodiments, the gateway enforces route, relay-chain, jurisdiction, and link-window constraints as scope constraints bound to the receipt.

[Appl.-0007] Retrieval gateways and data-access enforcement (illustrative). In some embodiments, a retrieval gateway (database proxy, object-store proxy, RAG retrieval gateway, file/object read API proxy) is treated as an external interface and denies data access/retrieval unless verified as authorized under a permit receipt. In some embodiments, query shape, target identifier, and disclosure budgets are treated as scope constraints and are verified prior to effect commitment.

[Appl.-0008] Update/self-modification channel enforcement (illustrative). In some embodiments, plugin installation, extension loading, package installation, configuration changes, and model/runtime updates are treated as external effects and are gated at an update channel boundary. In some embodiments, the permit receipt commits to an update channel identifier and update type and the system denies modification when provenance evidence, scope constraints, or required attestation evidence cannot be verified.

[Appl.-0009] Non-limiting notice. The OS/kernel, sidecar, gateway, and retrieval placements above are exemplary. The disclosed core semantics—receipt-conditioned, permitbefore-commit, fail-closed enforcement with non-bypass-ability at an effect boundary—may be preserved using alternative placements, mechanisms, or architectures.

Appendix M—Remote Attestation Handshake and Evidence Verification (Illustrative; Non-Limiting)

[AppM-0001] Non-limiting notice. This Appendix M provides illustrative attestation flows for strengthening integrity and assurance. Attestation mechanisms, formats, and trust anchors may vary without limiting claim scope.

[AppM-0002] Roles (illustrative). In some embodiments, an attester comprises at least one of an interceptor, verifier, receipt handler, external-interface verifier, or execution substrate component executing within a trusted compute boundary. A verifier validates attestation evidence using trust anchors defined by policy and/or an authority profile registry.

[AppM-0003] Challenge-response handshake (illustrative). In some embodiments, the verifier issues (i) a freshness challenge (nonce) and (ii) a verification context comprising at least a policy epoch identifier and an expected measurement profile identifier or digest. The attester returns attestation evidence cryptographically bound to the nonce and committing to measured state including at least a code hash of an enforcement component and a configuration or policy bundle digest. In some embodiments, the evidence also commits to a tenant context digest, an interface identifier, and/or an assurance level identifier.

[AppM-0004] Evidence verification (illustrative). In some embodiments, the verifier validates: (i) authenticity (signature verification under an attestation key or report key), (ii) freshness (nonce match, monotonic counter progression, and/or a signed time checkpoint subject to bounded clock drift), (iii) trust chain validity and revocation status for attestation key material, and (iv) measurement compliance by comparing committed digests to policy-controlled allowlists bound to a policy epoch and authority profile. In some embodiments, verification includes TPM-quote validation and/or attestation-report validation, and the verifier denies commitment (fail-closed) when evidence is missing, stale, ambiguous, revoked, or does not match required measurement profiles.

[AppM-0005] Policy-epoch binding and anti-rollback (illustrative). In some embodiments, attestation evidence is evaluated under policy epoch binding such that measurements must be consistent with the currently effective policy epoch and associated compiled-policy or configuration digests. In some embodiments, a minimum-epoch rule and/or signed checkpoint recency rule is enforced to prevent rollback to older enforcement states.

[AppM-0006] Receipt binding (illustrative). In some embodiments, a PermitReceipt includes or commits to an attestation evidence digest and/or measurement-set identifier such that authorization decisions are bound to execution in an approved enforcement environment. In some embodiments, a capability token emitted upon success commits to at least (action digest, epoch identifier, attestation evidence digest) to support downstream denial absent an attested environment.

[AppM-0007] Non-limiting examples. Attestation evidence may include one or more of a TPM quote, a trusted execution environment attestation report, a signed platform measurement digest, or a signed enclave report. The specific attestation scheme is non-limiting provided that verification can be performed to an assurance level profile and is enforced with fail-closed defaults when required evidence is missing, stale, ambiguous, or unverifiable.

Appendix N—KMS/HSM Key-Release Gates Bound to Policy Epochs and Attestation (Illustrative; Non-Limiting)

[AppN-0001] Non-limiting notice. This Appendix N provides illustrative embodiments in which cryptographic key release is conditioned on permit receipt verification, policy epoch binding, and optional attestation evidence. Key custodians may include cloud KMS services, on-prem HSMs, and equivalent systems.

[AppN-0002] Key release as enforcement (illustrative). In some embodiments, an external effect requires access to one or more secrets to be committed. A key custodian denies key release unless presented with machine-verifiable proof that the requested effect is authorized under a permit receipt and, when required, that enforcement executes in an approved attested environment. Withholding keys enforces fail-closed behavior even when alternate code paths exist.

[AppN-0003] Key-release receipt/token (illustrative). In some embodiments, the system uses a key-release receipt or key-release token that is derived from, includes, or is cryptographically bound to a PermitReceipt. Non-limiting fields include: key identifier, permitted key operations (decrypt, sign, unwrap), tenant context digest, audience identifier, policy digest, epoch identifier, time-bounded validity, anti-replay material, and optional attestation evidence digest requirements.

[AppN-0004] Key custodian verification (illustrative). In some embodiments, prior to releasing key material or an ephemeral wrapped key, the key custodian verifies: authenticity of a key-release token or bound PermitReceipt, epoch validity and time-bounded validity, scope consistency between the requested key operation and the external-effect authorization scope, anti-replay constraints, and optional attestation evidence (e.g., an attestation evidence digest committed by the receipt). If any requirement is unmet or cannot be established to the required assurance level, key release is denied (fail-closed). In some embodiments, key release is further conditioned on a verifier pass result that commits to at least the action digest and epoch identifier.

[AppN-0005] Ephemeral and bound release (illustrative). In some embodiments, the key custodian releases only short-lived key material that is cryptographically bound to at least one of (action digest, policy digest, epoch identifier, tenant context digest, and a request nonce). In some embodiments, releases are rate-limited and are invalidated on revocation events or epoch changes.

[AppN-0006] Dual enforcement composition (illustrative). In some embodiments, key-release gating is combined with capability-token dual enforcement such that (i) the interceptor emits a capability token upon successful receipt verification, (ii) the external interface denies commitment absent a valid capability token, and (iii) the key custodian denies key release absent verification and, when required, attestation. This increases bypass resistance by requiring multiple independent proofs.

[AppN-0007] Non-limiting notice. The key-release gating described above is exemplary; implementations may use envelope encryption, confidential computing sealing, on-prem HSMs, cloud KMS services, or other custody models while preserving receipt-conditioned, permit-before-commit, fail-closed semantics.

Appendix O—Multi-Tenant Isolation, Policy Versioning Safety, and Anti-Rollback Controls (Illustrative; Non-Limiting)

[AppO-0001] Non-limiting notice. This Appendix O provides illustrative controls for multi-tenant deployments and for mitigating policy version confusion, tenant confusion, and rollback or split-brain conditions. The controls herein do not limit claim scope.

[AppO-0002] Tenant context binding (illustrative). In some embodiments, a tenant context is represented by a tenant identifier or tenant context digest and is bound into at least one of: canonical request representation, action digest, permit receipt scope, identity bindings, capability tokens, audit events, registry releases, and revocation proofs. The system denies commitment (fail-closed) when tenant resolution is ambiguous, inconsistent, or unverifiable to the assurance level required for the requested effect type or risk class.

[AppO-0003] Tenant-scoped registries and keys (illustrative). In some embodiments, registries and policy bundles are tenant-scoped, including authority profiles, assurance profiles, canonicalization profiles, reason code registries, and policy epochs. In some embodiments, key material is partitioned by tenant such that cross-tenant reuse is infeasible, and revocation inputs and checkpoints are evaluated under tenant scope constraints.

[AppO-0004] Anti-rollback and minimum-epoch rules (illustrative). In some embodiments, policy epochs are monotonic and the verifier enforces a minimum-epoch rule such that receipts bound to older epochs are denied even if otherwise valid. Rollback prevention may use signed checkpoints, monotonic counters, or transparency-log anchored epoch events. In some embodiments, split-brain conditions (conflicting epoch or registry states across sources) are treated as a denial condition unless a narrowly scoped, policy-controlled safe mode applies.

[AppO-0005] Split-brain mitigation (illustrative). In some embodiments, the system evaluates epoch state and registry releases from multiple sources and denies commitment when cross-source consistency cannot be established to the required assurance level. In some embodiments, a policy-controlled safe-mode restricts effects to a minimal "safe floor" scope while consistency is resolved, preserving fail-closed semantics for disallowed effects.

[AppO-0006] Tenant confusion attack mitigation (illustrative). In some embodiments, a capability token and/or key-release authorization is audience-bound and tenant-bound such that a token issued for one tenant and one external interface cannot be replayed for another. The system denies commitment when a token's tenant binding or audience binding does not match the resolved tenant context and intended recipient interface.

[AppO-0007] Non-limiting notice. The multi-tenant isolation and anti-rollback controls above are exemplary. Equivalent controls may be implemented using alternative identity models, key partitioning, registry topologies, or consistency proofs while preserving fail-closed, receipt-conditioned enforcement semantics.

Appendix P—Conformance Badges and Procurement-Grade Checklists (Illustrative; Non-Limiting)

[AppP-0001] Non-limiting notice. This Appendix P provides illustrative mechanisms for expressing and verifying conformance as signed artifacts suitable for procurement, audit, and standardization workflows. The embodiments herein do not limit claim scope.

[AppP-0002] Conformance badge artifact (illustrative). In some embodiments, a conformance result is expressed as a signed badge artifact that commits to: (i) an implementation identity (vendor, product, version), (ii) a verifier API contract version and conformance harness version, (iii) a test vector corpus digest and signed release manifest digest (e.g., as described by the conformance artifacts in Appendix K), (iv) supported assurance levels and effect types, (v) supported enforcement placements (egress gateway, sidecar, kernel mediation, key-release gate), and (vi) optional attestation and dual-enforcement support flags. In some embodiments, the badge is machine-verifiable and is suitable for procurement and audit workflows.

[AppP-0003] Badge verification (illustrative). In some embodiments, procurement or audit personnel verify a badge by validating signatures and comparing committed digests against published signed manifests, including registry releases and test vector releases. In some embodiments, verification is automated using a "run-the-verifier" workflow that executes a selected conformance vector subset and produces an integrity summary suitable for procurement records.

[AppP-0004] Procurement checklist mapping (illustrative). In some embodiments, a procurement checklist maps requirements to machine-verifiable evidence and verification steps. Non-limiting examples include: (i) REQUIREMENT: fail-closed when revocation is unknown or stale→EVIDENCE: conformance vectors exercising revocation staleness denial→VERIFY: run the harness vector set and confirm expected denial codes; (ii) REQUIREMENT: dual enforcement at egress→EVIDENCE: gateway token-validation vectors and gateway configuration digest→VERIFY: validate badge fields and run vectors; (iii) REQUIREMENT: attestation required at high assurance for selected effect types→EVIDENCE: badge attestation capability flag and measurement-profile digest→VERIFY: validate badge signatures and attestation evidence digest binding; and (iv) REQUIREMENT: multi-tenant isolation→EVIDENCE: tenant-binding vectors and tenant-scoped registry releases→VERIFY: run vectors and confirm denial on tenant mismatch.

[AppP-0005] Illustrative badge schema (non-limiting). {"badge_id": "string", "subject": {"vendor": "string", "product": "string", "version": "string"}, "harness": {"verifier_api_version": "string", "harness_version": "string", "test_vectors_digest": "hex-or-b64", "release_manifest_digest": "hex-or-b64"}, "claims": {"assurance_levels": ["AL3", "AL5"], "effect_types": ["DATA_EGRESS"], "placements":
["EGRESS_GATEWAY", "SIDECAR", "KERNEL"], "attestation": "optional", "dual_enforcement": "optional"}, "issued_at": "timestamp", "valid_to": "timestamp", "signatures": [{"signer_id": "string", "sig": "sig"}], "threshold": {"k": 2, "m": 3}}

[AppP-0006] Badge revocation and lifecycle (illustrative). In some embodiments, a badge is revocable and is treated as a verification input whose status and recency are evaluated under an assurance level profile. Upon badge revocation or when badge recency requirements are not met, the system denies commitment for effects requiring that badge evidence (fail-closed).

[AppP-0007] Procurement language (illustrative; non-limiting). In some embodiments, procurement requirements specify that suppliers provide (i) a signed conformance badge artifact committing to conformance harness and test vector digests, (ii) a reproducible verification procedure (e.g., running a published conformance harness on a published vector subset), and (iii) fail-closed behavior when required evidence is missing, stale, revoked, ambiguous, or unverifiable. The specific procurement wording is non-limiting and may vary by jurisdiction, domain, and risk class.

[AppP-0008] Non-limiting notice. Badges and procurement checklists are exemplary tools for operationalizing and standardizing the disclosed semantics. Alternative badge formats, signature schemes, and checklist structures may be used without limiting the disclosed invention.

[AppP-0009] Procurement-critical negative-vector subset sealing (illustrative). In some embodiments, a conformance badge commits to a digest for a procurement-critical negative vector subset that exercises (i) agentic promotion step-up enforcement, (ii) entitlement scope-vector enforcement, (iii) emergency revocation acknowledgment and quorum propagation enforcement, and (iv) reproducible-build quorum enforcement. In a non-limiting example, the subset includes vectors KNEG-009 through KNEG-013 of Appendix K.

[AppP-0009A] In some embodiments, additional negative vectors exercising cross-log coherence failures (e.g., KNEG-014 . . . . KNEG-016) are published as an optional subset and may be required for deployments that rely on multi-log revocation/epoch/registry coherence, without changing the procurement-critical subset digest unless the optional subset is explicitly included in, and committed by, a conformance badge or procurement checklist.

[AppP-0010] Subset digest computation (illustrative). In some embodiments, a subset digest is computed as SHA-256 over UTF-8 bytes of a canonical JSON serialization of each vector object (e.g., sorted keys, no insignificant whitespace), concatenated in a deterministic order (e.g., ascending vector_id) with a delimiter (e.g., LF). Alternative canonicalization schemes may be used provided that independent verifiers can reproduce an identical digest.

[AppP-0011] Illustrative subset digest (non-limiting). Example NEG_SUBSET_DIGEST (KNEG-009 . . . . KNEG-013) =e7e74552a4fb35198ba92bae8d6ac89abee6de24c5939e5 f0f0023c1b2666524; this value is illustrative and non-binding, and procurement and independent verification MUST rely on recomputation of the subset digest from the published vector corpus and the canonicalization rules and signed release manifest referenced by the verification procedure.

[AppP-0011A] Illustrative per-vector digests (non-limiting). Example per-vector digests are shown for convenience and are non-binding; implementers and independent verifiers MUST recompute per-vector digests from the published vector objects under the same canonicalization rules used to compute the subset digest. KNEG-009- e40c404ble6ed6840c16dcb735c6cb9454c4be5005e351d74 f7b0926736c4aad; KNEG-010- 31blc8a2bb59281690a784ffcf2f8b24e6f3972d9bd7b5f25d aa57b0c13ab598; KNEG- 011=1cdfff2ffb355011b63c9df42d59163d67d40f193c3ac 07f046982f4f405972e; KNEG-012- 59a35a5449aa285255a7780fe4d595ebeeb7d03a52798f133 8f4f205eaca99e0; KNEG-013- f6dfbbdd7706d977374298fbc619cc9f2eef258bc0cfd1319 d09a475alf6f3c5.

[AppP-0012] Procurement 'one-shot' badge checklist template (illustrative). In some embodiments, procurement acceptance is expressed as a checklist that references a signed conformance badge, a published negative-vector subset, and a reproducible run-the-verifier procedure whose outputs are recorded as procurement evidence.

[AppP-0012A] Supplier deliverables (illustrative). (i) Signed conformance badge artifact; (ii) the conformance harness (or immutable harness reference) and its digest; (iii) the test vector corpus (or immutable reference) and release manifest digest(s), including the procurement-critical negative subset KNEG-009 . . . . KNEG-013; (iv) verification instructions (run-the-verifier procedure); (v) signing keys/ trust anchors and revocation endpoints for badge and vector releases; and (vi) an integrity summary output (report) whose digest is recorded.

[AppP-0012B] Buyer verification procedure (illustrative). (i) Verify badge signatures and key-rotation validity; (ii) verify that the badge commits to the expected negative subset digest (e.g., NEG_SUBSET_DIGEST (KNEG-009 . . . 013)); (iii) retrieve the referenced vector corpus/release manifests and verify signatures; (iv) execute the harness on KNEG-009 . . . . KNEG-013 and confirm the expected DENY decisions and denial reason codes; (v) record the harness output digest and optionally anchor the digest to an append-only log; and (vi) reject procurement if any step cannot be completed to required recency or verification strength.

[AppP-0012C] Acceptance criteria mapping (illustrative). In some embodiments, the procurement checklist requires at least: (i) promotion step-up enforcement→KNEG-009 yields DENY with DRC-036; (ii) entitlement scope-vector correctness→KNEG-010 yields DENY with DRC-037; (iii) revocation acknowledgment/quorum propagation within SLA→KNEG-011 yields DENY with DRC-040 when quorum is not achieved; (iv) reproducible-build quorum enforcement→KNEG-012 yields DENY with DRC-041 when N-of-M quorum is not achieved; and (v) reproducible-build digest mismatch denial→KNEG-013 yields DENY with DRC-042.

[AppP-0012D] Critical enforcement set segmentation (illustrative). In some embodiments, the checklist additionally requires that a 'critical enforcement set' be satisfied separately for tenant, cluster, and region segments, and that acknowledgments used to satisfy quorum propagation indicate segment identifiers (tenant/cluster/region) and enforcement point identifiers; failure to satisfy any required segment results in deny-by-default for installation, enabling, loading, invocation, or update operations in the affected scope.

[AppP-0013] Extended badge schema (illustrative; non-limiting). In some embodiments, the conformance badge includes procurement-critical fields such as an entitlement scope vector, critical enforcement set segmentation, revocation ack/quorum SLA parameters, and reproducible-build quorum requirements. Example (illustrative; non-limiting):

{ "badge_id":"string", "subject": {"vendor": "string", "product": "string", "version": "string"},
"harness": { "verifier_api_version":"string", "harness_version": "string", "release_manifest_digest":
"hex-or-b64",
        "test_vectors_digest": "hex-or-b64",
        "negative_subset": { "vector_ids":["KNEG-009", "KNEG-010", "KNEG-011", "KNEG-
012", "KNEG-
013"], "subset_digest":"e7e74552a4fb35198ba92bae8d6ac89abee6de24c5939e5f0f0023c1b2666
524"}},
    "procurement_controls": {

-continued

```
    "entitlement_scope_vector":["org", "env", "tenant", "cluster", "region"],
    "critical_enforcement_sets": { "tenant": ["EP-TENANT-... "], "cluster": ["EP-
CLUSTER-... "], "region":["EP-REGION-... "]},
    "revocation_ack_quorum_sla": { "propagation_window_seconds":600, "ack_required":true, "quoru
m":{"k":3,"m":5}},
    "rebuild_quorum_policy":{"n":2,"m":3, "independent_rebuilders_required": true } },
"claims": {"assurance_levels":["AL5"], "effect_types":["EXTENSION_INSTALL", "EXTENSIO
N_ENABLE", "EXTENSION_UPDATE"], "placements": ["EGRESS_GATEWAY", "SIDECAR","
KERNEL", "REGISTRY_GATE"],
    "attestation":"optional", "dual_enforcement": "optional"},
"issued_at": "timestamp", "valid_to":"timestamp", "signatures": [{ "signer_id": "string", "sig":"sig"}]
, "threshold":{"k":2,"m":3} }
```

[AppP-0014] Fill-in procurement checklist (illustrative; non-limiting). Vendor/Product/Version: _____. Badge ID: _____. NEG_SUBSET_DIGEST (KNEG-009 . . . 013): _____. (expected: e7e74552a4fb35198ba92bae8d6ac89abee6de24c5939e5f0f 0023clb2666524). Verify badge signature: PASS/FAIL. Verify vector release manifest signatures: PASS/FAIL. Run KNEG-009 . . . 013: PASS/FAIL (expected DENY with DRC-036/037/040/041/042). Verify critical enforcement set segmentation (tenant/cluster/region): PASS/FAIL. Record harness output digest:

[AppP-0015] Non-limiting notice. The badge fields, sub-set digests, vector IDs, SLA parameters, quorum thresholds, and checklist items above are exemplary. Equivalent badge structures and verification procedures may be used provided that they enable independent, reproducible verification of fail-closed supply-chain gating and agentic promotion controls.

Appendix Q—Agentic Tooling Untrusted-Input Firewall and Skill Supply-Chain Gates (Illustrative; Non-Limiting)

[AppQ-0001] Purpose. In some embodiments, an execution substrate comprises an agent runtime and/or assistant runtime that receives external content (e.g., messages, documents, retrieved passages) and produces tool invocations that would commit external effects (e.g., send a message, transmit data, modify an account, install an extension, or change configuration). This Appendix Q provides non-limiting embodiments for treating such tool invocations and related promotions as external-effect requests subject to receipt-conditioned, permit-before-commit, fail-closed enforcement at an effect boundary.

[AppQ-0002] Untrusted content classification (illustrative). In some embodiments, external content is labeled and tracked as untrusted input and is not treated as an authorization signal. In some embodiments, untrusted content may influence a candidate plan or suggestion, but effect commitment is denied unless a corresponding permit receipt authorizes the resulting external-effect request under the applicable policy epoch, scope constraints, and assurance level profile.

[AppQ-0003] Instruction promotion gate (illustrative). In some embodiments, promotion of untrusted content into an executable instruction, plan step, or tool invocation is itself treated as an external effect. In some embodiments, a permit receipt includes or commits to instruction provenance material, such as a source identifier, channel identifier, sender/issuer identifiers, message or document identifiers, and/or a digest of relevant untrusted content, enabling the verifier to deny commitment when instruction provenance is missing, unverifiable, ambiguous, or out of scope under a selected authority profile or assurance level profile.

[AppQ-0004] Tool invocation canonicalization (illustrative). In some embodiments, deterministic canonicalization includes at least a tool identifier and canonical tool arguments as part of the canonical request representation. In some embodiments, tool arguments include target identifiers (e.g., destination address, resource identifier, calendar event identifier), action types, and disclosure or effect budgets. The action digest binds the tool invocation semantics such that materially different tool invocations produce different action digests and cannot reuse a prior permit receipt.

[AppQ-0005] Credential-less and capability-scoped execution (illustrative). In some embodiments, the interceptor and/or external interface uses short-lived capability tokens bound to at least the action digest, policy digest, epoch identifier, validity window, and anti-replay material, such that external interfaces deny effect commitment absent a valid token. In some embodiments, long-lived account credentials are not directly exposed to an agent runtime; instead, a key custodian or credential broker denies credential release or key operations unless receipt verification and any required assurance evidence checks succeed, thereby preserving fail-closed semantics even when alternate local code paths exist.

[AppQ-0006] Skill/extension supply-chain gate (illustrative). In some embodiments, installation, enablement, or update of a skill/extension/plugin is treated as an external effect and is denied unless authorized by a permit receipt whose scope commits to an allowed update channel identifier and to integrity evidence for the package. Such integrity evidence may include one or more of a signed registry snapshot digest, SBOM digest, build provenance digest, and/or transparency-log anchoring data. In some embodiments, commitment is denied when required integrity evidence is missing, revoked, stale beyond threshold, or unverifiable.

[AppQ-0007] Marketplace-mediated capability delegation (illustrative). In some embodiments, delegation, transfer, lease, or exchange of a capability (including via a marketplace) is treated as an external effect and is denied unless a permit receipt authorizes the delegation scope and any required provenance and revocation recency checks succeed. In some embodiments, delegation artifacts are anchored to an append-only log for audit and replay resistance, and commitment is denied when cross-source or cross-log consistency requirements cannot be established to a policy-defined threshold.

[AppQ-0008] Audit and denial reason codes (illustrative). In some embodiments, upon denial, the interceptor outputs a structured denial reason code indicating whether denial was caused by missing or invalid instruction provenance, untrusted or out-of-scope promotion, skill registry signature failure, missing SBOM/build provenance, or capability token failure, and records an audit event committing to relevant digests (action digest, policy digest, epoch identifier, and optional instruction provenance digest and/or registry snapshot digest).

[AppQ-0009] Non-limiting example. In some embodiments, a chat-driven assistant receives a message requesting an email be sent, a calendar be updated, or a file be retrieved. The assistant runtime may propose a tool invocation, but effect commitment is denied unless a permit receipt authorizes the specific tool invocation under policy epoch and scope. In some embodiments, a message or document received from an external party cannot self-authorize tool invocation; instead, authorization requires a permit receipt whose scope includes the intended effect type, target identifier, and any required provenance and assurance checks.

[AppQ-0010] Non-limiting notice. The embodiments of Appendix Q are exemplary and do not limit claim scope. Equivalent controls may be implemented using alternative labeling, provenance, registry, and capability mechanisms while preserving receipt-conditioned, permit-before-commit, fail-closed enforcement at an effect boundary.

Appendix R—Directive Elevation Firewall and Instruction-Promotion Gates (Illustrative; Non-Limiting)

[AppR-0001] Purpose. In some embodiments, an agent runtime receives inbound content payloads and produces candidate directives (e.g., inferred instructions, plans, tool invocations, or workflow steps). This Appendix R provides non-limiting embodiments for treating (i) conversion of a candidate directive into an authorized operation specification and/or (ii) promotion of such a directive into an executable operation as a controlled event subject to governance-frame selection, evidence generation, and deny-by-default enforcement.

[AppR-0002] Terminology (illustrative; non-limiting). In some embodiments, (i) "directive candidate" denotes an action-bearing representation derived from inbound content; (ii) "origin tags" denote machine-parseable provenance fields (connector id, sender id, message id, document locator, transport headers, session id, or source attestation); (iii) "trust tags" denote labels describing authority, taint, or non-authoritativeness of content; (iv) "governance frame" denotes a selected snapshot of rules applicable to a domain, destination, tool category, data class, jurisdiction, tenant context, and/or risk tier; (v) "commit capsule" denotes an authorization capsule cryptographically bound to an operation digest and encoding enforceable bounds; and (vi) "evidence object" denotes a machine-checkable record committing to promotion/elevation inputs, decisions, and bases.

[AppR-0003] Content-directive separation (illustrative). In some embodiments, inbound content payloads are treated as non-authoritative for control decisions by default. A directive candidate derived from inbound content SHALL NOT be executed and SHALL NOT be treated as an authorized operation specification absent an explicit elevation decision recorded as evidence. This prevents content-borne instruction injection from directly causing external effects.

[AppR-0004] Directive extraction and labeling (illustrative). In some embodiments, a directive quarantine layer extracts directive candidates from inbound content payloads and attaches origin tags and trust tags. Trust tags may include a taint label and a trust-gradient score; taint and trust may be propagated through intermediate agent artifacts (summaries, plans, retrieved passages, tool outputs) to preserve provenance and non-authoritativeness semantics.

[AppR-0005] Governance frame selection (illustrative). In some embodiments, an elevation adjudicator selects a governance frame as a function of at least one of: domain, destination class, tool category, data class, jurisdiction, risk tier, or tenant context. In some embodiments, selection is conditioned on a confidence threshold; if selection cannot be performed with sufficient confidence, elevation is denied by default.

[AppR-0006] Operation digest binding (illustrative). In some embodiments, an authorized operation specification is canonicalized into a normalized representation, and an operation digest is computed over at least tool identifier and canonical arguments (target identifier, action type, disclosure/effect budget, destination class). Materially different operations produce different digests, preventing reuse of an authorization capsule for altered semantics.

[AppR-0007] Commit capsule issuance and constraints (illustrative). In some embodiments, upon an allow elevation decision, a commit capsule is minted that is cryptographically bound to the operation digest and includes one or more enforceable bounds selected from time/freshness bounds, destination bounds, tool bounds, rate bounds, blast-radius bounds, scope bounds, or audience bounds. In some embodiments, the commit capsule is nonce-bound and/or single-use, and verification rejects reuse or digest mismatch.

[AppR-0008] Step-up and separation-of-duties (illustrative). In some embodiments, elevation of a directive candidate requires satisfaction of a step-up approval rule for risk tiers above a threshold, including at least one of user confirmation, cryptographic approval, challenge-response, or N-of-M approval (e.g., two-person rule). In some embodiments, the step-up approval is cryptographically bound to the canonicalized authorized operation specification.

[AppR-0009] Injection-risk analysis (illustrative). In some embodiments, an injection-risk detector computes an injection-risk score for at least one of the inbound content payload or directive candidate (e.g., tool-control strings, hidden instructions, prompt-leak patterns, or policy-bypass patterns). In some embodiments, the governance frame conditions elevation on risk score thresholds, requiring step-up or denying elevation.

[AppR-0010] Taint algebra and prohibited influence (illustrative). In some embodiments, taint propagation is applied such that when taint reaches an effect-relevant field (destination, tool, parameter, or disclosure budget) for a restricted operation type, elevation is denied unless a policy-defined de-taint procedure is satisfied (e.g., independent confirmation, double-entry verification, cross-check against a trusted source, or cryptographic approval).

[AppR-0011] Signed snapshots for allowable tools (illustrative). In some embodiments, governance frames reference a signed snapshot of an allowable tool/extension registry, and elevation is denied when the authorized operation specification requires a tool absent from the signed snapshot or when the snapshot cannot be verified to required assurance (signature invalid, stale, revoked, or inconsistent).

[AppR-0012] Evidence object and conformance (illustrative). In some embodiments, the system emits a machine-checkable evidence object committing to governance frame identifier/digest, operation digest, origin tag and trust tag commitments (or digests), step-up outcome, and allow/deny outcome with structured reason codes. In some embodiments, an independent verifier reproduces the decision using a conformance bundle containing the evidence object and referenced governance frame/snapshot commitments.

[AppR-0013] Non-limiting schemas (evidence-only). In some embodiments, a governance frame, commit capsule, and evidence object may be represented in machine-readable formats (JSON, CBOR, ASN.1, or equivalent). Example (illustrative; non-limiting):

[AppR-0013A] GovernanceFrame example: {"frame_id": "GF-001", "version": "v1", "rules_ digest": " . . . ", "allowable_tools_snapshot": "SNAP . . . ",
"risk_tiers": {"HI GH": {"step_up": "N_OF_M"}}}

[AppR-0013B] CommitCapsule example:
{"capsule_id": "CC . . . ", "operation_digest": " . . . ",
"bounds": {"valid_to": " . . . ", "dest_class": "APPRO
VED", "rate": " . . . "}, "nonce" . . . ", "sig": " . . . "}

[AppR-0013C] EvidenceObject example:
{"decision": "ALLOW|DENY", "operation_digest":
" . . . ", "frame_id": "GF-001", "step_up": "PASS-
|FAIL", "reason_code": " . . . "origin_commit-
ment" . . . ", "sig": " . . . "}

[AppR-0014] Non-limiting notice. The embodiments of
Appendix R are exemplary and do not limit claim scope.
Equivalent elevation, capsule, evidence, and snapshot
mechanisms may be used while preserving deny-by-default
semantics for promotion and authorization of agentic opera-
tions.

Appendix S—Extension Marketplace Supply-Chain Gates
with Publisher-Tier Governance, Entitlements, Emergency
Revocation SLA, and Reproducible-Build Quorums (Illus-
trative; Non-Limiting)

[AppS-0001] Purpose. In some embodiments, installa-
tion, enabling, loading, invocation, or update of a skill,
plugin, extension, connector, tool adapter, workflow pack-
age, script, library, container image, model bundle, or con-
figuration bundle changes future external-effect semantics
and is treated as a high-risk external effect. This Appendix
S provides non-limiting embodiments for supply-chain gat-
ing of such operations using catalog governance, entitle-
ments, SBOM and provenance verification, builder-trust
validation, emergency revocation with SLA guarantees, and
reproducible-build quorums.

[AppS-0002] Extension marketplace gate (illustrative). In
some embodiments, an update/modification channel or
extension marketplace interface is treated as an external
interface for authorization purposes. An install-and-load
interdictor interposes on install/enable/load/update opera-
tions and denies by default unless required verification
inputs are satisfied.

[AppS-0003] Catalog authority plane and signed catalog
snapshots (illustrative). In some embodiments, an allowabil-
ity catalog is maintained and distributed as signed catalog
snapshots (e.g., a signed manifest committing to artifact
digests and metadata). Snapshot verification includes signa-
ture validation, issuer-chain checks, and key-rotation policy
compliance. Snapshots failing validation are rejected and
associated operations are denied by default.

[AppS-0004] Publisher tier ledger and tier policy packs
(illustrative). In some embodiments, publishers are assigned
to tiers via a publisher tier ledger. Each tier references a tier
policy pack that specifies capability bounds and verification
requirements, including (non-limiting examples) allowable
connectors, allowable destinations, data-class restrictions,
required attestations, required reproducible-build quorum
policies, and allowed update channels. In some embodi-
ments, tier policy packs are distributed as signed releases
and are treated as revocable inputs.

[AppS-0005] Tier commercial schedule and entitlements
(illustrative). In some embodiments, tier governance
includes a commercial schedule defining entitlement condi-
tions for installation, enabling, or update (e.g., per-install
fees, per-tenant entitlements, per-region entitlements, sub-
scription windows, usage-metered entitlements). In some
embodiments, entitlements are represented by entitlement
tokens or by an entitlement ledger state, and entitlement
validation is a prerequisite for allowing install/enable/up-
date.

[AppS-0006] Entitlement scope vector (illustrative). In
some embodiments, entitlements are scoped by an ordered
tuple (entitlement scope vector) comprising one or more of
organization identifier, environment identifier, tenant iden-
tifier, cluster identifier, and region identifier. In some
embodiments, an operation is denied when a resolved scope
vector for the attempted operation mismatches a scope
vector bound to an entitlement token or ledger state.

[AppS-0007] Entitlement inheritance and overrides (illus-
trative). In some embodiments, entitlements support inheri-
tance and overrides across the scope vector (e.g., organiza-
tion-wide default entitlements overridden by tenant-,
cluster-, or region-specific restrictions). In some embodi-
ments, explicit precedence rules are applied and the system
denies by default when entitlement resolution is ambiguous,
inconsistent, or unverifiable.

[AppS-0008] SBOM verification and transitive depen-
dency locks (illustrative). In some embodiments, an SBOM
is required for an extension artifact and includes transitive
dependency identifiers (names/versions/hashes), license
identifiers, and risk indicators. The system denies by default
when (i) the SBOM is missing, (ii) transitive dependencies
are omitted, (iii) dependency substitution is detected, (iv) a
dependency fails integrity verification, or (v) a dependency
violates policy constraints (e.g., prohibited license, prohib-
ited vulnerability class, or prohibited source).

[AppS-0009] Provenance bundles and builder trust status
(illustrative). In some embodiments, a provenance bundle is
required and commits to at least source revision, build
recipe, and builder identity attestation. In some embodi-
ments, builder trust status includes (i) a builder reputation
signal and (ii) a hardware-backed signing requirement sat-
isfied by an attestation that an artifact-signing key is pro-
tected by a hardware security boundary (HSM, TEE, secure
enclave, TPM, or equivalent).

[AppS-0010] Builder compromise response and emer-
gency revocation (illustrative). In some embodiments, emer-
gency revocation invalidates at least one of a catalog signing
key, a publisher key, a builder key, a builder identity, an
artifact digest, a tier policy pack, or an entitlement token.
Emergency revocation is treated as a high-priority revocable
input whose status and recency are evaluated; when emer-
gency revocation status cannot be established to required
assurance, the system denies by default for affected opera-
tions.

[AppS-0011] Revocation acknowledgment and quorum
propagation SLA (illustrative). In some embodiments, emer-
gency revocation distribution includes (i) an SLA propaga-
tion window, (ii) an acknowledgment requirement whereby
enforcement points transmit signed acknowledgments of
receipt, and (iii) a quorum propagation requirement requir-
ing acknowledgments from at least a threshold quorum of
enforcement points within the SLA propagation window. In
some embodiments, failure to satisfy quorum propagation
triggers a default-deny posture for installation, enabling,
loading, invocation, or update operations within affected
scopes.

[AppS-0012] Critical enforcement sets and checkpointed
propagation (illustrative). In some embodiments, a critical
enforcement set is defined per resolved entitlement scope
vector and/or per (tenant, cluster, region) tuple, including
required gateways, registries, artifact intake points, and
enforcement points for that scope, and quorum propagation
is evaluated per scope-segment at least over the critical
enforcement set. In some embodiments, propagation
includes incremental checkpoints (e.g., at least X % acknowledgment by time T1 and Y % acknowledgment by time T2), and the system denies by default when checkpoint requirements are not met.

[AppS-0012A] Tenant/cluster/region segmentation (illustrative). In some embodiments, the system maintains distinct critical enforcement sets for each tenant, cluster, and region, and denies a high-risk operation unless acknowledgments satisfy the quorum requirement for the specific segment corresponding to the resolved tuple.

[AppS-0012B] Critical enforcement set registry and determinism (illustrative). In some embodiments, the critical enforcement set definition is published as a signed manifest, optionally tenant-scoped and region-scoped, and is evaluated for authenticity, recency, and revocation; unknown, stale, ambiguous, or unverifiable manifests cause deny-by-default.

[AppS-0012C] Cross-scope propagation rules (illustrative). In some embodiments, when an installation, enabling, or update operation affects multiple clusters or regions, the system requires quorum satisfaction for each involved critical enforcement set segment (per-cluster and/or per-region) prior to allowing the operation; otherwise the system denies by default.

[AppS-0013] SLA revalidation deadlines and quarantine (illustrative). In some embodiments, emergency revocation includes an SLA revalidation deadline requiring revalidation of installed extensions. Extensions not revalidated by the deadline are quarantined, disabled, or prevented from loading. In some embodiments, updates are treated as new intake events requiring full re-verification under current snapshots, policy packs, entitlements, and revocation state.

[AppS-0014] Reproducible-build challenges (illustrative). In some embodiments, a tier policy pack requires a reproducible-build challenge in which an artifact is rebuilt from the committed source revision and build recipe; the operation is denied by default unless the rebuilt digest matches an artifact digest committed in the signed catalog snapshot.

[AppS-0015] N-of-M independent rebuilders (illustrative). In some embodiments, a rebuild quorum policy issues rebuild challenges to independent rebuilders associated with distinct administrative domains and permits an operation only if at least N out of M rebuilt digests match. In some embodiments, rebuilders provide build transcripts or attestations bound to the rebuilt digests; rebuilders may optionally execute within trusted compute boundaries and/or on distinct cloud providers to reduce correlated compromise risk.

[AppS-0016] Runtime integrity sentinels and drift detection (illustrative). In some embodiments, a runtime integrity sentinel periodically re-validates at least one of artifact digests, entitlement validity for the resolved scope vector, tier policy pack applicability, builder trust status, and emergency revocation state. Upon detecting drift or eligibility changes, the system quarantines or disables affected extensions and records audit evidence.

[AppS-0017] Evidence objects, conformance bundles, and reason codes (illustrative). In some embodiments, an audit evidence generator emits a machine-checkable evidence object committing to at least snapshot identifier, publisher tier identifier, tier policy pack identifier, entitlement scope vector and entitlement outcome, SBOM/provenance commitments, rebuild quorum outcome when performed, revocation acknowledgment/quorum state, and structured reason codes. In some embodiments, a conformance bundle includes the evidence object and referenced snapshot/policy-pack/entitlement/rebuild and revocationack commitments sufficient for an independent verifier to reproduce allow/deny outcomes.

[AppS-0018] Non-limiting schema examples (evidence-only). In some embodiments, the following are illustrative: (i) SignedCatalogSnapshot manifest committing to artifact digests; (ii) EntitlementToken bound to a scope vector; (iii) RevocationAck message signed by an enforcement point; (iv) RebuildTranscript or RebuildAttestation bound to rebuilt digests and rebuilder identity.

[AppS-0018A] SignedCatalogSnapshot example:
{"snapshot_id": "SNAP . . . ", "catalog_digest": " . . . ", "sig": " . . . ", "key_rotation": {"kid": " . . . ", "valid_from": " . . . ", "valid_to": " . . . "}}

[AppS-0018B] EntitlementToken example:
{"ent_id": "ENT- . . . ", "scope_vector": {"org": " . . . ", "tenant": " . . . ", "cluster": " . . . ", "region": " . . . "}, "artifac t_id": " . . . ", "valid_to": " . . . ", "sig": " . . . "}

[AppS-0018C] RevocationAck example:
{"rev_id ": "REV . . . ", "enf_point": "EP . . . ", "received_at": " . . . ", "sig": " . . . "}

[AppS-0018D] RebuildAttestation example:
{"rebuilder_id": "RB . . . ", "artifact_digest": " . . . ", "rebuilt_digest": " . . . ", "build_transcript digest": " . . . "," sig": " . . . "}

[AppS-0019] Non-limiting notice. The embodiments of Appendix S are exemplary and do not limit claim scope. Equivalent catalog governance, entitlement validation, SBOM/provenance verification, emergency revocation SLA mechanisms, and rebuild quorum mechanisms may be used while preserving deny-by-default supply-chain gating for extension operations.

The invention claimed is:

1. A computer system comprising one or more processors and non-transitory memory storing instructions that, when executed, cause the computer system to operate as a non-bypassable permit-before-commit interceptor logically interposed at an effect boundary between an execution substrate and at least one external interface, wherein a plurality of external-effect requests destined for the at least one external interface must traverse the interceptor prior to commitment at the at least one external interface, the instructions causing the computer system to:

(a) receive an external-effect request destined for the at least one external interface;

(b) deterministically canonicalize the external-effect request to produce a canonical request representation and compute an action digest over the canonical request representation;

(c) obtain a permit receipt associated with the external-effect request, the permit receipt comprising at least (i) a policy digest, (ii) an epoch identifier binding the permit receipt to a policy epoch, (iii) a time-bounded validity value, (iv) an authorization binding to the external-effect request, the authorization binding comprising one or both of (A) an action digest value corresponding to the canonical request representation and (B) a cryptographic commitment to the canonical request representation, and (v) authenticity evidence comprising at least one digital signature;

(d) verify, prior to committing the external-effect request, that the permit receipt is authentic and authorizes the external-effect request at least by:

(i) cryptographically verifying the at least one digital signature;

(ii) verifying that (C) when the permit receipt comprises the action digest value, the computed action digest matches the action digest value, (D) when the permit receipt comprises the cryptographic commitment, the canonical request representation verifies against the cryptographic commitment under a commitment verification procedure, and (E) when both (A) and (B) are present in the permit receipt, verifying both (C) and (D); and (iii) verifying that the permit receipt satisfies a policy-defined epoch-compatibility rule for the epoch identifier and is within the time-bounded validity value;

(e) verify, prior to committing the external-effect request, a revocation status for at least one of the permit receipt, an issuer credential associated with the authenticity evidence, or a policy-epoch state associated with the policy epoch identified by the epoch identifier, the policy-epoch state including a signed policy release manifest and/or a policy activation receipt; and (f) commit the external-effect request to the at least one external interface only when (d) and (e) succeed, and otherwise fail-closed by denying commitment of the external-effect request.

2. The computer system of claim 1, wherein verifying the permit receipt comprises verifying a signature chain or certificate chain associated with an issuing authority for the at least one digital signature.

3. The computer system of claim 1, wherein the permit receipt further comprises anti-replay material comprising at least one of a nonce, a monotonic counter, or a sequence number, and wherein the computer system denies commitment when the anti-replay material is invalid or reused.

4. The computer system of claim 1, wherein verifying that the permit receipt is within the time-bounded validity value comprises evaluating a time source or drift bound under a policy-defined rule, including verifying at least one of (i) a signed time checkpoint, (ii) time attestation evidence, or (iii) a clock-drift bound under a policy-defined bounded clock-drift rule, and wherein the computer system denies commitment when the time source is untrusted or the clock drift exceeds a policy-defined threshold.

5. The computer system of claim 1, wherein the permit receipt further comprises a canonicalization profile identifier or digest, and the computer system denies commitment upon canonicalization profile mismatch.

6. The computer system of claim 1, wherein the permit receipt further comprises an authorization scope defining at least one of an interface identifier, an action type, a target identifier, a rate limit, or a maximum effect budget, and wherein the computer system denies commitment when the external-effect request exceeds the authorization scope.

7. The computer system of claim 1, wherein verifying the revocation status comprises verifying a signed revocation list or a signed revocation event record.

8. The computer system of claim 1, wherein verifying the revocation status comprises verifying, relative to a signed checkpoint of an append-only transparency log, at least one of an inclusion proof or a non-inclusion proof for a revocation event record and/or a revocation-set entry associated with the permit receipt, an issuer credential, and/or the policy epoch.

9. The computer system of claim 1, wherein the authenticity evidence comprises a threshold signature requiring k-of-m signers, wherein both k and m are integers.

10. The computer system of claim 1, wherein the permit receipt further comprises a jurisdiction context binding that commits to at least one of a jurisdiction identifier set, a geospatial-time digest, a ground station identifier, a relay path identifier, a hop-list digest, or a link-window identifier, and wherein the computer system denies commitment when the jurisdiction context binding is indeterminate, conflicts with the external-effect request, is inconsistent with required route constraints, or violates an authority profile applicable to the external-effect request.

11. The computer system of claim 1, wherein the computer system is deployed in an intermittently connected or delay-tolerant environment, and wherein the computer system is configured to deny commitment when evidence required by an authority profile and/or an assurance level profile applicable to the external-effect request is unavailable except as permitted by a policy-defined constrained mode.

12. The computer system of claim 1, wherein upon fail-closed denial,
the computer system outputs a structured denial reason code selected from a reason code registry.

13. The computer system of claim 1, wherein at least a portion of the interceptor executes within a trusted compute boundary comprising at least one of a trusted execution environment (TEE) or a hardware security module (HSM).

14. The computer system of claim 1, wherein verifying that the permit receipt authorizes the external-effect request further comprises selecting an applicable authority profile and/or an assurance level profile based on at least one of jurisdiction, operational domain, interface type, effect type, or risk class, and denying commitment when profile selection cannot be performed with sufficient confidence, wherein the sufficient confidence is determined by a deterministic selection procedure defined by a policy epoch and/or a signed registry release, including at least one of: (i) quorum agreement among multiple profile sources, (ii) validation of cryptographically verifiable signed context evidence used for selection, or (iii) satisfaction of a policy-defined confidence threshold.

15. The computer system of claim 1, wherein the permit receipt further comprises machine-verifiable assurance evidence, or a cryptographic commitment to machine-verifiable assurance evidence, treated as a revocable input and evaluated for recency, and wherein the computer system denies commitment when required assurance evidence is missing, stale, ambiguous, or unverifiable to a policy-required assurance level.

16. The computer system of claim 1, wherein the permit receipt further comprises an energy or resource budget binding, and wherein the computer system denies commitment when a verified budget constraint is not satisfied.

17. The computer system of claim 1, wherein the permit receipt further comprises a permit provenance digest that commits to a permit artifact, license token, approval record, or authorization record issued by an authority distinct from the execution substrate.

18. The computer system of claim 17, wherein verifying that the permit receipt authorizes the external-effect request comprises enforcing permit provenance as a condition of commitment, including verifying that the permit provenance digest is cryptographically bound to at least the computed action digest.

19. The computer system of claim 1, wherein verifying the revocation status comprises enforcing a policy-defined recency threshold and denying commitment when revocation status is unknown, stale, or unverifiable relative to the recency threshold.

20. The computer system of claim 1, wherein verifying that the permit receipt authorizes the external-effect request further comprises verifying principal and/or workload identity bindings when required by policy, and denying commitment when an identity binding is missing, inconsistent, or unverifiable to a required assurance level.

21. The computer system of claim 1, wherein committing the external-effect request comprises emitting a capability token bound to at least the computed action digest, and wherein the at least one external interface denies effect commitment when a valid capability token is absent.

22. A computer-implemented method for receipt-conditioned, fail-closed authorization of external-effect requests across an effect boundary, comprising:

(a) receiving, at a non-bypassable interceptor positioned on the effect boundary, an external-effect request destined for an external interface;

(b) canonicalizing the external-effect request to produce a canonical request representation and computing an action digest over the canonical request representation;

(c) obtaining a permit receipt comprising a policy digest, an epoch identifier, a time-bounded validity value, authenticity evidence comprising at least one digital signature, and an authorization binding to the external-effect request, the authorization binding comprising one or both of (A) an action digest value corresponding to the canonical request representation and (B) a cryptographic commitment to the canonical request representation;

(d) verifying, prior to commitment, that the permit receipt authorizes the external-effect request at least by:

(i) cryptographically verifying the at least one digital signature;

(ii) verifying that (C) when the permit receipt comprises the action digest value, the computed action digest matches the action digest value, (D) when the permit receipt comprises the cryptographic commitment, the canonical request representation verifies against the cryptographic commitment under a commitment verification procedure, and (E) when both (A) and (B) are present in the permit receipt, verifying both (C) and (D); and (iii) verifying that the permit receipt satisfies a policy-defined epoch-compatibility rule for the epoch identifier and is within the time-bounded validity value;

(e) verifying a revocation status for at least one of the permit receipt, an issuer credential, or a policy-epoch state associated with the policy epoch identified by the epoch identifier, the policy-epoch state including a signed policy release manifest and/or a policy activation receipt; and (f) committing the external-effect request only upon successful verification of (d) and (e), and otherwise denying commitment in a fail-closed manner.

23. The method of claim 22, further comprising, upon an epoch mismatch, denying commitment and requesting re-issuance of the permit receipt under a current policy epoch.

24. The method of claim 22, wherein the epoch identifier comprises a composite epoch digest committing to multiple policy digests, and wherein the method denies commitment upon cross-epoch inconsistency.

25. The method of claim 22, wherein canonicalizing the external-effect request uses a canonicalization rule selected from a canonicalization registry released as a signed manifest.

26. The method of claim 22, further comprising, in an intermittently connected environment, issuing a constrained local permit receipt using a monotonic counter under a policy-defined scope and, upon reconnection, anchoring a digest of the constrained local permit receipt to an append-only log.

27. The method of claim 22, wherein for at least one of (i) verifying the revocation status of step (e) or (ii) verifying that the permit receipt satisfies a policy-defined epoch compatibility rule for the epoch identifier of step (d), verifying inclusion proofs relative to signed checkpoints of multiple append-only logs operated by distinct entities, the multiple append-only logs comprising at least two logs that publish signed checkpoints committing to at least one of: (A) a revocation event record and/or revocation status proof for the permit receipt, an issuer credential, and/or the policy epoch, (B) a revocation list or revocation-list checkpoint, (C) a policy-epoch checkpoint or an epoch-compatibility state, or (D) an authority-profile and/or registry-release manifest checkpoint, and denying commitment when a required inclusion proof is missing, invalid, or stale beyond a policy-defined recency threshold, or when a policy-defined cross-log coherence requirement is not satisfied.

28. A non-transitory computer-readable medium storing instructions that, when executed by one or more processors, cause performance of the method of claim 22.

29. The non-transitory computer-readable medium of claim 28, wherein the method further comprises emitting structured denial reason codes and audit events committing to at least the action digest, policy digest, epoch identifier, and verification outcome, and wherein the external-effect request comprises controlling release of at least a portion of an output stream produced by an artificial intelligence model to an external sink.

30. The non-transitory computer-readable medium of claim 28, wherein the method further comprises producing a verifier API result including a decision and a denial reason code according to a verifier API contract, and evaluating conformance using a signed test vector corpus and a signed release manifest.

\* \* \* \* \*